US008059637B2

(12) United States Patent
Doi et al.

(10) Patent No.: US 8,059,637 B2
(45) Date of Patent: Nov. 15, 2011

(54) RADIO COMMUNICATION METHOD AND RADIO COMMUNICATION APPARATUS

(75) Inventors: Hiroshi Doi, Kanagawa (JP); Masahiro Mimura, Tokyo (JP); Taisuke Matsumoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 194 days.

(21) Appl. No.: 12/472,869

(22) Filed: May 27, 2009

(65) Prior Publication Data
US 2009/0232057 A1 Sep. 17, 2009

Related U.S. Application Data

(63) Continuation of application No. 10/574,736, filed on Apr. 4, 2006, now Pat. No. 7,558,258.

(30) Foreign Application Priority Data

Aug. 31, 2004 (JP) ................................. 2004-252243
Nov. 12, 2004 (JP) ................................. 2004-328770

(51) Int. Cl.
*H04L 12/50* (2006.01)
(52) U.S. Cl. ..................... 370/376; 455/450; 455/452.2
(58) Field of Classification Search ....... 455/450–452.2; 370/376
See application file for complete search history.

(56) References Cited

U.S. PATENT DOCUMENTS

| 2002/0071413 | A1 | 6/2002 | Choi |
| 2003/0016692 | A1 | 1/2003 | Thomas et al. |
| 2004/0233936 | A1 | 11/2004 | Cheng |
| 2005/0036475 | A1 | 2/2005 | Nishiyama et al. |
| 2005/0058117 | A1 | 3/2005 | Morioka et al. |
| 2005/0249173 | A1* | 11/2005 | Salokannel et al. .......... 370/338 |
| 2005/0259754 | A1* | 11/2005 | Ho et al. .................. 375/240.28 |
| 2006/0092909 | A1 | 5/2006 | Ho |

FOREIGN PATENT DOCUMENTS

| JP | 2002-198897 A | 7/2002 |
| JP | 2003-229869 A | 8/2003 |
| JP | 2003-273882 A | 9/2003 |
| WO | WO 03/075515 | 9/2003 |

OTHER PUBLICATIONS

US Office Action for U.S. Appl. No. 12/472,854, Oct. 14, 2010, Panasonic Corporation.
International Search Report for PCT/JP2005/014022, dated Sep. 9, 2005.
Supplementary European Search Report for Application No. EP 05 76 7119, Jul. 18, 2001, Panasonic Corporation.
US Office Action for U.S. Appl. No. 12/472,854, Mar. 8, 2011, Panasonic Corporation.

* cited by examiner

*Primary Examiner* — Rafael Pérez-Gutiérrez
*Assistant Examiner* — Marcos Batista
(74) *Attorney, Agent, or Firm* — RatnerPrestia

(57) ABSTRACT

A beacon slot position control section of a radio communication apparatus constituting a radio network system which detects whether empty beacon slots are present in a beacon period. When an empty beacon slot is present before the period in which the radio communication apparatus transmits a beacon, a movable counter starts counting a specified number of super frames. When the count is completed, the radio communication apparatus transmits a beacon of the radio communication apparatus at the earlier empty beacon slot. Consequently, since the empty beacon slots are eliminated and the beacon period is compacted, even if the number of radio communication apparatuses joining the radio network system fluctuates dynamically, the radio communication apparatus can perform radio communication with high efficiency and less waste of consumed electricity.

20 Claims, 42 Drawing Sheets

Fig.4

| SLOT NUMBER (401) | DEVICE ID (402) | STATE OF USE (403) | TYPE (404) |
|---|---|---|---|
| 1 | A | O | Beacon |
| 2 | B | O | BPOIE |
| 2 | E | O | Beacon |
| 3 | C | O | BPOIE |
| 4 | D | O | Beacon |
| 5 | F | O | Beacon |
| 6 | O | O | O |
| 7 | O | O | O |
| 8 | O | O | O |

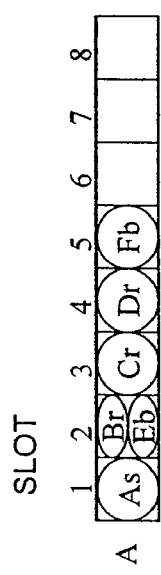

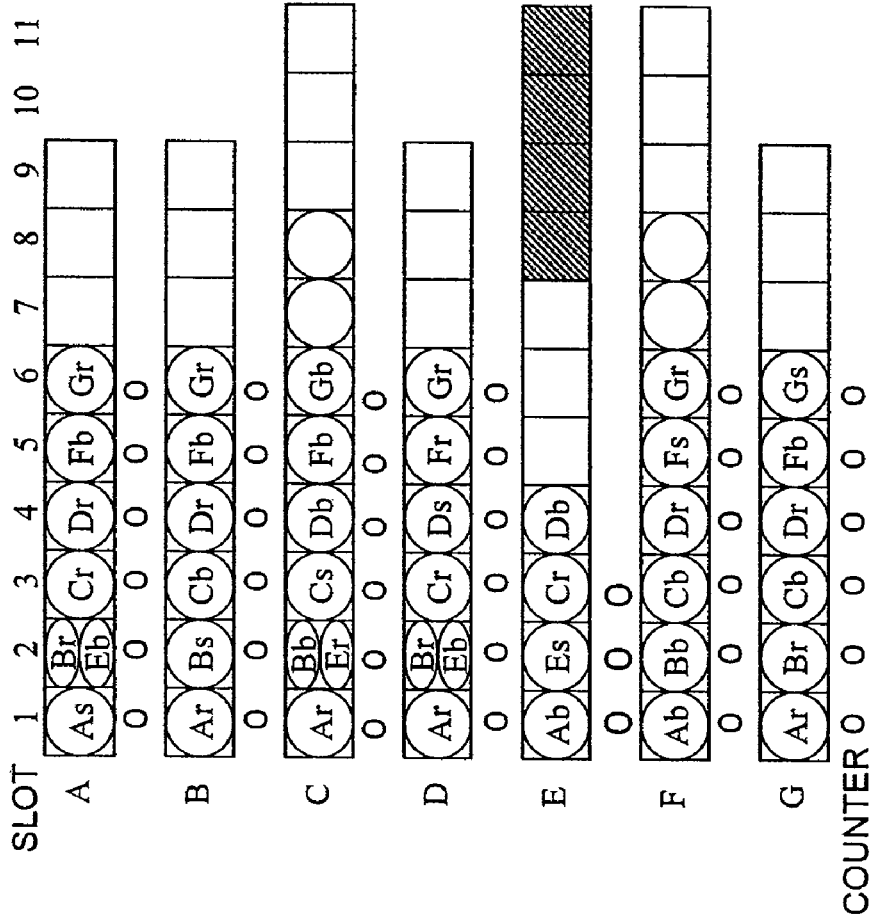
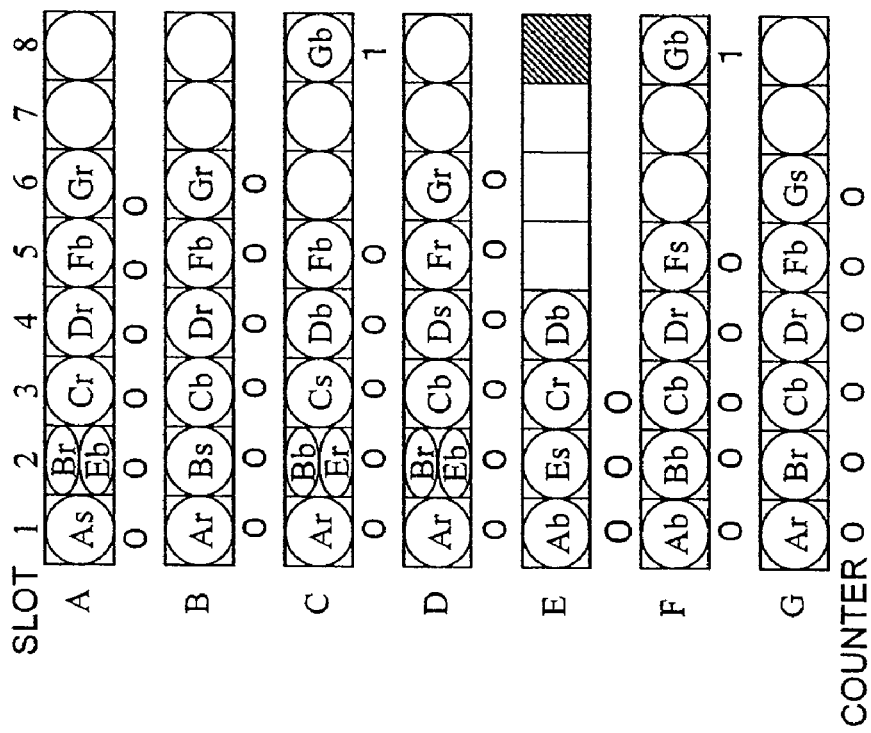

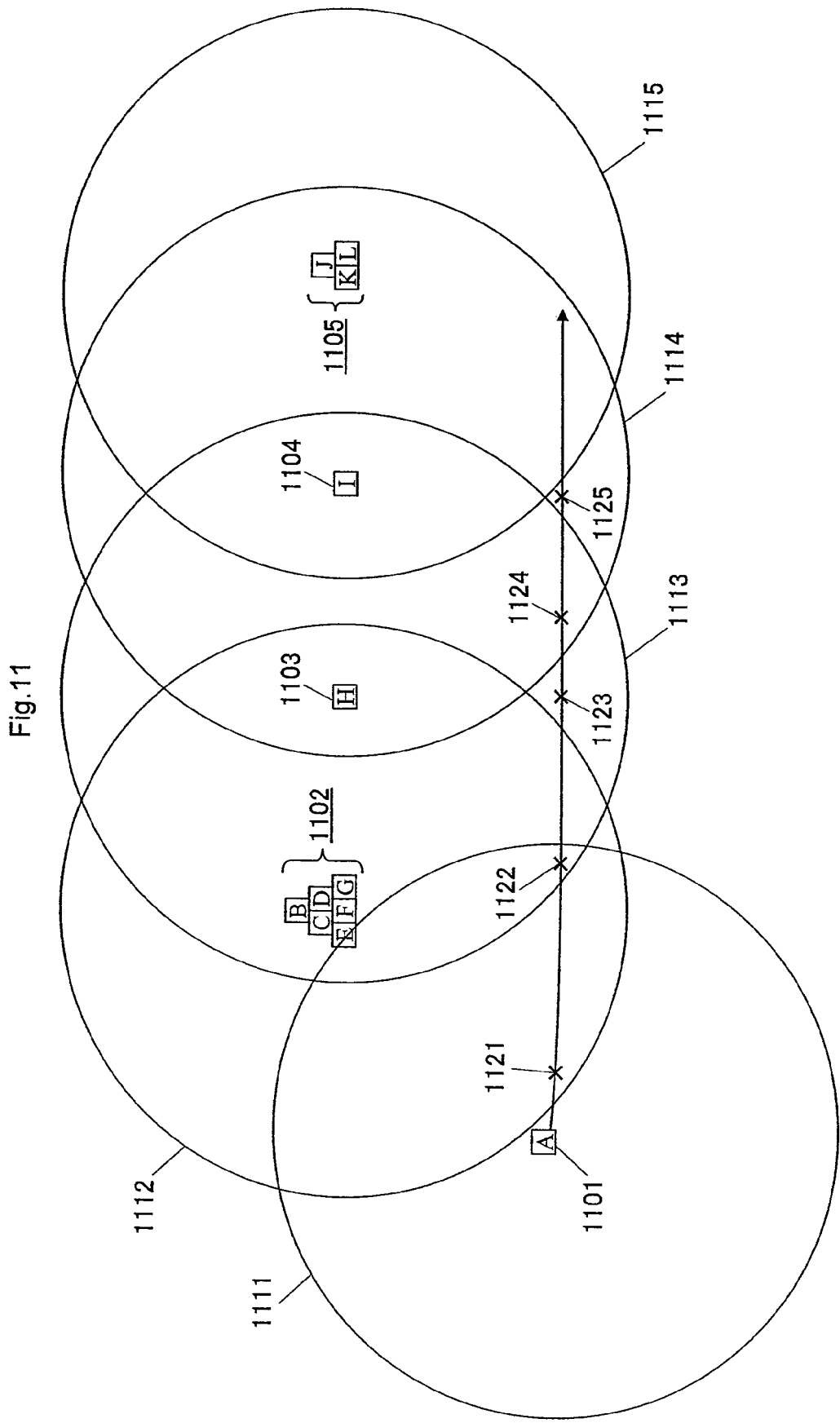

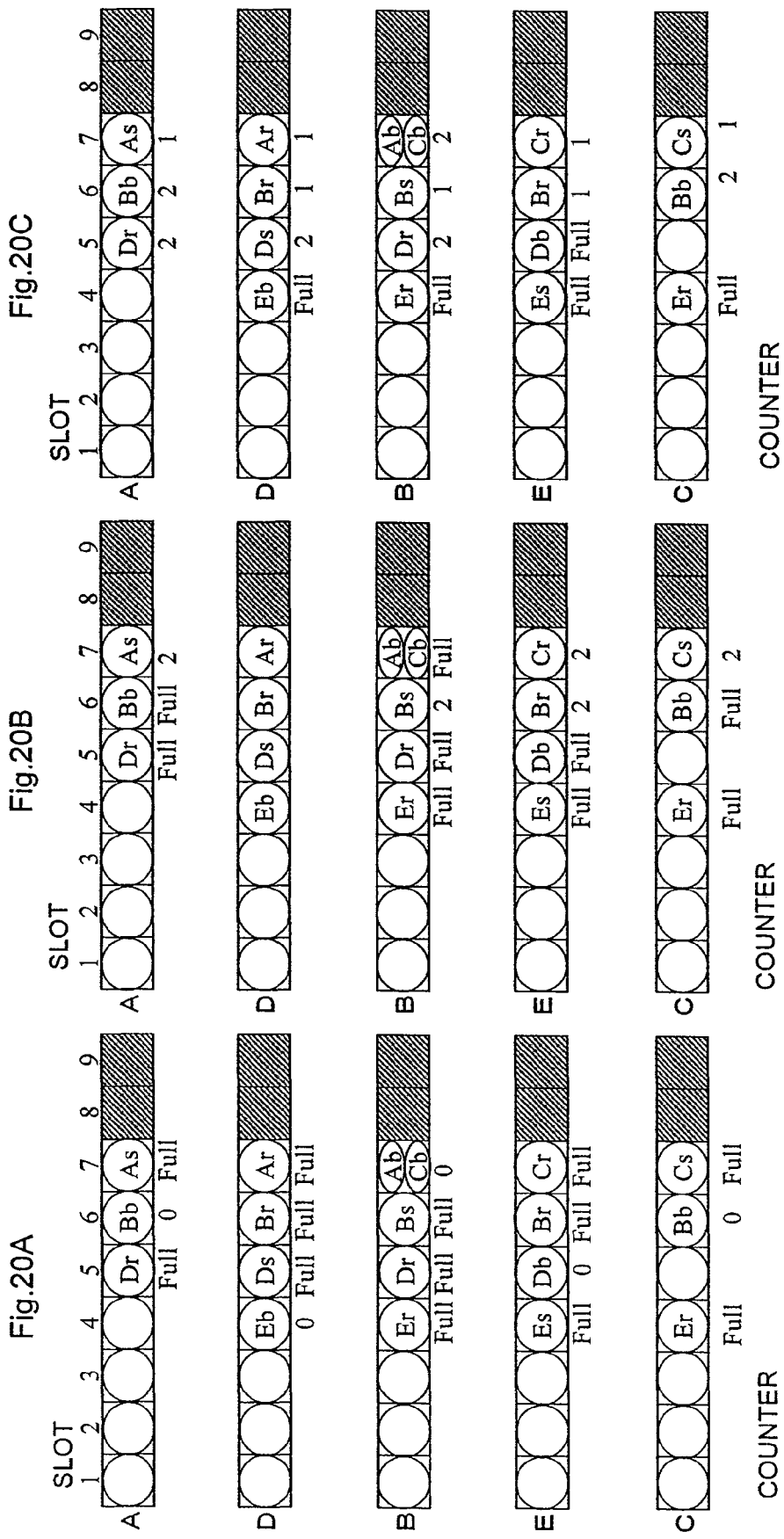

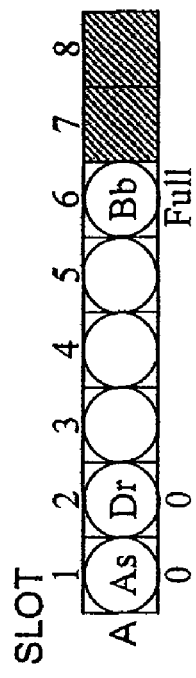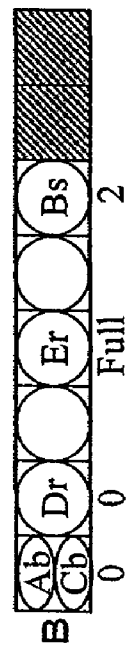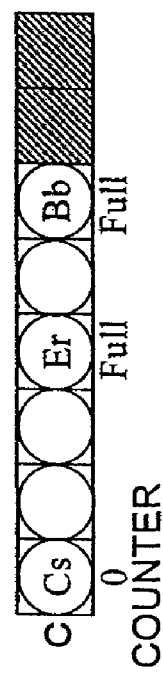
Fig.21B
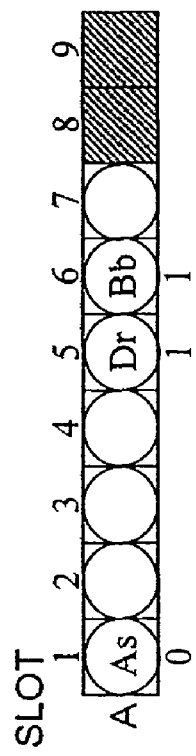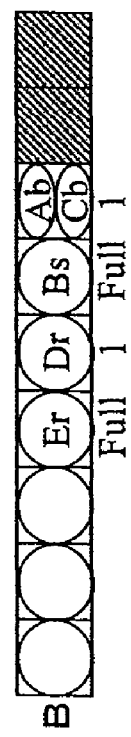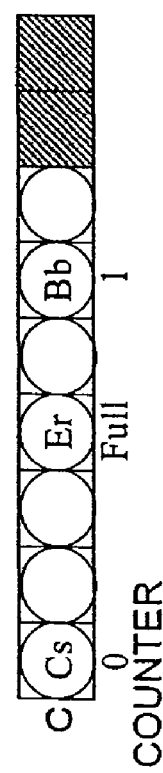
Fig.21A

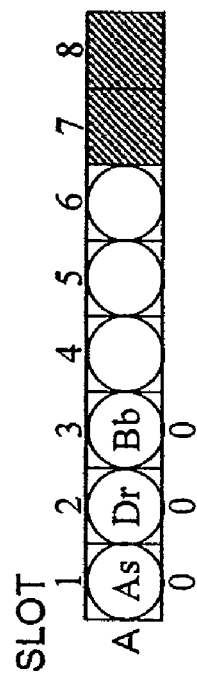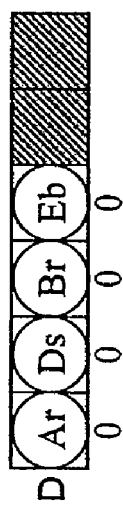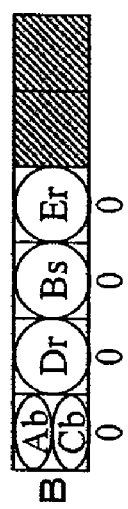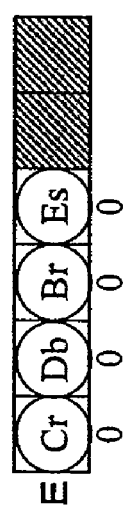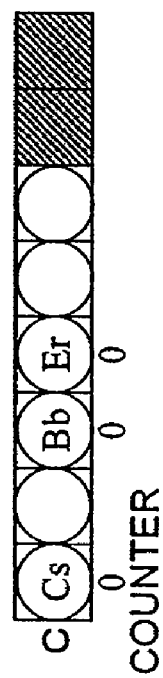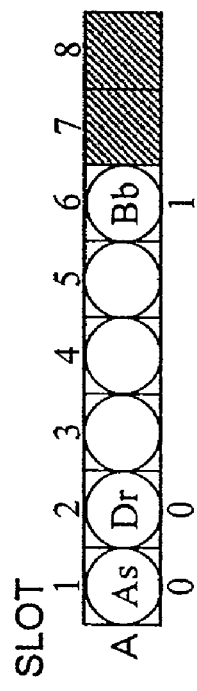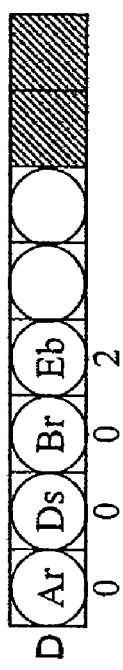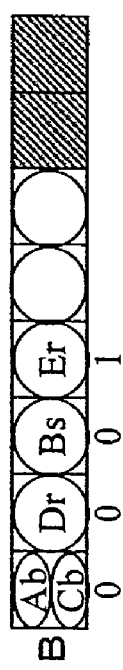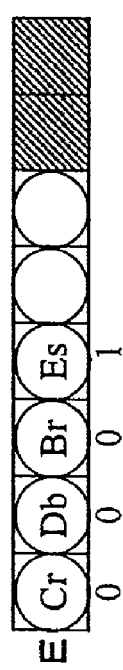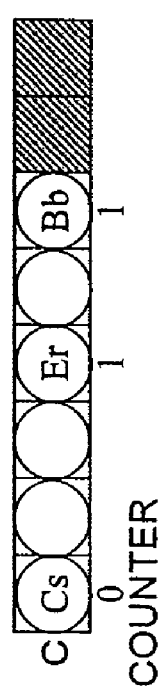

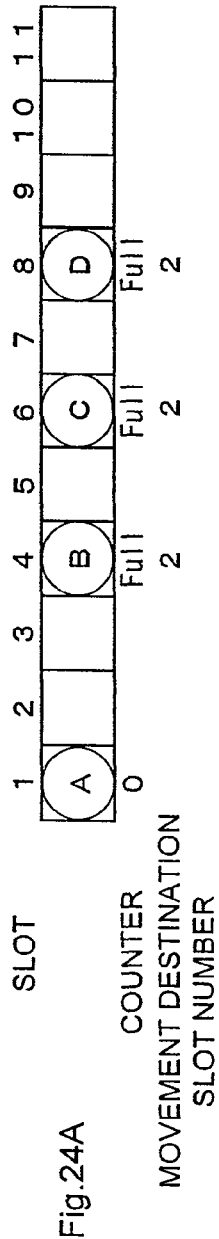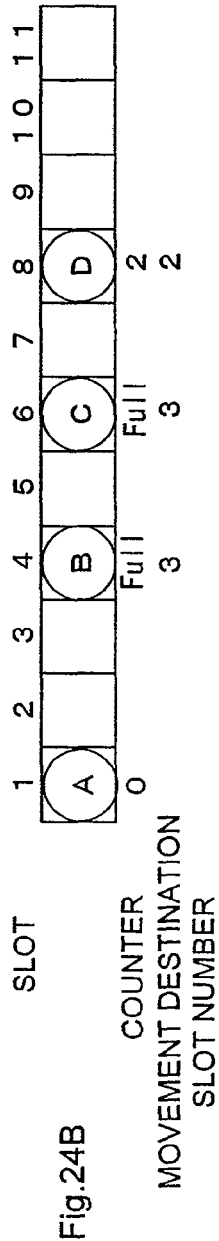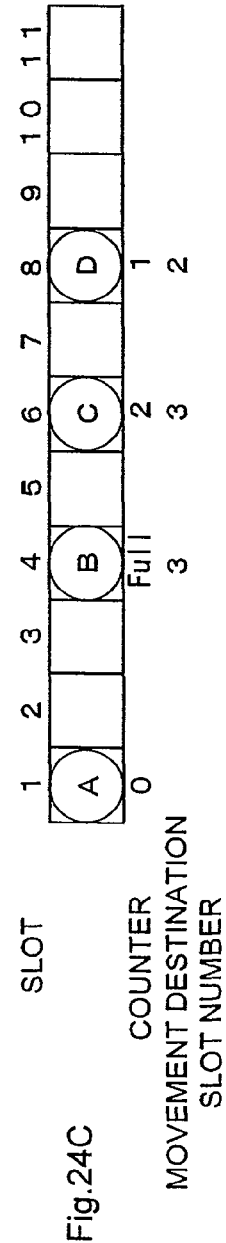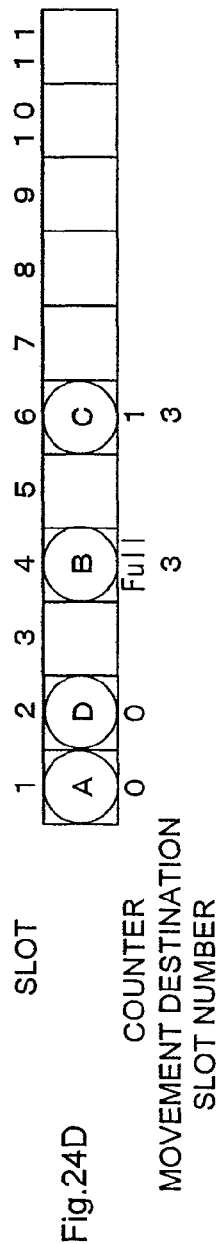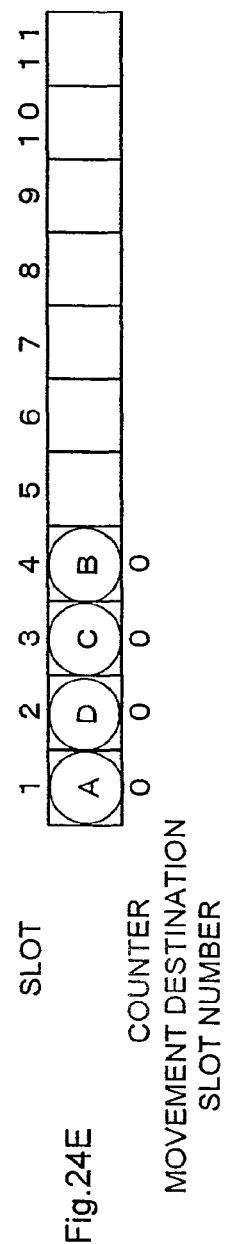

Fig.27

| SLOT NUMBER /401 | DEVICE ID /402 | STATE OF USE /403 | TYPE /404 | TO-BE-MOVED DEVICE ID /405 |
|---|---|---|---|---|
| 1 | A | 0 | Beacon | 0 |
| 2 | 0 | 0 | 0 | 0 |
| 3 | 0 | 0 | 0 | 0 |
| 4 | B | 3 | Beacon | 2 |
| 5 | 0 | 0 | 0 | 0 |
| 6 | C | 3 | Beacon | 2 |
| 7 | 0 | 0 | 0 | 0 |
| 8 | D | 3 | Beacon | 2 |

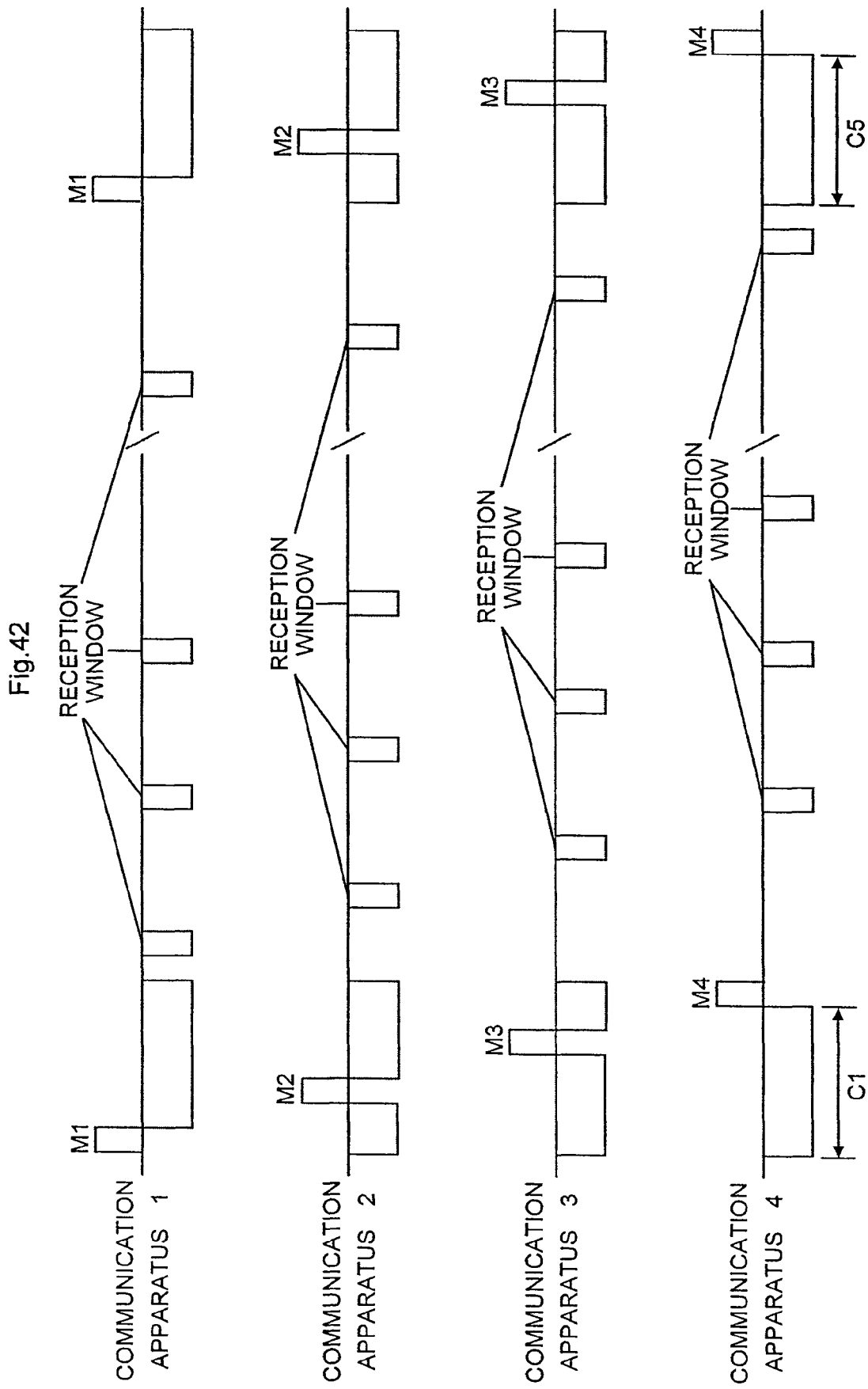

RADIO COMMUNICATION METHOD AND RADIO COMMUNICATION APPARATUS

This application is a continuation of U.S. patent application Ser. No. 10/574,736, filed Apr. 4, 2006, which is incorporated herein by reference.

TECHNICAL FIELD

The present invention relates to a radio communication method and a radio communication apparatus which are used when ad hoc communication in a radio communication network is performed.

BACKGROUND ART

Conventionally, as the radio communication method and the radio communication apparatus, for example, there are those described in JP-A-2003-229869. FIG. 42 is a diagram showing the radio communication method described in JP-A-2003-229869. With the radio communication method, radio communication apparatuses communicate with one another directly without a control station in the radio network.

In FIG. 42, the radio communication apparatuses transmit management information including timing information of the start position of their reception, reception window information, and reception cycle information, at specified time intervals (M1 to M4). The other communication apparatuses, which can receive this management information, store reception timing, reception windows, and reception cycles in association with communication apparatus numbers of the corresponding radio communication apparatuses. At the time of transmission of information, the other radio communication apparatuses find the reception start positions of the corresponding radio communication apparatus from the reception timing, the reception windows, and the reception cycles of the radio communication apparatus to be communicated and transmit the information according to this timing.

Note that during a management information exchange area (hereinafter referred to as "beacon period") (C1, C5), all the radio communication apparatuses transmit management information during the beacon slots of the respective radio communication apparatuses and so exchange the management information.

However, in the conventional method, since the beacon periods are at fixed times, a radio network system, in which it is unknown in advance how many beacons are transmitted, has problems described below. When radio communication apparatuses actually belonging to this radio network system have nodes far fewer than the number of nodes assumed in advance, there is long idle time in the beacon periods and communication efficiency is low.

Since all the nodes continue to operate in a reception waiting state in the time of the beacon periods, a beacon period longer than necessary consumes excess power. Thus, waste of power consumption increases.

Moreover, when another radio network system which adopts the same radio communication format is present near the radio network system in question, the longer the beacon period is, the more likely it is that beacons or data communication of the two radio network systems conflict with one another.

On the other hand, when the number of apparatuses joining this radio network system is larger than the number of nodes assumed in advance, empty slots of the beacons are insufficient and some of the radio communication apparatuses cannot participate in the radio network system.

DISCLOSURE OF THE INVENTION

It is an object of the invention to provide a radio communication method in which communication efficiency is high and waste of power consumption is slight even if the number of radio communication apparatuses participating in a radio network system fluctuates dynamically.

A radio communication method according to the invention is a radio communication method with which radio communication apparatuses transmit beacons in a beacon period so that the beacons do not conflict with one another, wherein in the beacon period, when a radio communication apparatus detects an empty beacon slot before the beacon slot which is a period for the radio communication apparatus to transmit its own beacon, the radio communication apparatus starts count of the specified number of super frames until the beacon slot of the radio communication apparatus moves to the empty beacon slot. Then, the radio communication apparatus adds to its beacon the moving status information notifying the other radio communication apparatuses of the movement of the beacon slot of the radio communication apparatus. Also, to the beacon the radio communication apparatus adds beacon period occupancy information that consists of the moving status information received from the other radio communication apparatuses, identifiers for specifying these radio communication apparatuses, and beacon slot positions, which are linked, and transmits the beacon in the beacon slot of the radio communication apparatus. Then, after lapse of the specified number of super frames, the radio communication apparatus moves its beacon to the empty beacon slot described above and transmits the beacon. Note that the radio communication apparatus determines the state of use of the beacon slot on the basis of the radio communication apparatus beacon movement information and beacon period occupancy information which is received.

Consequently, the radio communication apparatus can change the length of the beacon period as required. Thus, it is possible to eliminate disadvantages such as lowered communication efficiency and waste of electricity for consumption which occurs in a beacon period having a fixed length for a fixed number of nodes. Since the radio communication apparatus gives notice of the beacon slot moving status such as "start of count of the super frames", it is possible to make changes according to other beacon information transmitted in the same beacon period. Delay of one beacon period occurs in receiving beacon information sent from the next neighborhood radio communication apparatus, that is located in the 2 hops away. However, since the radio communication apparatus delays movement of its beacon slot position by time units of super frames, it is possible to accommodate this delay. Moreover, since the radio communication apparatus can also exchange beacon slot information with the next neighborhood radio communication apparatus, it is possible to prevent a beacon of the partner radio communication apparatus from conflicting with beacons of other radio communication apparatuses that are capable of communicating with the radio communication apparatus, when the beacon slot is moved.

The radio communication method according to the invention is characterized in that the count of a specified number of super frames from the beacon slot of the radio communication apparatus until the end of the beacon period skips over periods in which beacons of the other radio communication apparatuses are present.

Consequently, it is guaranteed that the radio communication apparatus that has completed count of the super frames is the only radio communication apparatus that has changed a beacon slot in that neighborhood. Therefore, it is possible to perform a cotraction operation on a beacon period without causing two radio communication apparatus moving to the same beacon slot position simultaneously.

The radio communication method according to the invention is characterized in that the specified number of super frames counted is at least 2.

Consequently, although delay of one beacon period occurs until information on a beacon emitted by a next neighborhood radio communication apparatus arrives, since the radio communication apparatus delays movement of its beacon slot position by time units of super frames, it is possible to accommodate this delay.

In the radio communication method according to the invention, when the radio communication apparatus detects a change of beacon formation, that is, the arrangement of beacon slot positions of the radio communication apparatus, based on the beacon and the beacon period occupancy information received by the radio communication apparatus, the radio communication apparatus performs detection of an empty beacon slot and movement processing for moving the beacon slot position of the radio communication apparatus to the empty slot.

Consequently, when the beacon formation is changing dynamically, it is possible to detect the change in an autonomous distributed manner and perform a cotraction operation for a beacon period.

The moving status information in the radio communication apparatus according to the invention is a count value of a movable counter that counts a specified number of super frames or a flag.

If the flag is used, data transmitted and received among the radio communication apparatuses can be limited to minimum of one bit. This makes it possible to reduce communication time.

The radio communication method according to the invention is characterized in that the radio communication apparatus secures at least the two lowest slots of the beacon formation, which includes beacon slot positions and beacon period occupancy information of respective radio communication apparatuses, as entry slots not performing data communication and, in starting transmission of a beacon notifying that an apparatus has newly joined or again joined the radio network, sends the beacon to a slot selected at random from this entry slot to be the beacon slot position of the radio communication apparatus which has joined.

Consequently, when a radio communication apparatus joins a radio network system anew or when a radio communication apparatus, the beacon slot position of which overlaps that of another radio communication apparatus due to geographical movement, joins the radio network system again by movement in the geographical position, it is possible to incorporate these radio communication apparatuses in beacon formation of the radio network system according to the same algorithm.

The radio communication method according to the invention is characterized by further including a step in which the radio communication apparatus adds beacon slot length information, and in that the radio communication apparatus receives a beacon and does not perform data communication during a period equal to the sum of the length of the entry slot and the maximum number of beacon slots (maximum beam slot length) from among neighboring radio communication apparatuses, calculated using the above slot length information. Note that the beacon slot length information includes the length of the lowest slot of beacon information recognized by the radio communication apparatus.

Consequently, even when a radio communication apparatus located near a neighboring radio communication apparatus starts transmitting a beacon at the entry slot detected there, the beacon can be received.

The radio communication apparatus according to the invention includes: a beacon receiving section that receives a beacon and extracts a frame; a frame judging section that records in the storage portion, when it is judged that the extracted frame is a beacon frame, and records beacon period occupancy information that consists of the reception slot position of the beacon, an identifier specifying the radio communication apparatus which is the transmission source of the beacon, moving status information indicating whether the radio communication apparatus which is the transmission source moves its beacon slot position which are linked, and also records the beacon period occupancy information included in the beacon frame; a beacon slot position control section that sets, when an empty beacon slot before the beacon slot of the radio communication apparatus is detected in the beacon period on the basis of all beacon period occupancy information recorded in the recording section, a counter value of a specified number of super frames until the beacon slot of the radio communication apparatus is moved to the empty beacon slots in a movable counter and commands change of the beacon slot position of the radio communication apparatus when countdown of the movable counter has finished; a beacon transmission command section that detects the slot position of the radio communication apparatus selected by the beacon slot position control section and instructs transmission of a beacon; and a frame forming section that forms, in response to the command from the beacon transmission command section, a beacon frame including the beacon period occupancy information generated from the received beacon, moving status information of the radio communication apparatus which will move, and beacon slot length information indicating a total length of a beacon slot calculated from the beacon received by the radio communication apparatus.

Consequently, it is possible to establish a radio communication apparatus that can perform a cotraction operation in an autonomous distributed manner with exchange of minimum data without causing a situation in which two radio communication apparatus move to the same beacon slot position simultaneously and can communicate with radio communication apparatus, and also can perform communication with a radio communication apparatus that moves geographically to the neighborhood of other communication apparatuses all as nodes of the same group.

The radio communication apparatus according to the invention is characterized in that the movable counter does not perform the count of the specified number of super frames from the beacon slot of the radio communication apparatus until the end of the beacon period counting a period in which beacons of the other radio communication apparatuses are present.

Consequently, it is guaranteed that the radio communication apparatus that has completed count of the super frames is the only radio communication apparatus that has changed its beacon slot in that neighborhood. Therefore, it is possible to perform a cotraction operation for a beacon period without causing a situation in which two radio communication apparatuses move to the same beacon slot position simultaneously.

The radio communication apparatus according to the invention is characterized in that the specified number of super frames counted is at least two.

Delay of one beacon period occurs until information on a beacon emitted by the next neighborhood radio communication apparatus arrives. However, since the radio communication apparatus delays movement of its beacon slot position by time units of super frames, it is possible to accommodate this delay.

In the radio communication apparatus according to the invention, when the beacon slot position control section detects a change of the beacon formation, that is, the arrangement of beacon slot positions of the radio communication apparatus, identified according to the beacon and the beacon period occupancy information received by the radio communication apparatus, the radio communication apparatus performs detection of an empty beacon slot and movement processing for moving a beacon slot position of the radio communication apparatus to the empty beacon slot.

Consequently, when the radio communication apparatus is under a situation in which the beacon formation is changed dynamically, it is possible to detect the change in an autonomous distributed manner and perform a cotraction operation for a beacon period.

In the radio communication apparatus according to the invention, the moving status information is a counter value of a movable counter that counts the specified number of super frames or a flag.

Consequently, when the flag is used, transmission and reception data among the radio communication apparatuses can be limited to as little as one bit. This makes it possible to reduce communication time.

The radio communication apparatus according to the invention is characterized in that the frame construction portion secures at least the two lowest slots of a beacon formation, as entry slots not performing data communication and, in starting transmission of a beacon which gives notice of an apparatus joining the radio network anew or again, the beacon slot position control section instructs the beacon transmission command section that a slot selected at random from among the entry slots is the beacon slot position of the radio communication apparatus.

Consequently, when a radio communication apparatus joins a radio network system anew or when a radio communication apparatus, the beacon slot position of which overlaps those of the other radio communication apparatuses, joins the radio network system again by movement in the geographical position, it is possible to incorporate these radio communication apparatuses in a beacon formation of the radio network system according to the same algorithm.

The radio communication apparatus according to the invention is characterized in that the frame judging section receives a beacon during a period that is calculated by adding the length of the entry slot and the maximum beacon slot length taken from the beacon slot length information received from neighboring radio communication apparatuses, and the frame forming section does not perform data communication during this period.

Consequently, when a radio communication apparatus near the radio communication apparatuses located in the neighborhood which is joining the radio network system anew starts transmitting a beacon in the entry slot detected there, the beacon can be received by the other radio communication apparatuses.

In the radio communication method according to the invention, the moving status information further includes movement destination slot position information indicating the planned destination of the beacon slot of the radio communication apparatus, and, when the radio communication apparatus detects that there is a empty beacon slot other than that designated by the movement destination slot position information of the other radio communication apparatuses which transmit their beacons during the time from the beacon slot of the radio communication apparatus in question until the end of the beacon period, the radio communication apparatus selects any one of these empty beacon slots, notifies the other radio communication apparatuses that this empty beacon slot will be the movement destination beacon slot position of the radio communication apparatus in question, and starts count of the specified super frames.

Consequently, even if the radio communication apparatuses conflict with each other for each movement destination beacon slot, it is possible to move plural beacons to a positions in a shortened beacon period in the countdown of one cycle.

In the radio communication method according to the invention, when one radio communication apparatus selects the highest of the empty beacon slots, if that radio communication apparatus is not in the lowest slot, a second and succeeding radio communication apparatuses successively select the next highest empty slot in the next super frame until a radio communication apparatus is in the lowest slot.

Consequently, radio communication apparatuses are capable of moving into beacon slots in or in tandem, taking the highest empty slots first.

Alternatively, in a radio communication method according to the invention, the radio communication apparatus selects an arbitrary beacon slot among empty beacon slots.

Consequently, unlike a method in which beacons confirm the movement destinations of one another and sequentially select the beacons, it is possible to start plural cotraction operations at a time.

In the radio communication method according to the invention, the radio communication apparatus that is counting up to the specified number of super frames detects, when its own counter value is the maximum value, other radio communication apparatuses having maximum counter value are detected from the moving status information or other radio communication apparatuses having the maximum counter value are detected from beacon period occupancy information. Also, when the counter value of the radio communication apparatus is a maximum value −1, the radio communication apparatus detects other radio communication apparatuses from the moving status information. Moreover, when a counter value of the radio communication apparatus is neither the maximum value nor the maximum value −1, the radio communication apparatus detects other radio communication apparatuses having the identical counter value from the moving status information or detects other radio communication apparatuses having a value of equal to its own counter value +1 from the beacon period occupancy information. Note that, when the radio communication apparatus detects radio communication apparatuses satisfying any one of these conditions, the radio communication apparatus in the lowest slot position among the radio communication apparatuses continues the count. The other radio communication apparatuses are reset to the specified counter value.

Consequently, the radio communication apparatus can always select empty slots appropriately and shorten a beacon period efficiently. Namely the plural beacons can move to the empty slots in one countdown cycle like a software pipeline process.

In the radio communication method according to the invention, when the radio communication apparatus receives the beacon period occupancy information of another apparatus having the maximum counter value or a counter value identical with a counter value of the radio communication apparatus that is other than 0, the radio communication apparatus stops the count and resets the counter value of the radio communication apparatus to the maximum value.

Consequently, when the next neighborhood radio communication apparatus attempts to move in parallel to the radio communication apparatus in a software pipeline manner with a difference of one super frame between them, it is possible to prevent both the radio communication apparatuses from entering the same beacon slot accidentally.

The radio communication method according to the invention is characterized in that the empty beacon slot to which the beacon slot of the radio communication apparatus moves is the highest empty beacon slot.

Consequently, the radio communication apparatus can perform a series of cotraction operations at higher speed.

In the radio communication apparatus according to the invention, the moving status information further includes movement destination slot position information indicating the planned destination of the beacon slot position of the radio communication apparatus. When there is an empty beacon slot other than beacon slots designated by the movement destination slot position information of the other radio communication apparatuses that transmit beacons from their respective beacon slots until the end of a beacon period, the beacon slot position control section records that empty beacon slot as its movement destination beacon slot position in the moving status information, that the empty beacon slot is planed as the beacon slot movement destination, of the radio communication apparatuses stored in a recording section and sets the specified count in the movable counter. Then, the frame forming section forms a beacon frame including the moving status information of the radio communication apparatus recorded in the recording section.

Consequently, the radio communication apparatus can notify the other radio communication apparatuses of the movement destination of the beacon slot of the radio communication apparatus and detect movement destination slots to which the other radio communication apparatuses plan to move. Thus, even if there is a radio communication apparatus planning to move in a slot position lower than the radio communication apparatus in question, the radio communication apparatus can perform processing for movement of its beacon slot position to another empty slot, avoiding collision with the other movement destination slot moving in tandem.

In the radio communication apparatus according to the invention, the beacon slot position control section designates the highest beacon slot among empty slots other than beacon slots to which the other radio communication apparatuses, which transmits beacons from their beacon slots s until the end of the beacon period, plan to move.

Consequently, the radio communication apparatus is capable of moving beacon slots in or in tandem, from empty slot downward.

As described above, according to the invention, it is possible to make a beacon period dynamically variable in length according to an autonomous distributed algorithm of the radio communication apparatus of the radio network system while minimizing conflict of beacons. Consequently, even if the number of radio communication apparatuses joining the radio network system fluctuates dynamically, it is possible to perform radio communication with high communication efficiency and less waste of consumed electricity.

BRIEF DESCRIPTION OF THE DRAWINGS

FIG. 4 is a diagram showing a format of a beacon slot state table according to the first embodiment of the invention.

FIG. 7A is a diagram showing the slot state at the time when the radio communication apparatus joins a radio network according to the first embodiment of the invention.

FIG. 7B is a diagram showing the slot state at the time when the radio communication apparatus joins the radio network according to the first embodiment of the invention.

FIG. 7C is a diagram showing the slot state at the time when the radio communication apparatus joins the radio network according to the first embodiment of the invention.

FIG. 8A is a diagram showing the slot state at the time when the radio communication apparatus moves a slot position after joining the radio network according to the first embodiment of the invention.

FIG. 8B is a diagram showing the slot state at the time when the radio communication apparatus moves a slot position after joining the radio network according to the first embodiment of the invention.

FIG. 9A is a diagram showing the slot state at the time when the radio communication apparatus is not in the neighborhood any more according to the first embodiment of the invention.

FIG. 9B is a diagram showing the slot state at the time when the radio communication apparatus is not in the neighborhood any more according to the first embodiment of the invention.

FIG. 9C is a diagram showing the slot state at the time when the radio communication apparatus is not in the neighborhood any more according to the first embodiment of the invention.

FIG. 10A is a diagram showing the slot state according to the first embodiment of the invention at the time when a cotraction operation for a beacon period is completed after the radio communication apparatus is not in the neighborhood any more.

FIG. 10B is a diagram showing the slot state according to the first embodiment of the invention at the time when a cotraction operation for a beacon period is completed after the radio communication apparatus is not in the neighborhood any more.

FIG. 10C is a diagram showing a slot state according to the first embodiment of the invention at the time when a cotraction operation for a beacon period is completed after the radio communication apparatus is not in the neighborhood any more.

FIG. 11 is a diagram of the arrangement of moving radio communication apparatuses according to the first embodiment of the invention.

FIG. 12A is a diagram showing a state of use of slots of the radio communication apparatus according to the first embodiment of the invention.

FIG. 12B is a diagram showing a state of use of slots of the radio communication apparatus according to the first embodiment of the invention.

FIG. 13A is a diagram showing a state of use of slots of the radio communication apparatus according to the first embodiment of the invention.

FIG. 13B is a diagram showing a state of use of slots of the radio communication apparatus according to the first embodiment of the invention.

FIG. 14A is a diagram showing a state of use of slots of the radio communication apparatus according to the first embodiment of the invention.

FIG. 14B is a diagram showing a state of use of slots of the radio communication apparatus according to the first embodiment of the invention.

FIG. 15A is a diagram showing a state of use of slots of the radio communication apparatus according to the first embodiment of the invention.

FIG. 15B is a diagram showing a state of use of slots of the radio communication apparatus according to the first embodiment of the invention.

FIG. 20A is a diagram showing a state of use of slots in a cotraction operation of the radio communication apparatus according to the second embodiment of the invention.

FIG. 20B is a diagram showing a state of use of slots in a cotraction operation of the radio communication apparatus according to the second embodiment of the invention.

FIG. 20C is a diagram showing a state of use of slots in a cotraction operation of the radio communication apparatus according to the second embodiment of the invention.

FIG. 21A is a diagram showing a state of use of slots in a cotraction operation of the radio communication apparatus according to the second embodiment of the invention.

FIG. 21B is a diagram showing a state of use of slots in a cotraction operation of the radio communication apparatus according to the second embodiment of the invention.

FIG. 22A is a diagram showing a state of use of slots in a cotraction operation of the radio communication apparatus according to the second embodiment of the invention.

FIG. 22B is a diagram showing a state of use of slots in a cotraction operation of the radio communication apparatus according to the second embodiment of the invention.

FIG. 24A is a diagram showing a state of use of slots in a cotraction operation of the radio communication apparatus according to the third embodiment of the invention.

FIG. 24B is a diagram showing a state of use of slots in a cotraction operation of the radio communication apparatus according to the third embodiment of the invention.

FIG. 24C is a diagram showing a state of use of slots in a cotraction operation of the radio communication apparatus according to the third embodiment of the invention.

FIG. 24D is a diagram showing a state of use of slots in a cotraction operation of the radio communication apparatus according to the third embodiment of the invention.

FIG. 24E is a diagram showing a state of use of slots in a cotraction operation of the radio communication apparatus according to the third embodiment of the invention.

FIG. 27 is a diagram showing a format of a beacon slot state table according to the third embodiment of the invention.

FIG. 42 is a diagram showing a conventional radio communication method.

DESCRIPTION OF REFERENCE NUMERALS AND SIGNS

Figure 1:
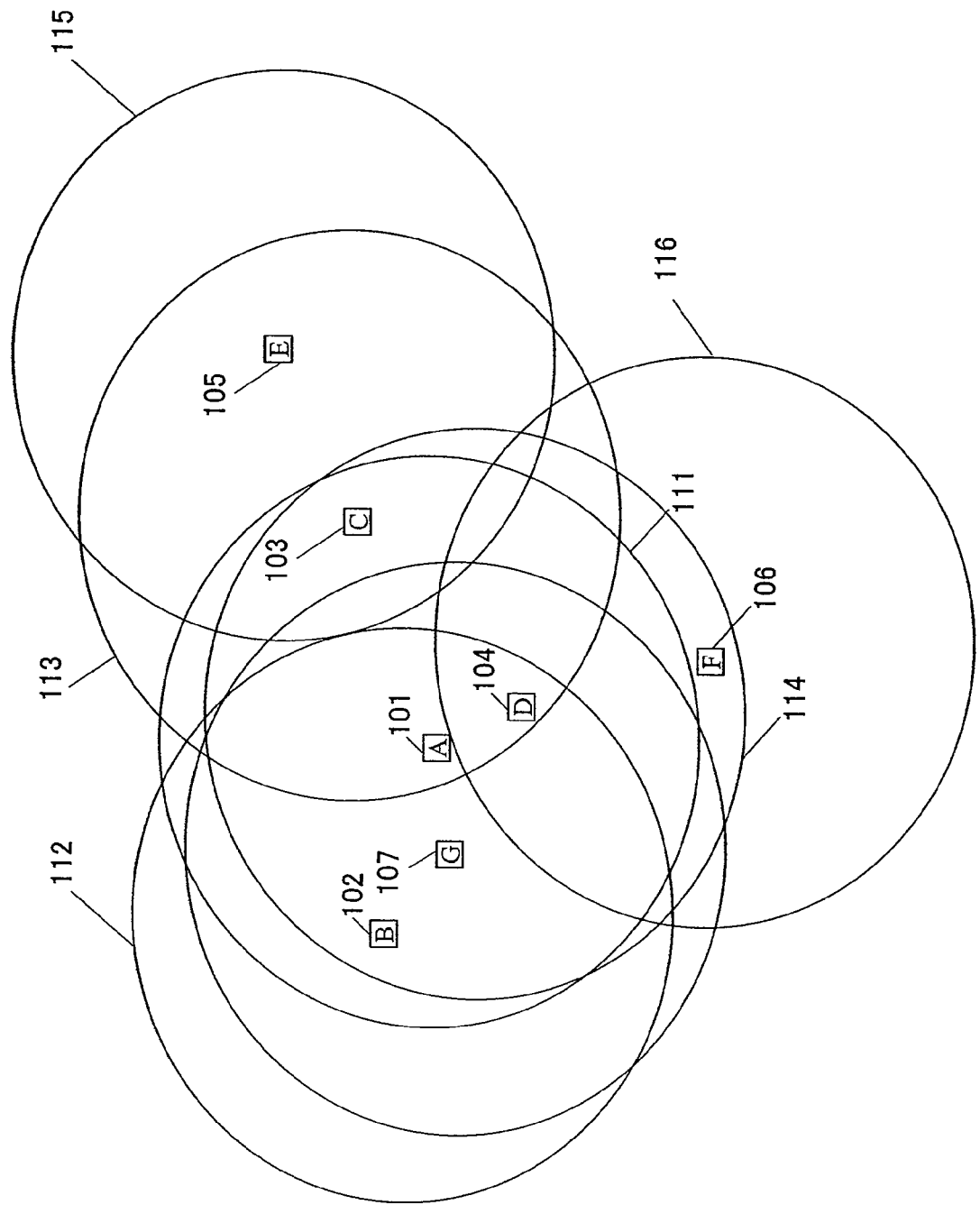
FIG. 1 is an arrangement diagram of radio communication apparatuses forming a constitution of a radio network system according to a first embodiment of the invention.

101 to 107, 1101 to 1105, 1601 to 1604, 1901 to 1905, 2901 to 2908: Radio communication apparatuses
111 to 116, 1111 to 1115, 1611 to 1614, 1911 to 1915, 2911 to 2918: Communication areas
200: Antenna
201: Radio L1 processing section
202: Frame judging section
203: Recording section
204: Upper layer processing section
205: Beacon slot position control section
206: Moving counter
207: Frame forming section
208: Beacon transmission command section
2501 to 2503: Moving networks

BEST MODE FOR CARRYING OUT THE INVENTION

First Exemplary Embodiment

FIG. 1 is a diagram showing an arrangement of radio communication apparatuses forming a constitution of a radio network system carrying out the invention.

In FIG. 1, the radio communication apparatuses A (101) to F (106) are capable of transmitting and receiving information to one another in the range of the 7 communication areas 111 to 116. In other words, the radio communication apparatus A (101) can communicate with the radio communication apparatuses B (102), C (103), and D (104), the radio communication apparatuses B (102) can communicate with the radio communication apparatuses A (101) and D (104), the radio communication apparatus C (103) can communicate with A (101), D (104), and E (105), the radio communication apparatus D (104) can communicate with the radio communication apparatuses A (101), B (102), C (103), and F (106), and the radio communication apparatus E (105) can communicate with the radio communication apparatus C (103). Note that it is assumed that the radio communication apparatus G (107) does not belong to this radio network at first.

Figure 2:
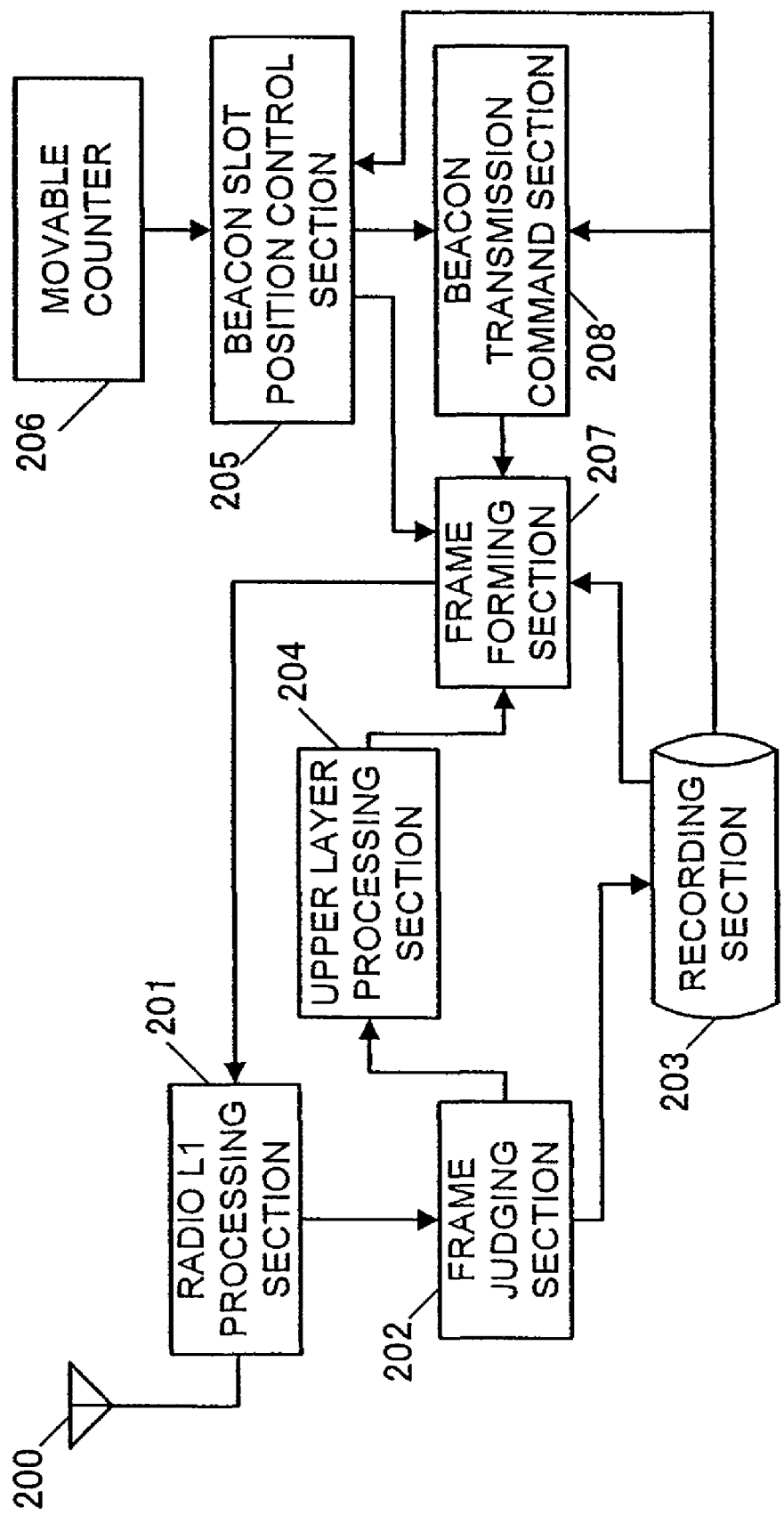
FIG. 2 is a block diagram showing a constitution of a radio communication apparatus according to the first embodiment of the invention.

FIG. 2 is a block diagram showing a constitution of these radio communication apparatuses.

In FIG. 2, a radio L1 processing section 201 converts an analog signal received from an antenna 200 into a digital signal, generates a frame, converts the frame into an analog signal, and sends the analog signal from the antenna 200. This antenna 200 is a non-directional antenna, which emits a radio wave. This radio L1 processing section 201 corresponds to the beacon receiving section according to the invention.

A frame judging section 202 judges whether a frame received by the radio L1 processing section 201 is a beacon frame or a data frame.

Figure 3:
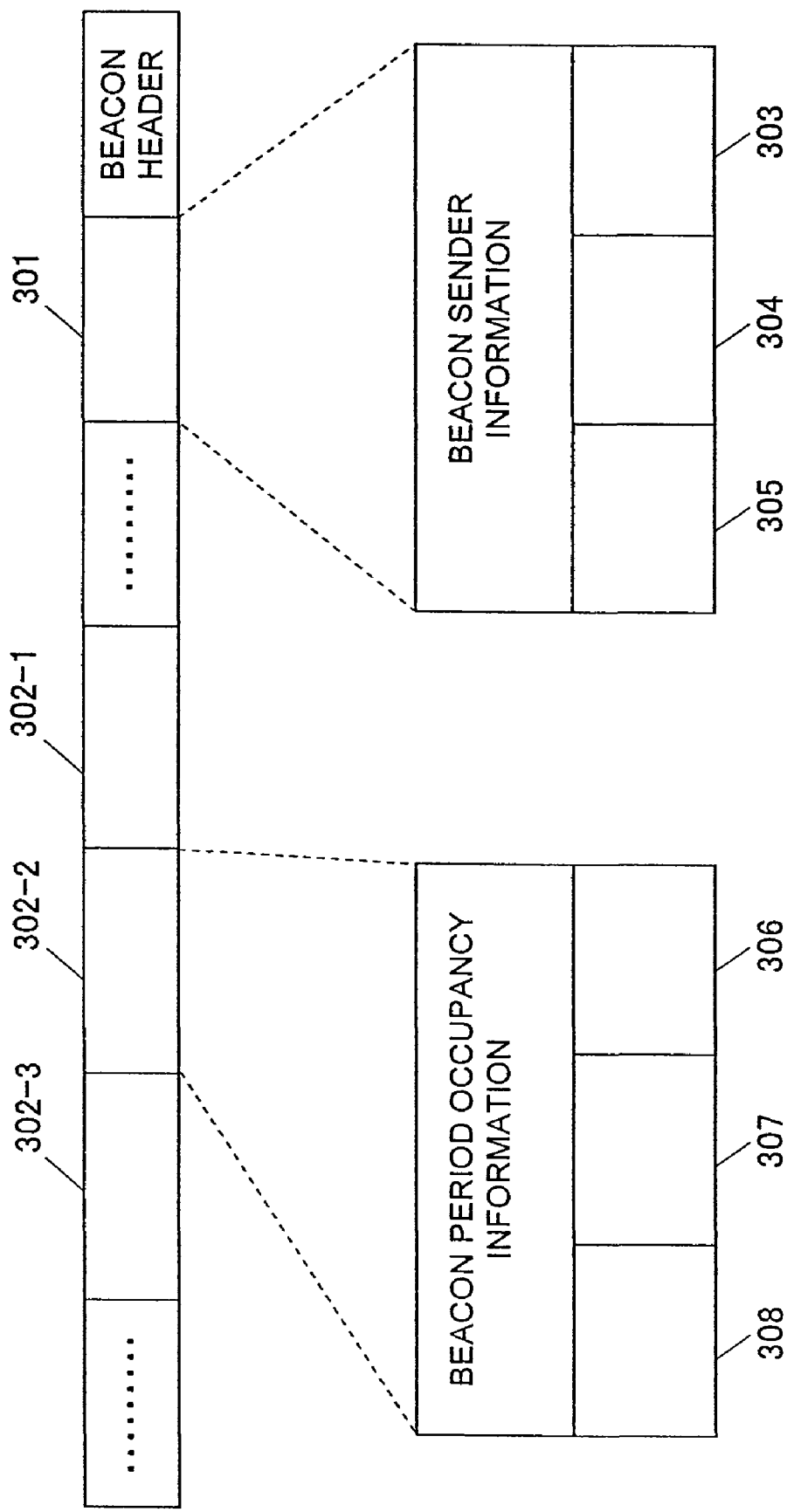
FIG. 3 is a diagram showing a constitution of a beacon frame according to the first embodiment of the invention.

FIG. 3 is a diagram showing a constitution of a beacon frame in this beacon period.

In FIG. 3, in beacon sender information 301, a device ID of the radio communication apparatus transmitting this beacon is entered in a device ID 303, a counter value of a movable counter 206 described later is entered in a counter 304, and a beacon slot length grasped by the radio communication apparatus transmitting this beacon is entered in a beacon slot length 305. In beacon period occupancy information 302, a device ID and a counter value, which are entered in the beacon sender information 301 in a beacon frame received by this radio communication apparatus in the immediately preceding super frame, are entered for each beacon in a device ID 306 and a counter 307, respectively, and the slot position of the received beacon is entered in a beacon slot position 308.

A recording section 203 records occupancy states of the respective beacon slots included in the beacon sender information 301 and the beacon period occupancy information 302.

FIG. 4 shows a format of a beacon slot state table recorded in the recording section 203.

In FIG. 4, for each slot of a beacon, a slot number 401, the device ID 402 of a radio communication apparatus using the slot, a state of use 403 of slots, and the type register 404 of the slot are recorded. This state of use 403 of slots indicates whether a radio communication apparatus in the slot position plans to change the slot position. Values of the counters 304 and 307 are set in the state of use 403 of slots. The type of slot 404 indicates whether a beacon has been received in that slot (indicated by "Beacon" in the figure) or it is notified that the slot is occupied by beacon period occupancy information (indicated by "BPOIE" in the figure).

The upper layer processing section 204 performs protocol processing for layers as high as or higher than a network layer.

The beacon slot position control section 205 checks the beacon slot state table recorded in the recording section 203 and, if there are empty slots toward the beginning of the beacon period, performs processing for moving the slot position of the radio communication apparatus.

The movable counter 206 counts super frames until movement of a beacon slot position of the radio communication apparatus is started. Usually, a value of 2 or more is set in the movable counter 206.

The frame forming section 207 reads out necessary information from the recording section 203 and generates the beacon period occupancy information 302. Further, the frame forming section 207 generates the beacon sender information 301 on the basis of information from the beacon position control section 205 and forms a beacon frame which includes management information. In addition, the frame forming section 207 receives data from the upper layer processing section 204 and forms a data frame.

The beacon transmission command section 208 has a timer function for counting offset time and detects the radio communication apparatus' own slot position in the beacon period. Then, the beacon transmission command section 208 gives to the frame forming section 207 the timing for sending the formed frame to the radio L1 processing section 201.

Operations and actions of the radio communication apparatus constituted as described above for moving a beacon slot will be explained.

Figure 5:
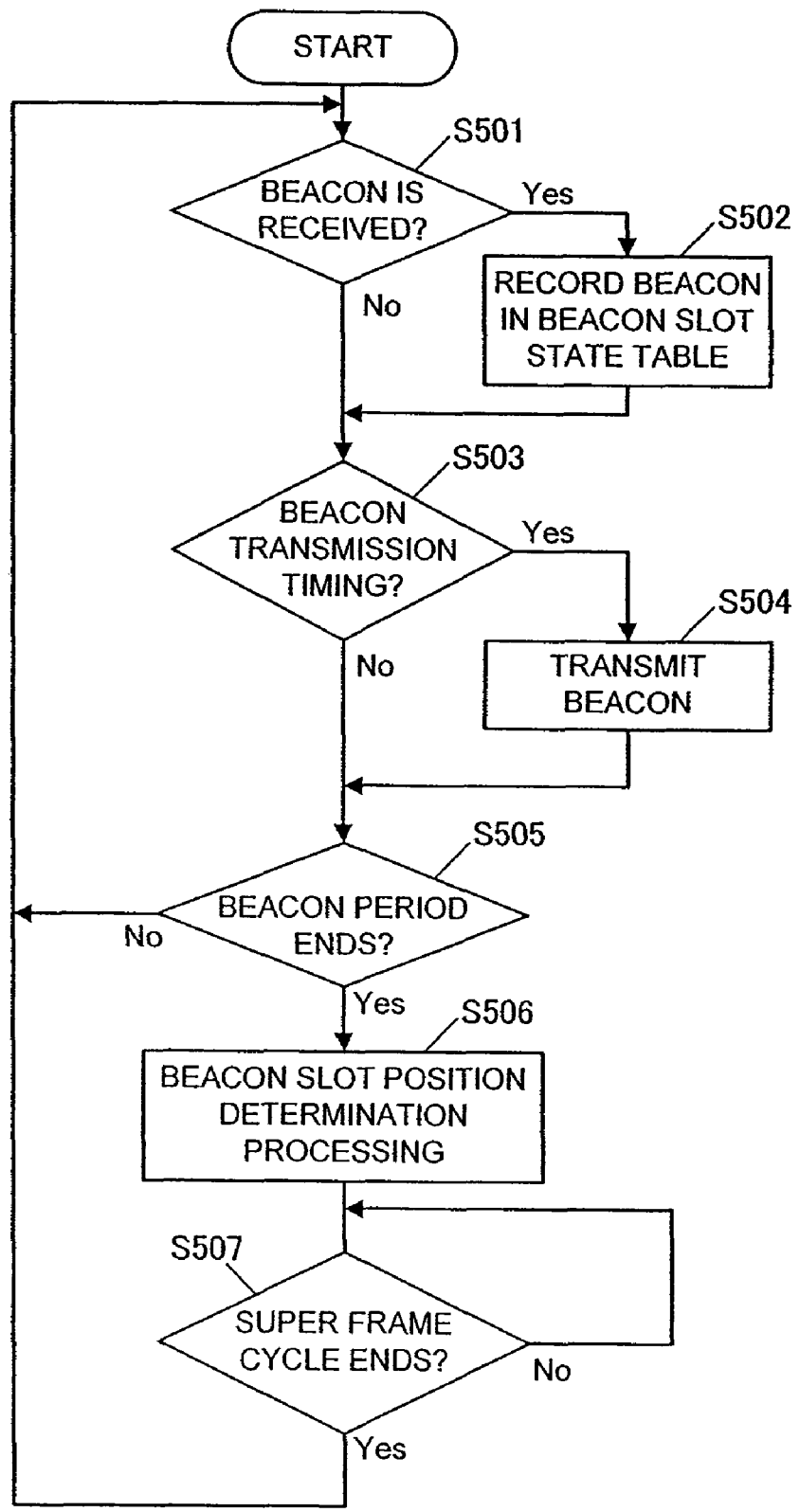
FIG. 5 is a flow diagram showing a beacon period cotraction operation according to the first embodiment of the invention.

FIG. 5 is a flow diagram showing a cotraction operation for a beacon period performed by the radio communication apparatus according to this embodiment.

First, the frame judging section 202 judges whether a frame received from another radio communication apparatus is a beacon frame (step S501).

When it is judged that the frame is a beacon frame, the frame judging section 202 records the device ID 303 and the counter value 304 included in the received beacon sender information 301 together with the device ID 402 and the state of slot use 403 of the device ID 402 entered in the beacon slot state table recorded in the recording section 203, at the slot number of the slot where the beacon was received. The frame judging section 202 sets beacon reception (Beacon) in the type register 404 (step S502).

In addition, the frame judging section 202 records values of the device ID 306 and the counter 307 together with the device ID 402 and the state of use 403 of slots described at the slot number corresponding to the beacon slot position 308 in the beacon period occupancy information 302 in the received beacon frame. The frame judging section 202 sets beacon period occupancy information (BPOIE) in the type register 404. Note that the recording in the beacon slot state table based on the beacon period occupancy information 302 is performed for all of the beacon period occupancy information 302 in this beacon frame.

The beacon transmission command section 208 judges whether a slot position is the slot position for it to transmit its beacon (step S503) and, when it is the time for transmission, commands the frame forming section 207 to transmit the beacon frame (step S504).

On the other hand, when it is not the time for transmission, the beacon transmission command section 208 judges whether the beacon period has elapsed (step S505) and, when the beacon period has not elapsed, returns to step S501. In this way, processing from step S501 to step S505 is repeated until the end of the beacon period, whereby slot states for all beacon frames received during the beacon period are recorded in the recording section 203.

Note that this beacon period is a length calculated by adding three entry slots to the maximum beacon slot length 305 among all those received in the beacon sender information 301. This entry slot is a slot in which a radio communication apparatus, which has joined a network anew or has joined again, transmits a beacon. One of the three slots is selected arbitrarily as the entry slot. Consequently, it is possible to reduce a probability of conflict of first beacons at the time when plural radio communication apparatus joining the network anew are present simultaneously.

The radio communication apparatus according to the invention can also learn the slot state of a next neighborhood radio communication apparatus on the basis of the beacon period occupancy information 302.

In step S505, when end of the beacon period has come, the beacon slot position control section 205 performs beacon slot position determination processing (step S506).

Next, the frame judging section 202 waits until a super frame ends and returns to step S501 at a point when this cycle ends (step S507).

The beacon slot position determination processing will be explained below.

Figure 6:
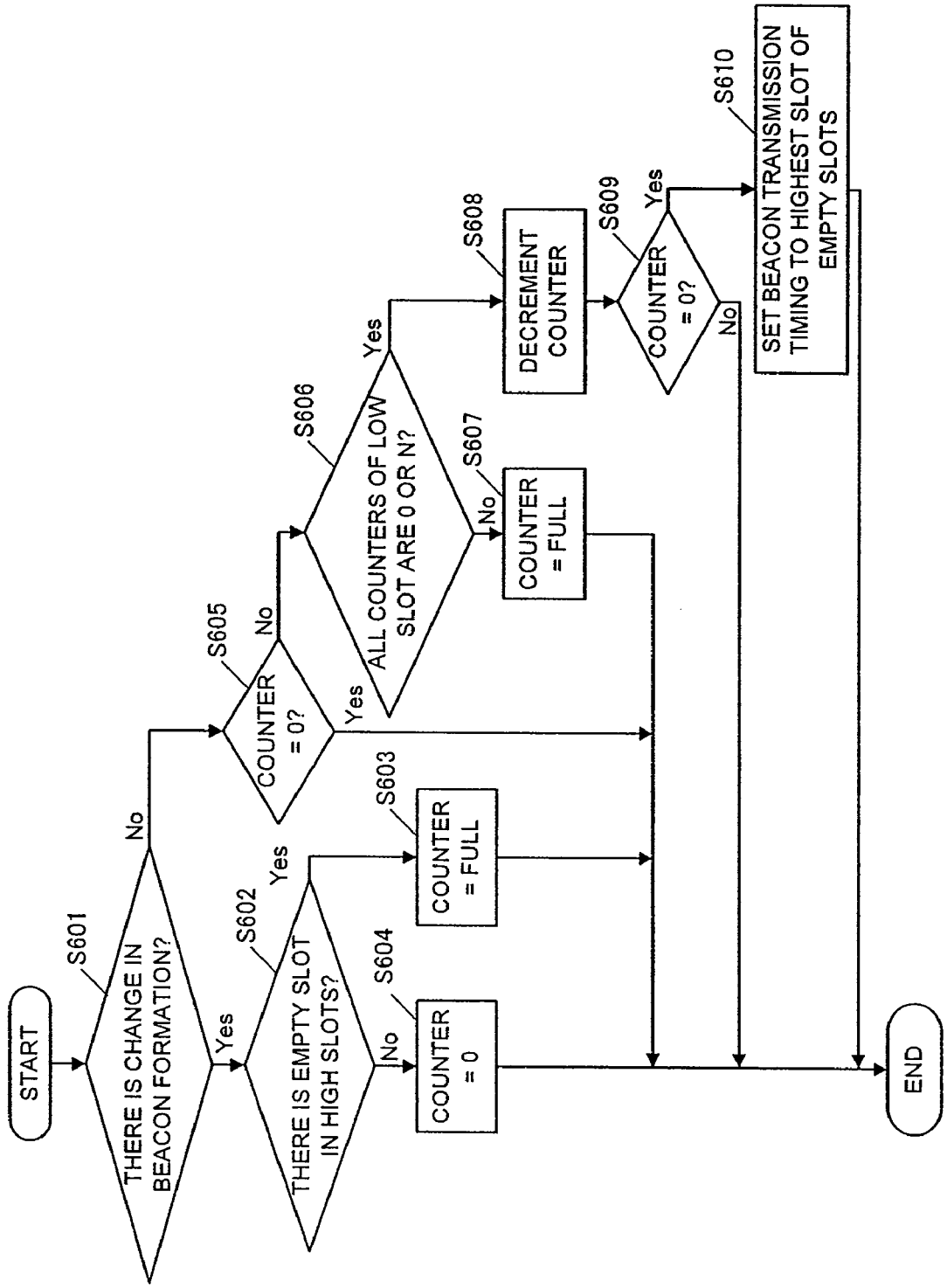
FIG. 6 is a flow diagram showing beacon slot position determination processing according to the first embodiment of the invention.

FIG. 6 is a flow diagram showing the beacon slot position determination processing of the radio communication apparatus.

First, the beacon slot position control section 205 checks whether there is a change in a constitution of a beacon slot (hereinafter referred to as "beacon formation") compared to the last time, referring to the beacon slot state table recorded in the recording section 203 (step S601). When there is a change in the beacon formation, the beacon slot position control section 205 checks whether there is an empty slot in higher slots (slots closer to the top) (step S602). When there is an empty slot, the beacon slot position control section 205 resets the counter to the maximum counter value (hereinafter described to as "FULL"; the maximum value is set to '3' in this embodiment) in the movable counter 206 (step S603). When there is no empty slot, the beacon slot position control section 205 sets the movable counter 206 to '0' (step S604).

On the other hand, when there is no change in the beacon formation compared to the last time in step S601, the bacon slot position control section 205 starts countdown of the movable counter 206. The beacon slot position control section 205 judges whether the movable counter 206 is '0'. When the movable counter 206 is '0', since there is no empty slot in the higher slots, the beacon slot position control section 205 ends the processing (step S605).

On the other hand, when the movable counter 206 is 1 or higher, the beacon slot position control section 205 checks in the beacon slot state table for the states of use 403 of slots lower than the beacon slot of the radio communication apparatus (step S606).

When at least one of the states of use 403 is not '0', the beacon slot position control section 205 judges that another beacon slot position control section has started countdown for beacon slot position change and has preference. The beacon slot position control section 205 sets Full ('3' in this embodiment) in the movable counter 206 and holds the value (step S607). Since a radio communication apparatus in a lower beacon slot position has a priority of beacon slot position movement in this way, it is possible to reduce useless repetition of processing for movement to an empty slot. Note that, although the movable counter 206 is reset to Full, it is also possible to reset the movable counter 206 to 0. In this case, there is an advantage that it is possible to execute shortening of beacon periods involving apparatuses located geographically apart from each other, simultaneously. However, it is also likely that the number of super frame cycles is increased by one for the shortening, resulting in an increase in the time required for shortening.

On the other hand, when all the low slots are 0, since the radio communication apparatus in question has the highest priority for beacon slot position movement, the beacon slot position control section 205 counts down the movable counter 206 (step S608). Then, at a point when the counter value changes to 0 (step S609), in order to move the beacon slot position to the highest beacon slot that the radio communication apparatus has found to be empty, the beacon slot position control section 205 sets "time for beacon transmission" in the timer function of the beacon transmission command section 208 (step S610).

As described above, when there is an empty slot higher than the radio communication apparatus and there is no radio communication apparatus which plans to move and which is lower than the radio communication apparatus in question, the beacon slot position control section 205 moves the beacon slot position to the higher slot. Thus, it is possible to reduce a beacon period (hereinafter referred to as "cotraction operation"). Consequently, the beacon period is adjusted to the minimum length required for the number of radio communication apparatuses belonging to the radio network system.

The change of a slot position from a low slot to a high slot is performed three cycles of a super frame after the beacon slot position control section 205 decides to make the change. Thereafter, the beacon slot position control section 205 can grasp the beacon position of a radio communication apparatus in a position one hop apart from the radio communication apparatus in question on the basis of the beacon period occupancy information. Therefore, the beacon slot position control section 205 moves a beacon slot position of the radio communication apparatus to a high empty slot while avoiding the slot position. Thus, it is possible to avoid conflict of slot positions with the radio communication apparatus at positions one hop apart.

Note that, although the reset value of the movable counter is set to 3 in this embodiment, the reset value is not limited to this and the same advantage can be obtained if the reset value is equal to or larger than 2. However, it is preferable to set the reset value to 3 or more taking into account the possibility that a radio communication apparatus determined not to be present in one within the period of one hop actually had moved in into one hop just during the process of searching for beacons.

Figure 16:
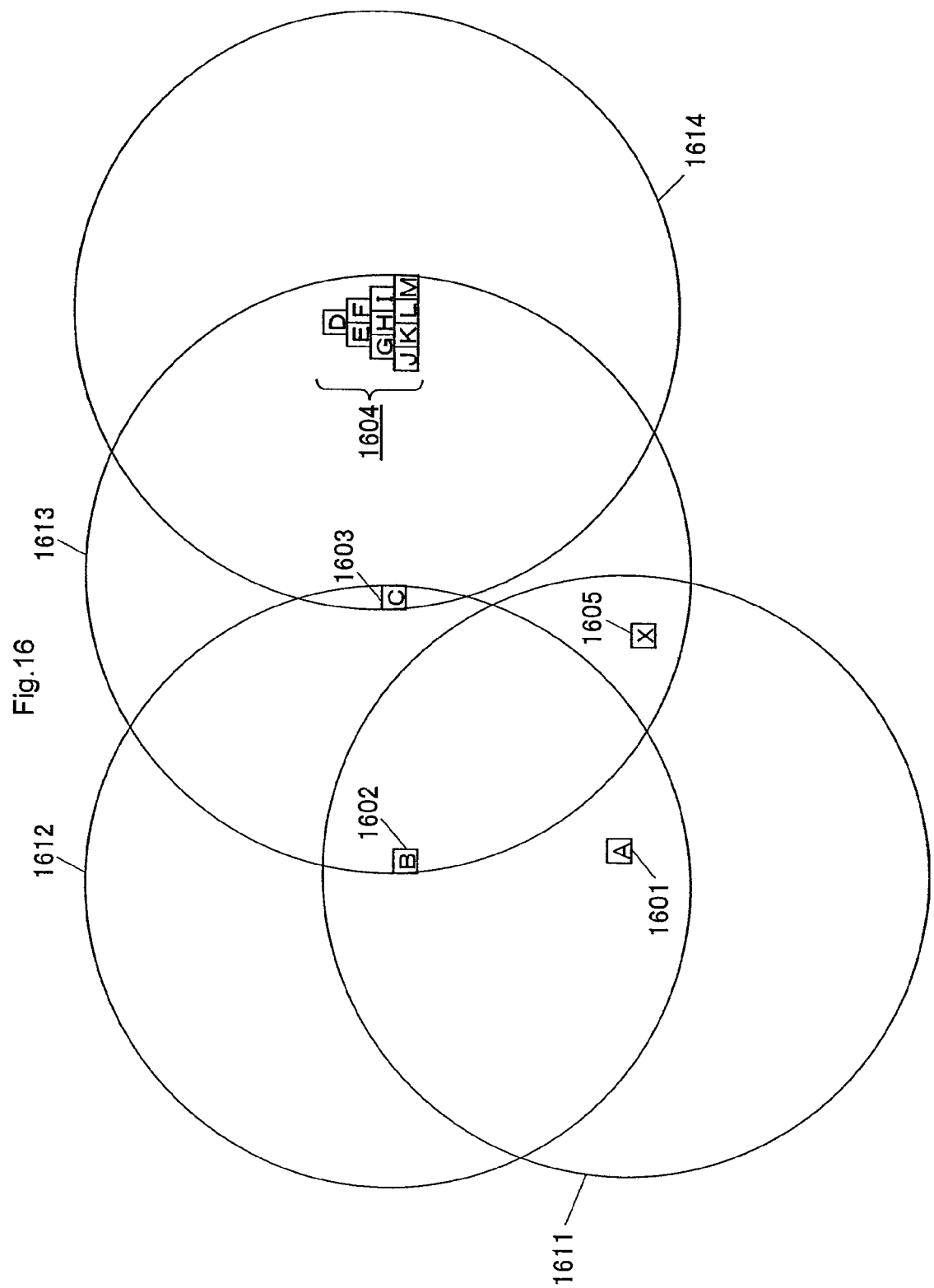
FIG. 16 is a diagram of the arrangement of radio communication apparatuses according to the first embodiment of the invention.

Moreover, since the beacon slot position determination processing explained in step S506 is performed, it is possible to detect a radio communication apparatus joining the radio network system anew in radio communication apparatus even if it has the positional relation as shown in FIG. 16.

Figure 17A:
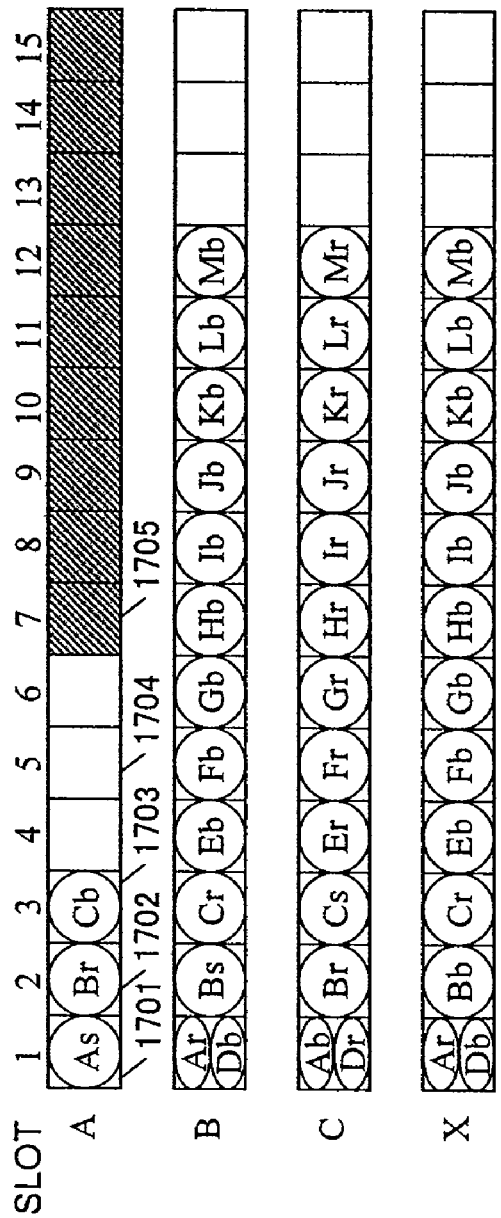
FIG. 17A is a diagram showing a state of use of slots of the radio communication apparatus according to the first embodiment of the invention.
Figure 17B:
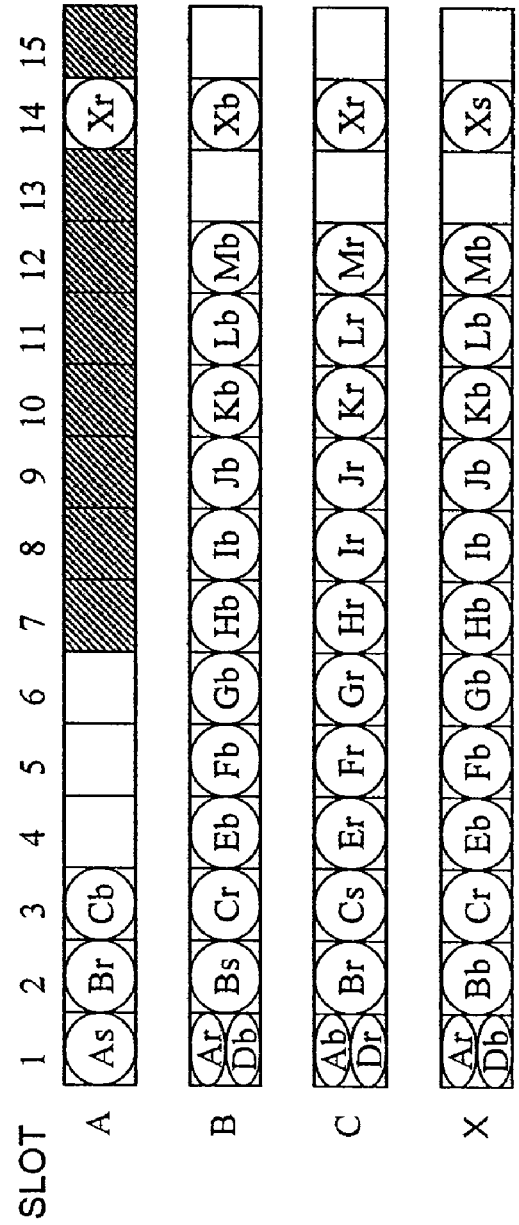
FIG. 17B is a diagram showing a state of use of slots of the radio communication apparatus according to the first embodiment of the invention.

In FIG. 16, a radio communication apparatus A (1601) is capable of communicating with a radio communication apparatus B (1602) in a communication area 1611. The radio communication apparatus B (1602) is capable of communicating with the radio communication apparatus A (1601) and a radio communication apparatus C (1603) in a communication area 1612. The radio communication apparatus C (1603) is capable of communicating with the radio communication apparatus B (1602) and radio communication apparatuses D to M (1604) in a communication area 1613. Note that the radio communication apparatuses A to M transmit beacons in the first through the twelfth slots, respectively. FIGS. 17A and 17B are diagrams showing using states of slots for each of the radio communication apparatuses.

In FIG. 17A, a slot 1701 indicates that the radio communication apparatus A is transmitting a beacon in this slot position. A slot 1702 indicates that the radio communication apparatus A is receiving in this slot position a beacon transmitted from the radio communication apparatus B. A slot 1703 indicates that the radio communication apparatus A has been notified at this slot position that a beacon has been transmitted from the radio communication apparatus C, as learned from beacon period occupancy information. Slot 1704 are empty slots, indicating that they are extra slots. Note that this method of representation is the same in FIGS. 7 to 10, FIG. 12 to 15, FIGS. 20 to 22, and FIGS. 31 to 41. An extra slot means a slot, of a length calculated by adding the length of an entry slot to the maximum beacon slot length among radio communication apparatuses in the neighborhood learned from slot length information 305, to which the length of the beacon slot of the apparatus in question is added in that it may serve as a protective area in which transmission and reception of data are not performed.

The radio communication apparatus A (1601) learns from the beacon sender information 301 and the beacon period occupancy information 302 from the radio communication apparatus B (1602), that second and third slots are used by beacons of the radio communication apparatus B and the radio communication apparatus C. The radio communication apparatus B learns, on the basis of the beacon sender information 301 and the beacon period information 302 of the radio communication apparatuses A and C, that the first and the third through the twelfth slots are used.

At this point, the radio communication apparatus A adds nine extra slots in a beacon period on the basis of the beacon slot length data 305 from the radio communication apparatus B. Therefore, with the addition of the three slots to serve as entry slots, the radio communication apparatus A is in a beacon waiting state until the fifteenth slot. Therefore, when a radio communication apparatus X (1605) transmits a beacon for joining the radio network system at the fourteenth slot at the geographical point shown in FIG. 16 in the communication areas 1611 and 1612 of the radio communication apparatuses A and C, the radio communication apparatus A can receive this beacon as shown in FIG. 17B. If the radio communication apparatus A does not use the beacon slot length data 305 from the radio communication apparatus B for determination of a beacon period and does not add extra slots, the radio communication apparatus A recognizes the slots up to the sixth slot as one beacon period and does not receive beacons after the sixth slot. Therefore, the radio communication apparatus A cannot detect the radio communication apparatus X that has joined the radio network system anew.

In this way, since the radio communication apparatus according to the invention determines a beacon period using the beacon slot length data in the beacon sender information, it is possible to detect a beacon of a radio communication apparatus joining the radio network system anew.

Operations at the time when a radio communication apparatus G (107) has joined the radio network system anew in the case in which the radio communication apparatuses A (101) to F (106) have the positional relation shown in FIG. 1 will be explained with reference to FIGS. 7A, 7B, and 7C to FIGS. 10A, 10B, and 10C.

FIG. 7A shows a state of use of respective beacon slots in the radio communication apparatuses A (101) to F (106) before the radio communication apparatus G (107) joins the radio network system.

In FIG. 7A, the radio communication apparatus A is transmitting a beacon As in the first beacon slot, the radio communication apparatus B is transmitting a beacon Bs in the second beacon slot, the radio communication apparatus C is transmitting a beacon Cs in the third beacon slot, the radio communication apparatus D is transmitting a beacon Ds in the fourth beacon slot, the radio communication apparatus E is transmitting a beacon Es in the second beacon slot, and the radio communication apparatus F is transmitting a beacon Fs in the fifth beacon slot.

For example, the radio communication apparatus A indicates that the radio communication apparatus A is receiving beacons (Br to Dr) of the radio communication apparatuses B to D, which are in the communication area of the radio communication apparatus A, in the second to the fourth slots. Moreover, the radio communication apparatus A knows from beacon occupancy information Eb obtained from a beacon from the radio communication apparatus C that a beacon of the next neighborhood radio communication apparatus E is being transmitted at that second slot and knows from beacon period occupancy information Fb obtained from a beacon from the radio communication apparatus D that a beacon of the next neighborhood radio communication apparatus F is being transmitted in the fifth slot.

The radio communication apparatus A secures the sixth through the eighth slots as entry slots so that, even if a new radio communication apparatus transmits a beacon, the radio communication apparatus A can receive the beacon. An extra slot is provided in the radio communication apparatus E. Since the radio communication apparatus E has been notified in the beacon slot length information sent by the radio communication apparatus C that the maximum length is 7, one extra slot is provided in the radio communication apparatus E.

The beacon slot length information will be explained. In a radio network system in which a beacon period is shared in an autonomous distributed manner to transmit beacons, beacon slots have to be allocated such that two or more radio communication apparatuses do not communicate in the same beacon slot. However, this means that, in the case of radio communication apparatuses sharing the same beacon slot, it is impossible to judge which of the radio communication apparatuses should use the beacon slot. Therefore, it is necessary to have another radio communication apparatus judge which of the radio communication apparatuses has priority for the beacon slot. In other words, when beacon period occupancy information not including a device ID of a radio communication apparatus is received from a radio communication apparatus in the neighborhood in the beacon slot position for that radio communication apparatus, it is necessary to change that radio communication apparatus to another beacon slot since it appears that a problem has occurred in the beacon slot. Therefore, the radio communication apparatus stores, at the time of reception of a beacon, the slot position of the beacon together with the beacon sender information, and always transmits the beacon slot position as beacon period occupancy information at the time of transmission of a beacon. Consequently, the respective radio communication apparatuses can obtain information on a next neighborhood radio communication apparatuses that can receive a beacon.

FIG. 7B shows a situation in which the radio communication apparatus G has joined the radio network system.

In FIG. 7B, the radio communication apparatus G learns a slot state indicated by the radio communication apparatus G (717) from beacons received from the radio communication apparatuses A, B, and D in a communication area of the radio communication apparatus G. The radio communication apparatus G selects an arbitrary entry slot and transmits a beacon in order to join the radio network system anew. In this example, there are three entry slots. However, the entry slots are not limited to this and may be variable in length. In the case of the variable length, it is advisable to transmit a beacon with entry slots included in the beacon period length 305 of the beacon sender information 301. Note that, in this embodiment, the radio communication apparatus G enters in the eighth slot. At this point, since the radio communication apparatuses A, B, D, and G judge that the beacon formation is changed, the radio communication apparatuses A, B, D, and G search through the higher slots. However, the radio communication apparatuses other than the radio communication apparatus G cannot detect an empty slot among the high slots. Therefore, only the radio communication apparatus G transmits a beacon for which the counter 304 is set to '3'. The radio communication apparatuses A, B, and D receive this beacon and detect that the counter value 304 of the radio communication apparatus G is '3'.

FIG. 7C is a diagram showing a state of use of the next beacon period.

In FIG. 7C, the beacon period occupancy information 302 of the radio communication apparatus G is communicated to the radio communication apparatuses C and F by the radio communication apparatuses A and D. Since the counter value 307 at this point is that received by the radio communication apparatuses A and D in the previous cycle, the value of the counter 307 is '3'.

On the other hand, the radio communication apparatus G performs processing for movement of slot position, sets the counter value to '2' in the counter 304, and transmits a beacon. The radio communication apparatuses A, B, D receive the beacon with the counter 304 of the beacon sender information 301 set to '2', from the radio communication apparatus G.

The radio communication apparatus E enters the beacon sender information 301, which the radio communication apparatus C received directly, in the beacon period occupancy information 302 also received from the radio communication apparatus C. However, the radio communication apparatus E does not include information received as the beacon period occupancy information 302. Therefore, the radio communication apparatus E never learns the presence of the radio communication apparatus G. However, since the beacon slot length 305 of the beacon sender information 301 received from the radio communication apparatus C is '8', the radio communication apparatus E sets the number of extra slots to '4'.

FIG. 8A is a diagram showing a state of use of a beacon period at the time when the movable counter 206 of the radio communication apparatus G changes to '0'.

In FIG. 8A, a beacon period of the radio communication apparatus G moves to a sixth beacon slot.

As shown in FIG. 8B, in the next super frame, entry slots of the radio communication apparatuses A, B, D, and G are seventh to ninth slots.

Operations at the time when the radio communication apparatus B withdraws from the radio network system after the radio communication apparatus G joins the radio network system will be explained. Note that it is judged that a radio communication apparatus is not in the neighborhood any more when the radio communication apparatus cannot receive beacons a fixed number of times continuously.

Figures 9A, 9B, 9C:
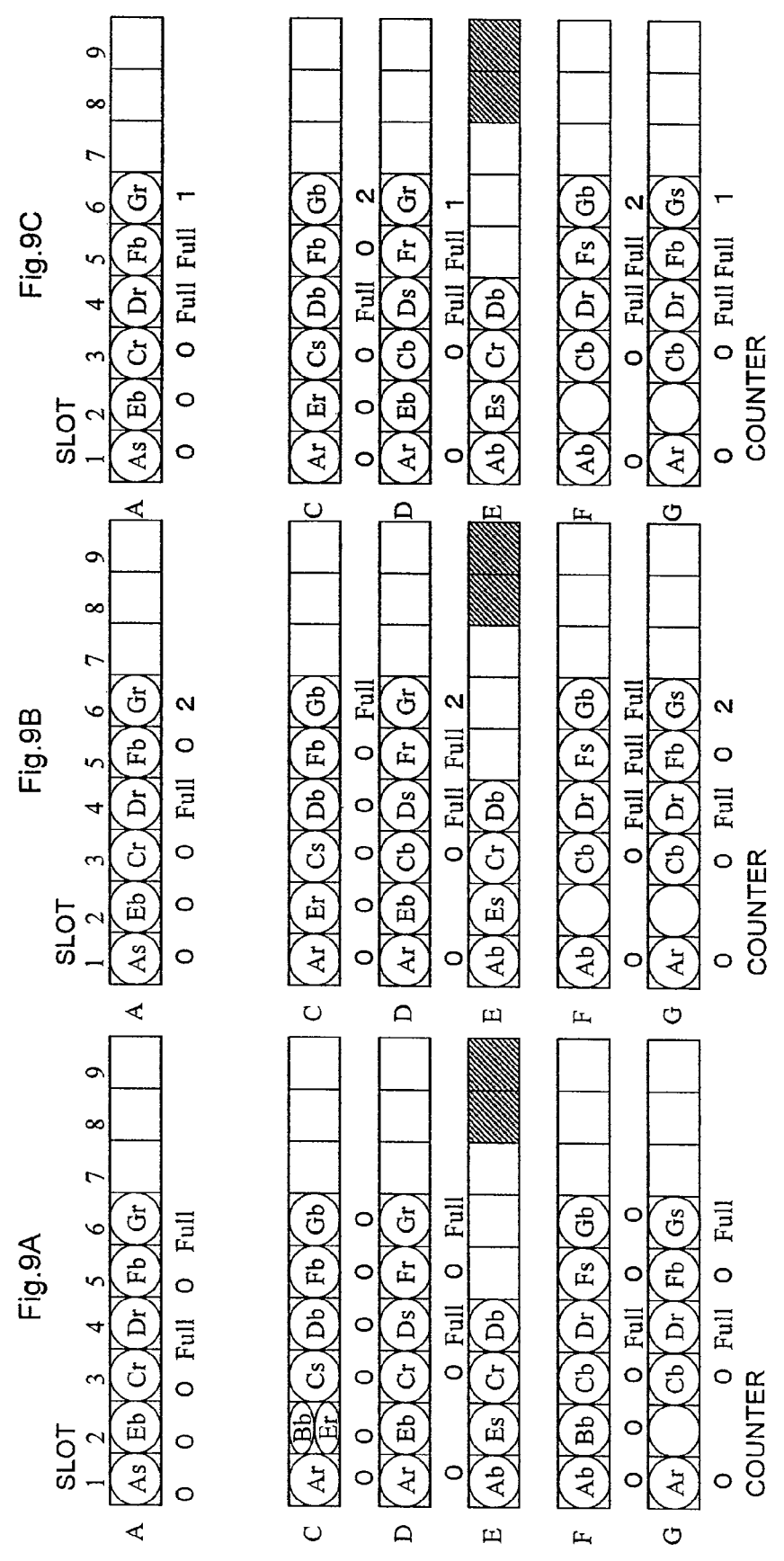

First, when the radio communication apparatus B is not in the neighborhood any more, as shown in FIG. 9A, the radio communication apparatuses A, D, and G do not receive beacons from the radio communication apparatus B. Thus, the radio communication apparatuses A, D, and G recognize all at once that a beacon formation has changed. Moreover, as shown in FIG. 9B, the radio communication apparatuses C and F learn disappearance of the radio communication apparatus B in the next super frame. Since the second beacon slot of apparatuses F and G is not filled by the radio communication apparatus E, the radio communication apparatuses F and G judge that there is an empty slot among higher slots. Therefore, a value '3' is set in the movable counters 206 of the radio communication apparatuses F and G, respectively. However, only the radio communication apparatus G, which transmits a beacon in the lowest slot, has the right to move a slot. Thus, only the counter of the radio communication apparatus G is counted down (FIG. 9C).

Figure 10A:
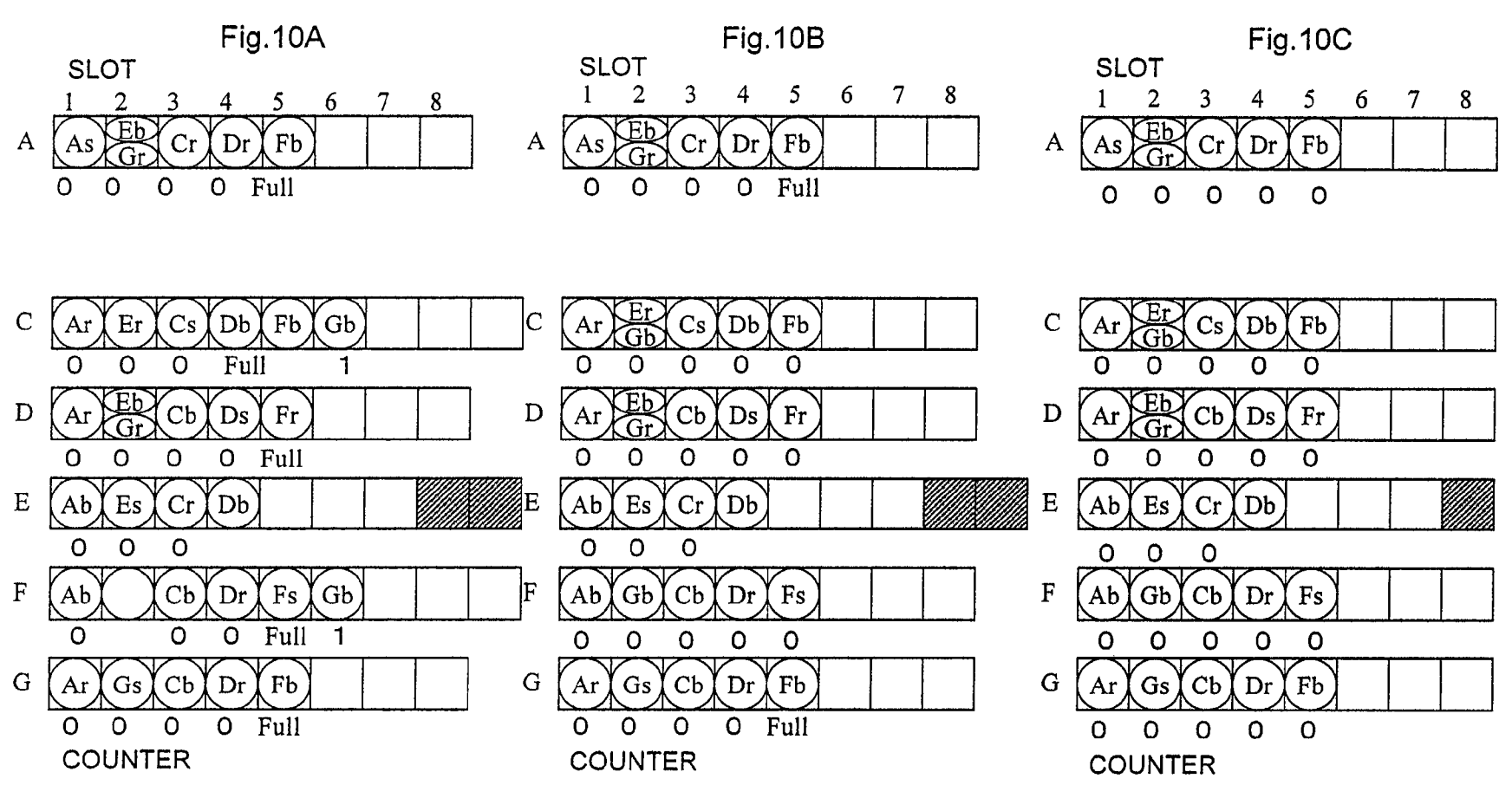

After the count down, as shown in FIG. 10A, the radio communication apparatus G moves to the second slot. Consequently, the radio communication apparatuses A and D immediately detect the change of the beacon formation again and update the beacon periods from the first through the eighth slots. As shown in FIG. 10B, the radio communication apparatuses C and F also detect movement of a slot of the radio communication apparatus G in the next super frame and update their beacon periods from the first to the eighth slots. Consequently, the radio communication apparatus F returns its movable counter to '0'.

As shown in FIG. 10C, the radio communication apparatus E receives the beacon slot length 305 from the radio communication apparatus C in the next super frame and updates the beacon period from the first through the eighth slots.

As described above, in the radio communication network in this embodiment, a cotraction operation for a beacon period is performed appropriately when a radio communication apparatus joins the radio network system anew or disappears. Thus, the respective radio communication apparatuses can realize radio communication with high communication efficiency and less waste of consumed electricity.

Note that two or more radio communication apparatuses may select the same entry slot simultaneously. The radio communication apparatuses that collided with each other then attempt to join the radio network system again. At this point, the conflicting radio communication apparatuses, for example, randomize their respective specified number of super frames after which the radio communication apparatuses enter again, according to a "back off" algorithm to reduce the probability of the radio communication apparatuses conflicting again.

It will be explained how, when a moving radio communication apparatus is present in a beacon group, that radio communication apparatus communicate with the other radio communication apparatuses.

FIG. 11 is an arrangement diagram of moving radio communication apparatuses.

In this arrangement diagram, the radio communication apparatuses B to G (1102) are capable of communicating with one another. Moreover, the radio communication apparatuses B to G (1102) are also capable of communicating with a radio communication apparatus H (1103) in a communication area 1112. The radio communication apparatus H (1103) is also capable of communicating with a radio communication apparatus I (1104) in a communication area 1113. The radio communication apparatus I (1104) is also capable of communicating with radio communication apparatuses J to L (1105), which are capable of communicating with one another, in a communication area 1114. In this way, the radio communication apparatuses B to L form one beacon group. A method of transmitting a beacon at the time when a radio communication apparatus A (1101) moves near the radio communication apparatuses B to L at appropriate speed will be explained below with reference to FIGS. 12A and 12B to FIGS. 15A and 15B.

First, when the radio communication apparatus A (1101) moves to a point 1121 in a communication area of the radio communication apparatuses B to G (1102), the radio communication apparatus A (1101) scans beacons around the point 1121 and transmits its beacon at one of the entry slots of a beacon period.

Figure 12A:
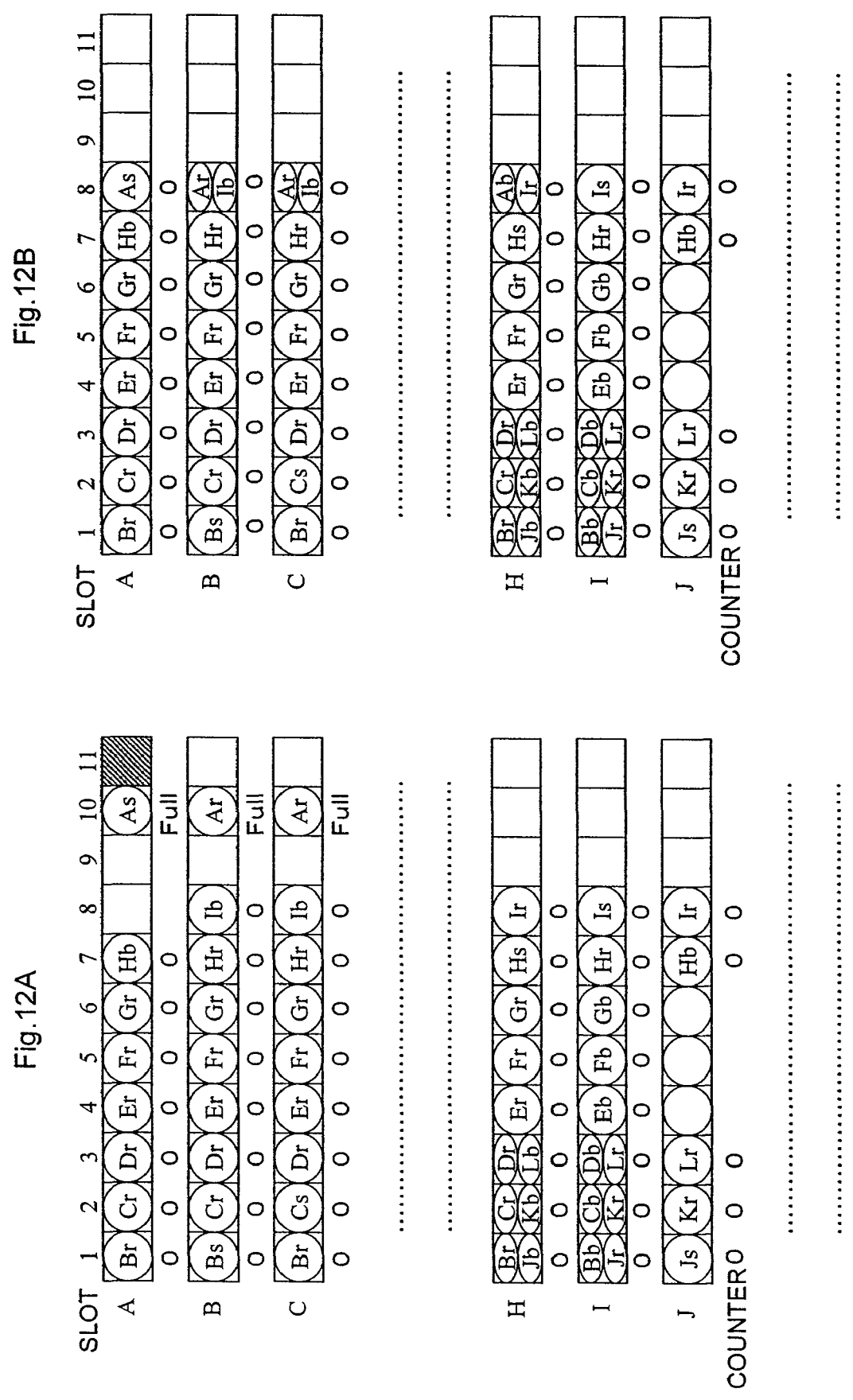

FIG. 12A is a diagram showing the state of use of slots of the respective radio communication apparatus.

In FIG. 12A, the radio communication apparatus A (1101) indicates that the radio communication apparatus A (1101) is transmitting its beacon at one of entry slots of the radio communication apparatus A (1101) (the tenth slot). The slots of radio communication apparatuses B to I indicate that the radio communication apparatuses B to I are transmitting beacons at the first to eighth slots, respectively. The slots of radio communication apparatuses J to L indicate that the radio communication apparatuses J to L are transmitting beacons in first to third slots, respectively.

Since the radio communication apparatus A (1101) transmits the beacon in the third of the entry slots, the radio communication apparatus A performs counting of the movable counter 206 and commences a cotraction operation. As a result, as shown in FIG. 12B, the beacon slot of the radio communication apparatus A moves to the eighth slot and reduction of the beacon period is performed. At this point, the radio communication apparatus H learns the presence of the beacon of the radio communication apparatus A in the eighth slot according to beacon period occupancy information from the radio communication apparatuses B to G (1102). However, since the radio communication apparatus A is outside the communication area, communication of the radio communication apparatus H with the radio communication I is not hindered by the radio communication apparatus A.

Figures 13A, 13B:
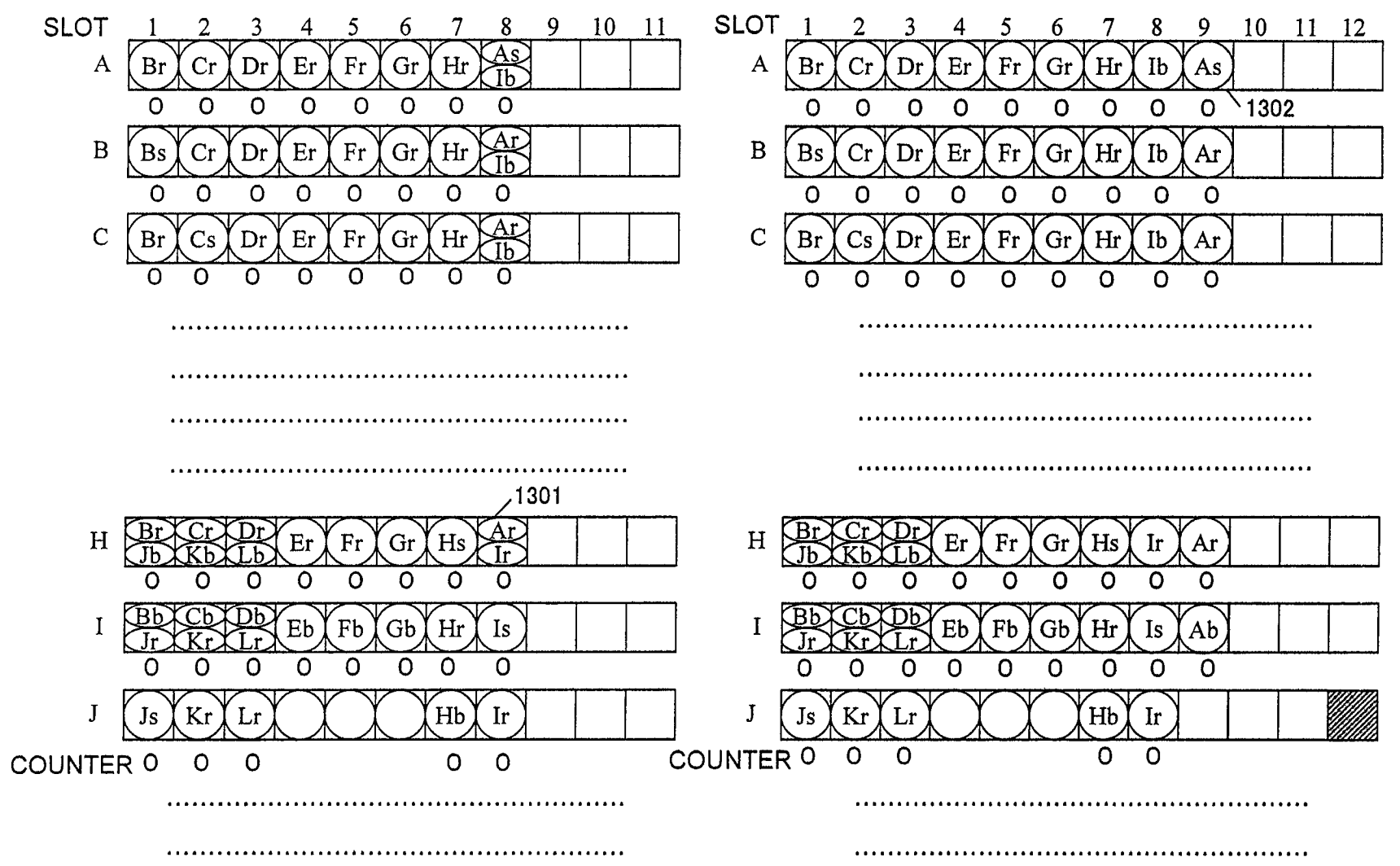

When the radio communication apparatus A moves to a point 1122 in the communication area of the radio communication apparatus H, as shown in FIG. 13A, beacons are sent to the radio communication apparatus H from the radio communication apparatus A and the radio communication apparatus I simultaneously in an eighth slot (1301).

Since the radio communication apparatus H is near boundary of the communication area of the radio communication apparatus A, it is easier for the radio communication apparatus H to receive a beacon of the radio communication apparatus I. Therefore, the radio communication apparatus H notifies the radio communication apparatus A, in the beacon period occupancy information 302, that the radio communication apparatus I is using the eighth slot. The radio communication apparatus A, which has received the notification, selects an entry slot in order to obtain a new beacon slot. As a result, as shown in FIG. 13B, the radio communication apparatus A acquires the ninth slot (1302), which is one of entry slots, and transmits a beacon in the ninth slot (1302).

Figure 14A:
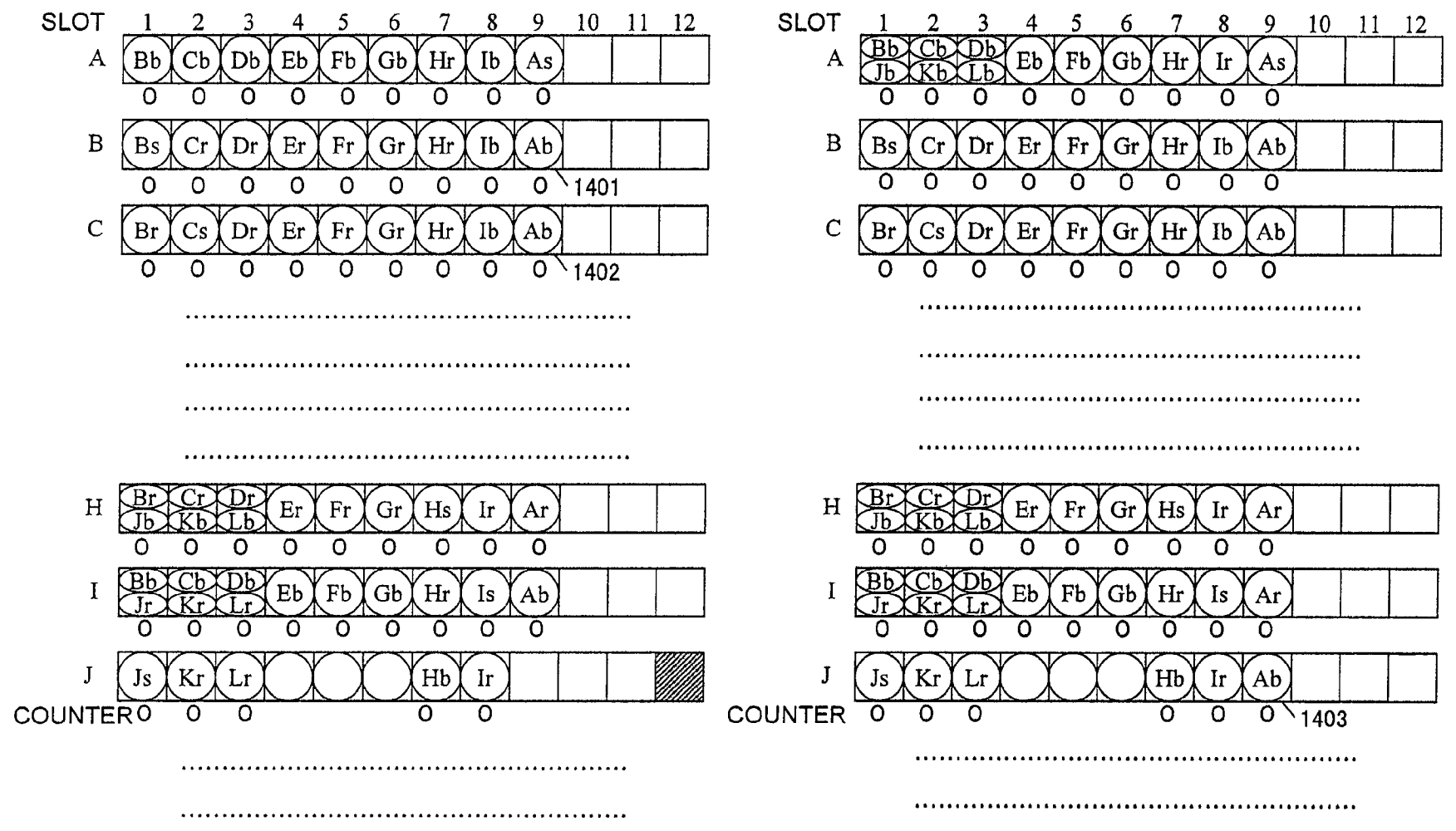

When the radio communication apparatus A moves to a point 1123 outside the communication areas of the radio communication apparatuses B to G, as shown in FIG. 14A, the radio communication apparatuses B to G (1102) become incapable of transmitting and receiving information to and from the radio communication apparatus A directly in ninth slots (1401, 1402).

When the radio communication apparatus A moves to a point 1124 in a communication area of the radio communication apparatus I (1104), as shown in FIG. 14B, the radio communication apparatus A transmits and receives beacon period occupancy information to and from radio communication apparatuses J to L (1105) via the radio communication apparatus I (1104). Consequently, it is recorded that the radio communication apparatus A is using the ninth slots (1403) of the radio communication apparatuses J to L (1105). In addition, it is recorded that the radio communication apparatuses J to L (1105) are using the first to the third slots of the radio communication apparatus A.

Figure 15A:
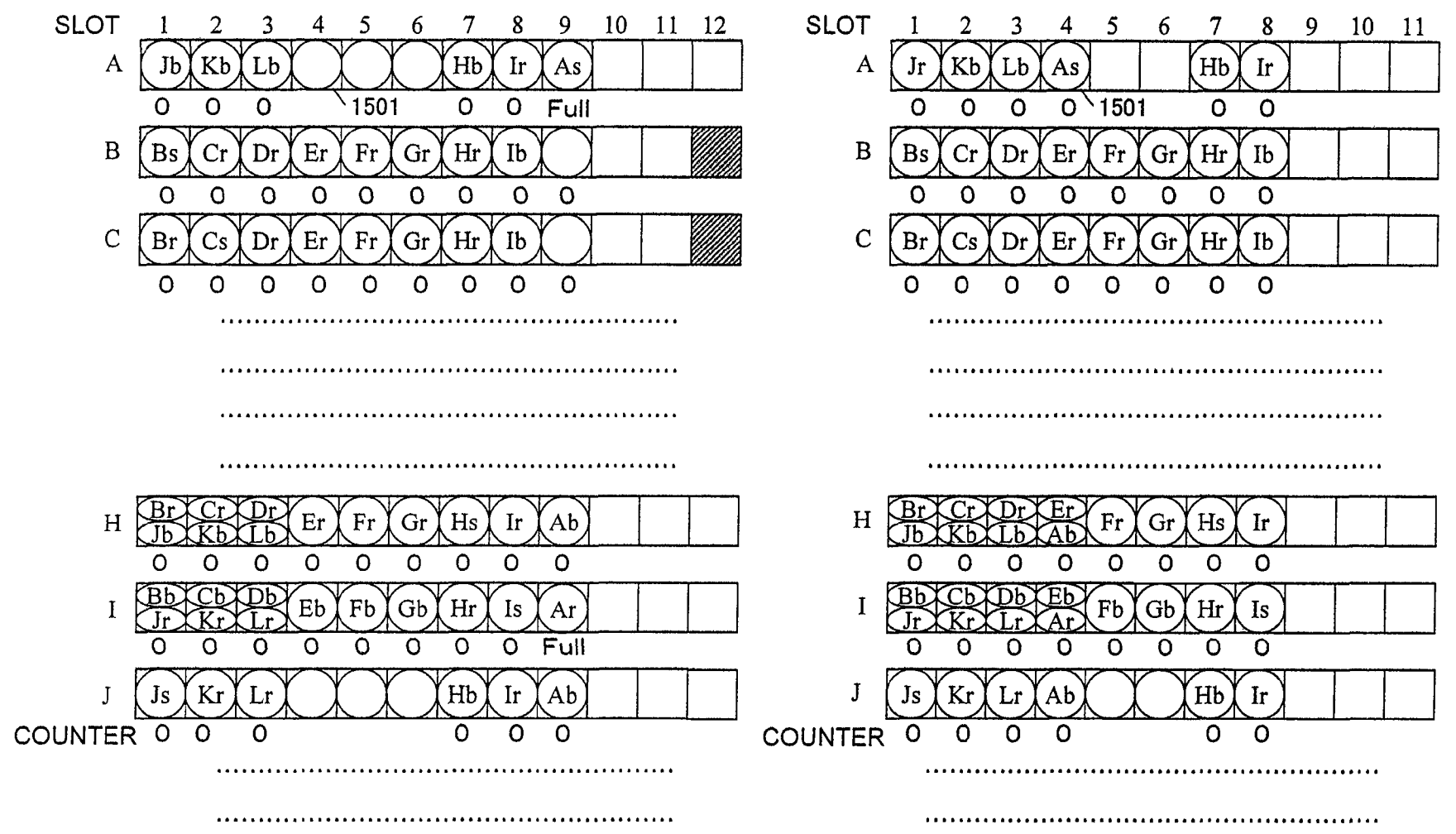

When the radio communication apparatus A moves to a point 1125 outside a communication area of the radio communication apparatus H (1103), as shown in FIG. 15A, the radio communication apparatus A becomes incapable of receiving beacon period occupancy information of the radio communication apparatuses B to G (1102) from the radio communication apparatus H. Therefore, the radio communication apparatus A judges that an empty area is formed in the high slot 1501, starts countdown of the movable counter, and moves a beacon to the fourth slot 1501 as shown in FIG. 15 after elapse of three cycles of super frames.

In this way, even when a certain radio communication apparatus moves among other radio communication apparatuses, a cotraction operations for a beacon period are performed at appropriate times. Thus, even in such a state, it is possible to realize radio communication with high communication efficiency and less waste of consumed electricity.

Note that, in this embodiment, the beacon sender information 301 and the beacon period occupancy information 302 of a beacon frame have respective counters, and counter values of the counters indicate whether a radio communication apparatus is at the stage when the transmission position of a beacon should be changed. However, a method of indicating the state of change of a beacon position is not limited to this counter, and it is also possible to use a flag. The radio communication apparatus sets a flag when the radio communication apparatus presently has a request for changing its beacon slot position. The radio communication apparatus resets the flag when the radio communication apparatus judges that it is unnecessary to change a slot position or when a movable counter of the communication apparatus counts down and the beacon slot position is changed. The judgment on whether a counter value is 0 in the beacon slot position determination processing shown in FIG. 6 takes the form of judging whether this flag is set. This makes it possible to form a beacon frame necessary for processing for determining a beacon slot position with an amount of data smaller than that of the counter.

Second Exemplary Embodiment

Figure 18:
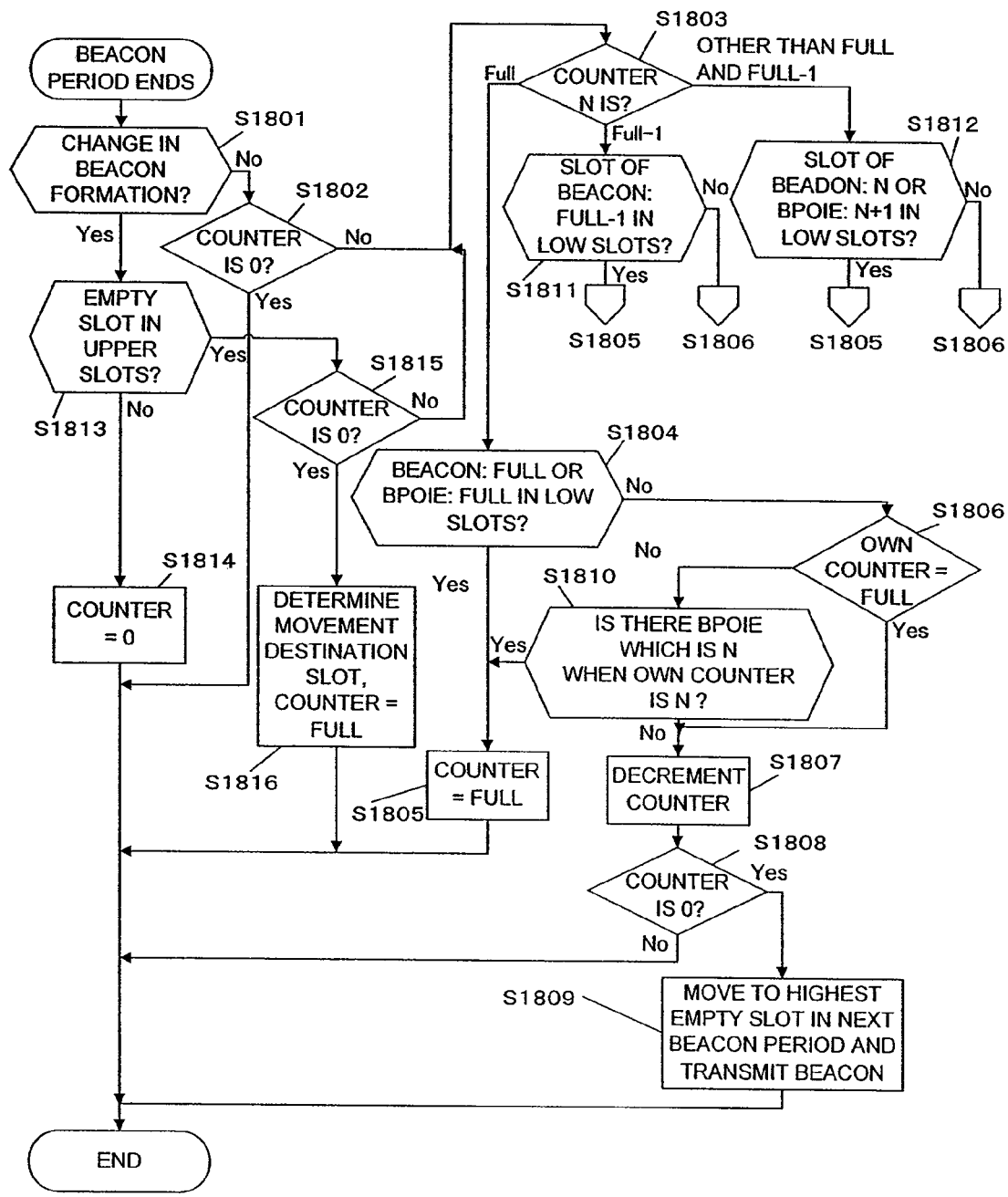
FIG. 18 is a flow diagram showing beacon slot position determining processing according to a second embodiment of the invention.

FIG. 18 is a flow diagram showing a beacon slot position determination processing of a radio communication apparatus in a second embodiment of the invention. Note that the constitution of the radio communication apparatus in this embodiment is identical with that in the first embodiment. Position determination processing of the beacon slot position control section 205 in this embodiment is different from that in the first embodiment.

A flow diagram showing the beacon slot position determination processing of the radio communication apparatus in this embodiment is shown in FIG. 18. The beacon slot position determination processing will be explained below.

First, the beacon slot position control section 205 judges whether there is a change in a constitution of beacon slots (beacon formation) compared to the last time, referring to a beacon slot state table recorded in the recording section 203 (step S1801). When there is no change, the beacon slot position control section 205 shifts to a countdown operation for moving the slot position to a high slot. The beacon slot position control section 205 judges whether the movable counter 206 is 0. When the movable counter 206 is 0, since the movable counter 206 is in the state indicating that there is no empty high slot, and the beacon slot position control section 205 ends the processing (step S1802).

On the other hand, when the movable counter 206 is not 0, the beacon slot position control section 205 judges whether the movable counter 206 is Full, "Full-1", or other than Full or Full-1 (step S1803). When the movable counter 206 is Full, the beacon slot position control section 205 judges whether there is a slot whose type register 404 is Beacon and whose state of use 403 is Full, or a slot whose type register 404 is BPOIE and whose state of use 403 is Full, in a beacon slot position lower than the slot of the radio communication apparatus in question (step S1804). When there is such a slot, the beacon slot position control section recognizes that there is another apparatus which has started countdown of for beacon slot position change that has preference, and thus the beacon slot position control section 205 sets the movable counter 206 to Full and holds the value (step S1805). In this way, a priority of movement of a beacon slot position is given to a radio communication apparatus in a lower beacon slot position, whereby it is possible to prevent plural beacons from moving to an identical empty slot simultaneously.

On the other hand, when there is no such slot in step S1804, the beacon slot position control section 205 checks whether the movable counter 206 is set to Full (step S1806). When the movable counter 206 is in a Full state, the beacon slot position control section 205 decrements the movable counter 206 (step S1807). When the counter value decreases to 0 (step S1808), in order to move to the highest empty slot in the next beacon period, the beacon slot position control section 205 sets "time for beacon transmission" as the timer function of the beacon transmission command section 208 (step S1809). When the counter value is not 0, the beacon slot position control section 205 ends the processing in its current state.

When the movable counter 206 of the beacon slot position control section 205 is not Full in step S1806, the beacon slot position control section 205 checks the beacon slot state table to determine whether notice of a radio communication apparatus having a counter value identical with a counter value of the radio communication apparatus has been given by the BPOIE (step S1810). When there is such a radio communication apparatus, the beacon slot position control section 205 shifts to step S1805 and returns the movable counter 206 to Full. When there is no such a radio communication apparatus, since the radio communication apparatus has the right of beacon slot position movement of the highest priority, the beacon slot position control section 205 shifts to step S1807 and counts down the movable counter 206.

The reason for this is as follows. When another radio communication apparatus A detected by the BPOIE continues countdown according to the timing of the counter of the radio communication apparatus A, the radio communication apparatus A counts down with a counter value one ahead of a counter value of the radio communication apparatus in question. When the radio communication apparatus A moves to a desired empty slot, the slot position changed by the movement is detected one count after the count of the radio communication apparatus in question. Consequently, in detection by the BPOIE, it is impossible to detect an empty slot at the time when the radio communication apparatus in question moves, likely causing conflict of beacon slots.

When the movable counter 206 is Full-1 in step S1803, the beacon slot position control section 205 judges whether there is a slot whose type register 404 is Beacon and whose state of use 403 is Full-1, in a beacon slot position lower than the radio communication apparatus in question (step S1811). When there is such a slot, the beacon slot position control section 205 shifts to step S1805. When there is no such slot, the beacon slot position control section 205 shifts to step S1806. Where the counter value is "Full-1", the x detected by the BPOIE as a counter value of Full in another radio communication apparatus A, which is the same as that in a usual reset state. Therefore, it is impossible to judge whether the counter is in a state of reset or a state in which the counter has started count.

When the movable counter 206 is neither Full nor "Full-1" in step S1803, the beacon slot position control section 205 judges whether there is a slot whose type register 404 is Beacon and whose state of use 403 of is equal to the counter value N of the movable counter of the apparatus in question, or a slot whose type register 404 is BPOIE and whose state of use 403 is equal to "N+1", in a beacon slot position lower than the radio communication apparatus in question (step S1812). When there is such a slot, the beacon slot position control section 205 shifts to step S1805. When there is no such slot, the beacon slot position control section 205 shifts to step S1806.

When there is a change in a beacon formation in step S1801, the beacon slot position control section 205 checks whether there is an empty slot in high slots (slots closer to the top) (step S1813). When there is no empty slot, the beacon slot position control section 205 sets the movable counter 206 to 0 (step S1814). When there is an empty slot, the beacon slot position control section 205 checks whether the counter value of the movable counter 206 is 0 (step S1815). When the counter value is not 0, the beacon slot position control section 205 shifts to step S1803. When the counter value is 0, the beacon slot position control section 205 determines the highest slot among the empty slots to be the movement destination and sets the movable counter 206 to Full (step S1816). Consequently, preparations for movement of a beacon slot is completed.

As described above, as in the first embodiment, when there is an empty beacon slot position higher than the radio communication apparatus in question and when there is no other, lower radio communication apparatus planning to move to a beacon slot position, the beacon slot position control section 205 can shorten the beacon period. Moreover, even if a radio communication apparatus in a slot position lower than the radio communication apparatus in question starts a cotraction operation, the radio communication apparatus also starts countdown under specific conditions. Therefore, a radio communication apparatus, which plans to move a beacon slot position, can start a cotraction operation without waiting for completion of movement of slot positions of other apparatuses. At this point, the beacon slot position control section 205 in question cannot learn, during one super frame, to which beacon a next neighborhood radio communication apparatus has moved. However, when the beacon slot position control section 205 detects that the next neighborhood radio communication apparatus has a count on its movable counter only one count ahead, the beacon slot position control section 205 resets its movable counter to Full. This makes it possible to prevent movement to the identical slot.

A cotraction operation for a beacon period at the time when the radio communication apparatuses according to the invention are present in an arrangement shown in FIG. 19 will be explained.

Figure 19:
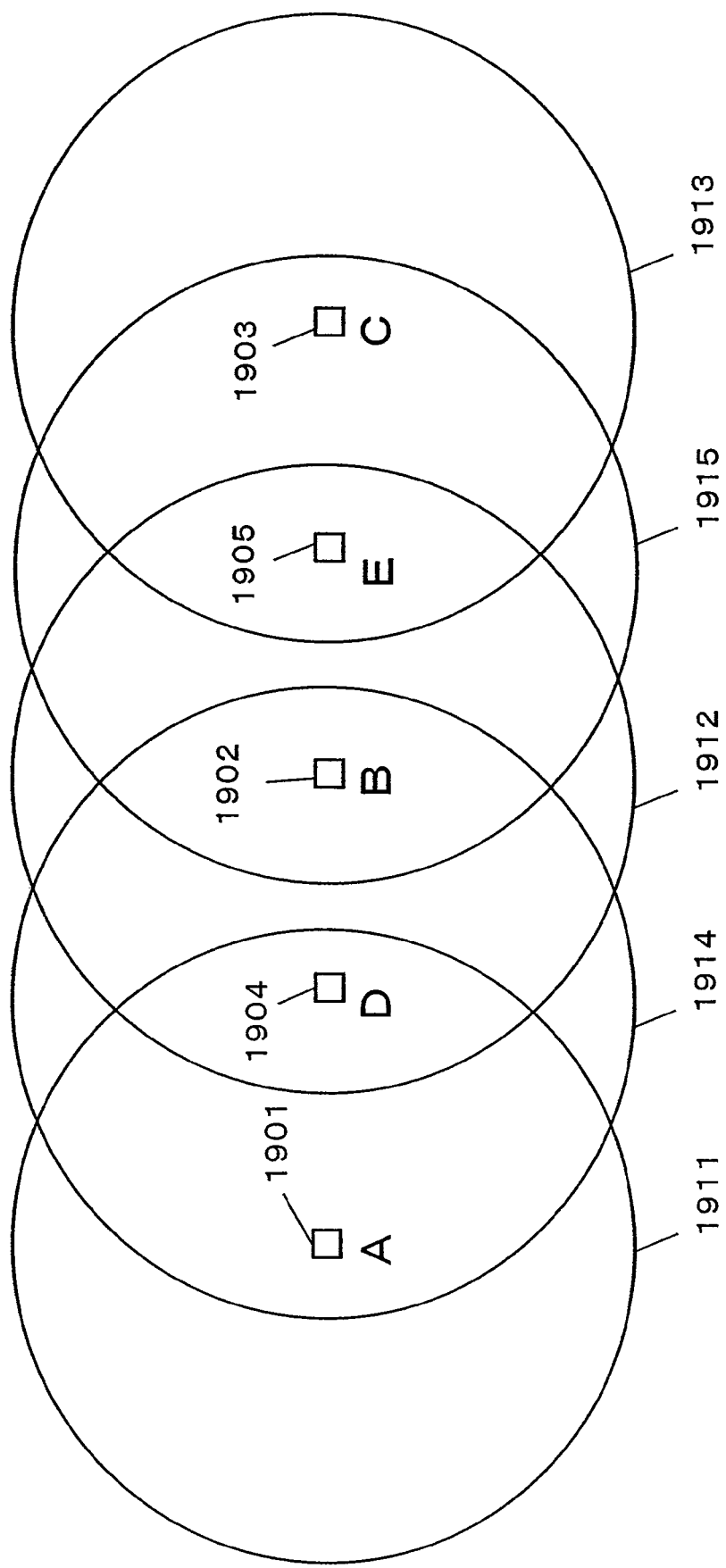
FIG. 19 is a diagram of arrangement of radio communication apparatuses according to the second embodiment of the invention.

In FIG. 19, a radio communication apparatus A (1901) is capable of communicating with a radio communication apparatus B (1902) in a communication area 1911. The radio communication apparatus B (1902) is capable of communicating with a radio communication apparatus D (1904) and a radio communication apparatus E (1905) in a communication area 1912. A radio communication apparatus C (1903) is capable of communicating with the radio communication apparatus E (1905) in a communication area 1913. The radio communication apparatus D (1904) is capable of communicating with the radio communication apparatus A (1901) and the radio communication apparatus B (1902) in the communication area 1914. The radio communication apparatus E (1905) is capable of communicating with the radio communication apparatus B (1902) and the radio communication apparatus C (1903) in a communication area 1915.

The time at which the radio communication apparatuses A to E transmit beacons in beacon periods, and beacon information in respective slots detected by the respective radio communication apparatuses at this point are shown in FIGS. 20 to 22. Note that Full of a movable counter in the cotraction operation described here is '3'.

In FIG. 20A, the radio communication apparatuses A to E transmit beacons at the fourth through the seventh slots. Beacon information of radio communication apparatuses in a positional relation one hop apart from one another is detected in beacon period occupancy information. All the radio communication apparatuses detect that there are empty slots in slot positions higher in than themselves. The radio communication apparatuses set Full ('3' in this embodiment) in movable counters of the respective radio communication apparatuses as preparation for movement of beacon slots to the empty slots.

In the next super frame cycle, as shown in FIG. 20B, since the radio communication apparatuses A and C, are in the lowest slots (seventh slots), the radio communication apparatuses A and C start decrement of the movable counters. The radio communication apparatus B detects data of BPOIE which are transmitted from the radio communication apparatuses A and C, indicating that the movable counters for both are '0', these apparatuses having a slot lower than a slot of the radio communication apparatus B. Therefore, the radio communication apparatus B also performs decrement of the movable counter. The other radio communication apparatuses D and E detect radio communication apparatuses, moving counters of which are Full, the same as the movable counters of the radio communication apparatuses D and E, in slots lower than the radio communication apparatuses D and E. Thus, the radio communication apparatuses D and E do not perform decrement of the movable counters.

In the next super frame period, as shown in FIG. 20C, the radio communication apparatuses A and C continue the decrement of the movable counters. The radio communication apparatus B has a counter value of Full-1 and detects only data of BPOIE which are transmitted from the radio communication apparatuses A and C, in slots lower than the slot of the radio communication apparatus B. Therefore, the radio communication apparatus B continues the decrement of the movable counter. The other radio communication apparatus D detects a slot, which is transmitted from the radio communication apparatus A, lower than the slot position of the radio communication apparatus D. However, since a movable counter value of the radio communication apparatus A is smaller than the counter value of the radio communication apparatus D, the radio communication apparatus D performs decrement of its movable counter.

In the next super frame cycle, as shown in FIG. 21A, as a result of continuing the decrement of the movable counters, since the count has changed to '0', the radio communication apparatuses A and C move their beacon slot positions to the first slots, which are the highest empty slots. The radio communication apparatus B detects data of BPOIE from the radio communication apparatuses A and C in the low seventh slots. However, both of these movable counters are '1' which is the movable counter value of the radio communication apparatus B+1, so the radio communication apparatus B returns its movable counter to Full. On the other hand, the radio communication apparatus D detects a slot, which is transmitted from the radio communication apparatus B and whose counter value is Full, in low slots. However, since the counter value is not equal to a counter value of the radio communication apparatus D, the radio communication apparatus D continues the countdown.

In the next super frame cycle, as shown in FIG. 21B, as a result of continuing the decrement of the movable counter, the count has changed to '0', so the radio communication apparatus D moves the beacon slot position to the second slot, the highest empty slot. The radio communication apparatus B continues the decrement of the movable counter.

In the next super frame cycle, as shown in FIG. 21C, the radio communication apparatus B continues the decrement of the movable counter. Since the counter value of the radio communication apparatus B, which is transmitting information at a slot lower than the radio communication apparatus E, is not Full, the radio communication apparatus E starts decrement of the movable counter.

In the next super frame cycle, as shown in FIG. 22A, when as a result of continuing the decrement of the movable counter the count has changed to '0,' the radio communication apparatus B moves the beacon slot position to a third slot that is the highest empty slot. The radio communication apparatus E continues the decrement of its movable counter.

In the next super frame cycle, as shown in FIG. 22B, the radio communication apparatus E detects that there is a change in the beacon formation and that there is no empty slot in slot positions higher than the radio communication apparatus E. Thus, the radio communication apparatus E sets the movable counter to '0'.

As described above, after the radio communication apparatuses A and C in the lowest slots move to the highest empty slots, the radio communication apparatus D, which is in the communication area of the radio communication apparatus A and is not in the lowest slot position, moves to the highest empty slot after one super frame. Thereafter, the radio communication apparatus B in the lowest slot, which is in a position one hop apart from the radio communication apparatuses A and C, moves to the highest empty slot after two super frames.

In this way, when there are plural empty slots in high slot positions, the radio communication apparatus can move the beacon slot position to the highest empty slot sequentially until empty slots are entirely used. Consequently, compared with the method described in the first embodiment, it is possible to perform the cotraction operation for a beacon period in a short time.

Note that, although the reset value of the movable counter is set to '3' in this embodiment, the reset value is not limited to this and the same advantage can be obtained in principle if the reset value is equal to or larger than '2'. However, it is preferable to set the reset value to '3' or more taking into account the possibility that a radio communication apparatus determined not to be present in one within the period of one hop actually had moved in into one hop just during the process of searching for beacons.

Third Exemplary Embodiment

The constitution of a radio communication apparatus in this embodiment is identical with that in the first embodiment. The radio communication apparatus in this embodiment is different from that in the first embodiment in that to-be-moved device ID (405) information is added to the beacon slot state table recorded in the recording section 203. The device ID of a radio communication apparatus planning to move to a corresponding slot is recorded in this to-be-moved device ID 405. In this way, a radio communication apparatus can learn of another radio communication apparatus planning to move from the beacon frames received from other radio communication apparatuses.

Figure 28:
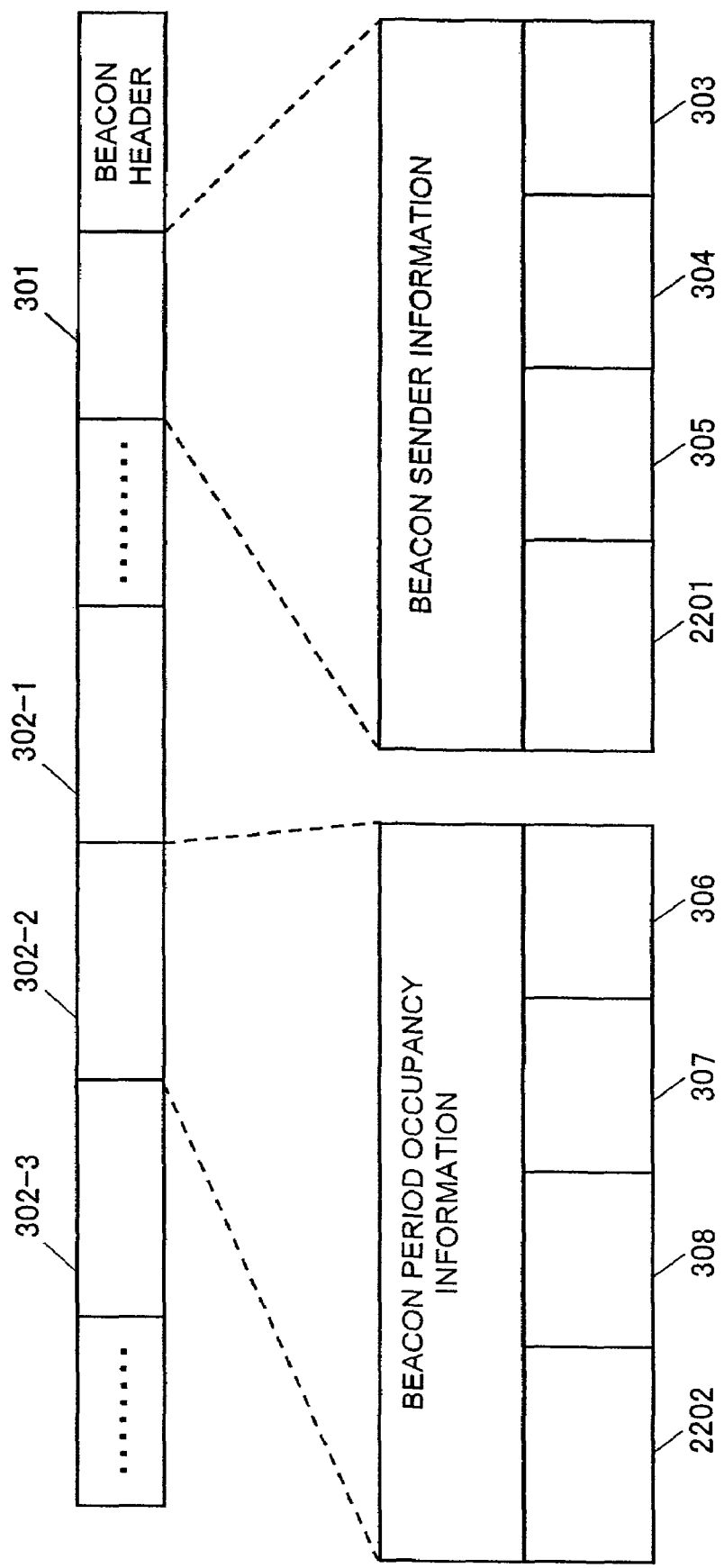
FIG. 28 is a diagram showing a constitution of a beacon frame according to the third embodiment of the invention.

FIG. 28 is a diagram of a beacon frame in the third embodiment.

In FIG. 28, movement destination beacon slot number 2201 field is the field for slot number of the movement destination to which the radio communication apparatus that transmitted the beacon plans to move. Movement destination beacon slot number 2202 field is the field of slot numbers of movement destinations of other radio communication apparatuses planning to move detected by the radio communication apparatus that transmitted the beacon. The third embodiment is different from the first embodiment in that these fields are added. Note that the movement destination beacon slot number 2201 field and the movement destination beacon slot number 2202 field are not added when the movable counter is 0.

The frame judging section 202 receives a beacon frame. When the counters 304 and 307 are not '0', the frame judging section 202 reads out slot numbers in the movement destination beacon slot number fields 2201 and 2202 and records the device IDs 303 and 306 in the column in the beacon slot state table of the to-be-moved device ID 405 corresponding to that slot number. Consequently, the beacon slot position control section 205 can detect to which slot positions other radio communication apparatuses are attempting to move.

As in the first embodiment, the frame forming section 207 generates beacon period occupancy information and the beacon sender information 301 based on the beacon slot state table read out from the recording section 203 and information from the beacon position control section 205, and forms a beacon frame which includes management information. The frame forming section 207 sets a slot number to which the radio communication apparatus plans to move or slot numbers to which the detected other radio communication apparatuses plan to move in the movement destination slot numbers 2201 and 2202 of the beacon frame.

Figure 23:
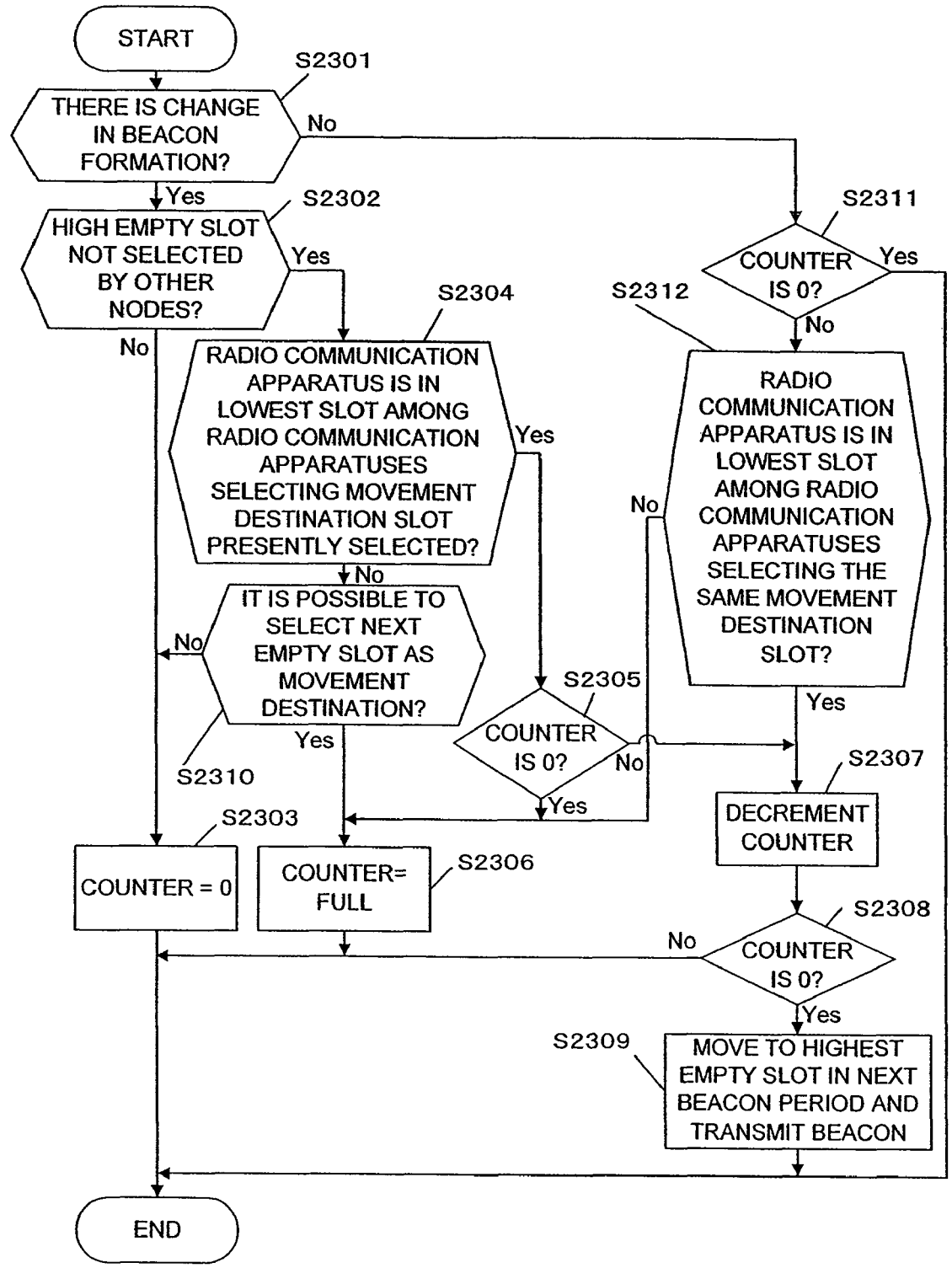
FIG. 23 is a flow diagram showing beacon slot position determining processing according to a third embodiment of the invention.

FIG. 23 is a flow diagram showing beacon slot position determination processing of the radio communication apparatus in this embodiment.

First, the beacon slot position control section 205 checks whether there is a change in a constitution of a beacon slot (a beacon formation) compared to the last time, referring to the beacon slot state table recorded in the recording section 203 (step S2301). Note that, when a to-be-entered slot ID is different, it is decided that there has been a change in the beacon formation. When there is a change in the beacon formation, the beacon slot position control section 205 checks whether there is an empty higher slot (slot closer to the top) (step S2302). When there is no empty slot, the beacon position control section 205 sets the movable counter 206 to 0 and ends the processing (step S2303).

On the other hand, when there is an empty slot, the beacon slot position control section 205 checks whether there is another radio communication apparatus planning to move to the empty slot. When there are radio communication apparatus planning to move to the empty slot, the beacon slot position control section 205 further checks whether the radio communication apparatus is in a slot position, which is presently the lowest among the radio communication apparatuses (step S2304). When the radio communication apparatus is in the lowest slot position, the beacon slot position control section 205 checks whether the counter value of the movable counter 206 is '0' (step S2305). When the counter value is '0', the beacon slot position control section 205 resets the movable counter 206 to Full ('3' in this embodiment) in order to start movement to the empty slot (step S2306).

On the other hand, when the counter value of the movable counter 206 is not '0', the beacon slot position control section 205 decrements the movable counter 206 (step S2307). When the counter value changes to 0 (step S2308), the beacon slot position control section 205 sets "time for beacon transmission" as the timer function of the beacon transmission command section 208 in order to move to the highest beacon slot that the radio communication apparatus considers empty (step S2309).

When the radio communication apparatus is not in the slot position that is presently the lowest in step S2304, the beacon slot position control section 205 selects an empty slot to be a movement destination next (step S2310). Slot that is second highest is selected. If there is no such slot, the beacon slot position control section 205 shifts to step S2303, sets the movable counter 206 to "0", and ends the processing. On the other hand, when there is such a slot, the beacon slot position control section 205 resets the counter to Full and records its device ID in a space of the to-be-moved device ID 405 corresponding to a new movement destination slot position of the beacon slot state table (step S2306).

When there is no change in the beacon slot position of the last time, that is, when there is no change in the beacon formation in step S2301, the beacon slot position control section 205 checks whether the movable counter 206 is "0" (step S2311). When the movable counter 206 is "0", since the radio communication apparatus is already in a state in which there is no empty space in high slots, the beacon slot position control section 205 ends the processing.

On the other hand, when the movable counter 206 is "1" or more, the beacon slot position control section 205 refers to the beacon slot state table and checks whether another radio communication apparatus has selected the slot that its own radio communication apparatus selected. When there is another such radio communication apparatus, the beacon slot position control section 205 further checks whether its own radio communication apparatus is in the slot position which is presently the lowest among the radio communication apparatuses (step S2312). When the radio communication apparatus in question is not in the lowest slot position, the beacon slot position control section 205 shifts to step S2306, resets the movable counter 206 to Full, and ends the processing.

On the other hand, when the radio communication apparatus in question is in the lowest slot position, since the radio communication apparatus has the right of beacon slot position movement with the highest priority, the beacon slot position control section 205 shifts to step S2307 and performs countdown processing for movement.

As described above, when there an empty slot higher than the radio communication apparatus in question, even if there are other radio communication apparatuses which are planning to move their slot positions and which are lower than the radio communication apparatus, the beacon slot position control section 205 starts an operation for movement to the empty slot in the high slot position without waiting for completion of slot position movement of the radio communication apparatuses in the low slot positions. Therefore, the radio communication apparatus can perform slot position movement processing for the radio communication apparatus in parallel with slot position movement by a radio communication apparatus in a slot position lower than the radio communication apparatus in question. Consequently, when there are plural empty slots, it is possible to perform the beacon period cotraction operation in a short time.

In this embodiment, this change of a slot position from a low slot to a high slot is performed three super frames after the change is decided. Consequently, the beacon slot position control section 205 can grasp the beacon slot position of a radio communication apparatus one hop away, referring to the beacon period occupancy information. Therefore, the beacon slot position control section 205 can move a beacon slot position of the radio communication apparatus while avoiding the position of that other radio communication apparatus. It is thus possible to avoid conflict of slot positions with a radio communication apparatus in a position one hop away.

Note that, although the reset value of the movable counter is set to '3' in this embodiment, the reset value is not limited to this and the same advantage can be obtained in principle if the reset value is equal to or larger than '2'. However, it is preferable to set the reset value to '3' or more taking into account the possibility that a radio communication apparatus determined not to be present in one within the period of one hop actually had moved in into one hop just during the process of searching for beacons.

A cotraction operation at the time when the radio communication apparatuses A, B, C, and D according to the invention, which are in a positional relation in which the radio communication apparatuses are capable of communicating with one another, form a beacon period shown in FIG. 24A will be explained.

In FIG. 24A, the radio communication apparatuses A to D transmit beacons at the first, fourth, sixth, and eighth slots, respectively. Movable counters of the respective radio communication apparatuses at this point are 0, Full ('3' in this embodiment), Full, and Full. The movement destination slot positions of the radio communication apparatuses B, C, and D all are the second slot. This indicates that, since there is an empty slot higher than the radio communication apparatuses B, C, and D, the radio communication apparatuses plan to move to that slot, the second slot all at once.

In FIG. 24B, since the radio communication apparatus D is in the lowest slot position among the radio communication apparatuses planning to move, the radio communication apparatus D judges that it has preference for movement and performs countdown of the movable counter. The radio communication apparatuses B and C detect that they are not in the lowest slot position and change their movement destination slot numbers to the third slot, which is the second highest empty slot position.

In FIG. 24C, the radio communication apparatuses C and D judge that they are in the two lowest slot positions among the radio communication apparatuses planning to move slot positions, and count down their respective movable counters. Since there is no other higher empty slot, the radio communication apparatus B does not change its movement destination slot number and does not perform counting of the movable counter.

In FIG. 24D, the counter value of the movable counter of the radio communication apparatus D changes to 0. The radio communication apparatus D moves its beacon sending position to the second slot, which is its movement destination slot. The radio communication apparatus D sets the counter value of its movable counter to 0. The radio communication apparatus C counts down the movable counter.

In FIG. 24E, a counter value of the movable counter of the radio communication apparatus C changes to 0. The radio communication apparatus C moves a beacon sending position to the third slot, which is its movement destination slot. The radio communication apparatus C sets a counter value of its movable counter to 0. Since there is no empty higher slot, the radio communication apparatus B also sets its movable counter to 0.

As described above, before completion of the slot position movement of the radio communication apparatus D, which is in a beacon slot position lower than the radio communication apparatus C, the radio communication apparatus C starts its count operation for movement to the third slot, which is the second highest empty slot. Therefore, compared with the method described in the first embodiment, it is possible to complete movement to the second slot and the third slot, which are empty slots, in a short time. Note that, in this embodiment, in the selection of an empty slot in step S2310, a radio communication apparatus selects the highest empty slot other than slots to which other radio communication apparatuses lower than the radio communication apparatus in question plan to move. However, the selection is not limited to this and the empty slot may be selected arbitrarily. In this case, since the number of radio communication apparatuses performing a cotraction operation in parallel increases compared with the case where there is selection of the highest slot, for example, when there are a relatively large number of beacon periods, it is possible to shorten the beacons period promptly.

In this way, according to the invention, when there are plural empty slots, it is possible to perform movement of beacons positions of plural radio communication apparatuses in parallel. Thus, it is possible to perform the cotraction operation for beacon periods in a short time.

Fourth Exemplary Embodiment

This embodiment describes a method of eliminating interference of communication that occurs when plural beacon period groups come close to one another.

Figure 25:
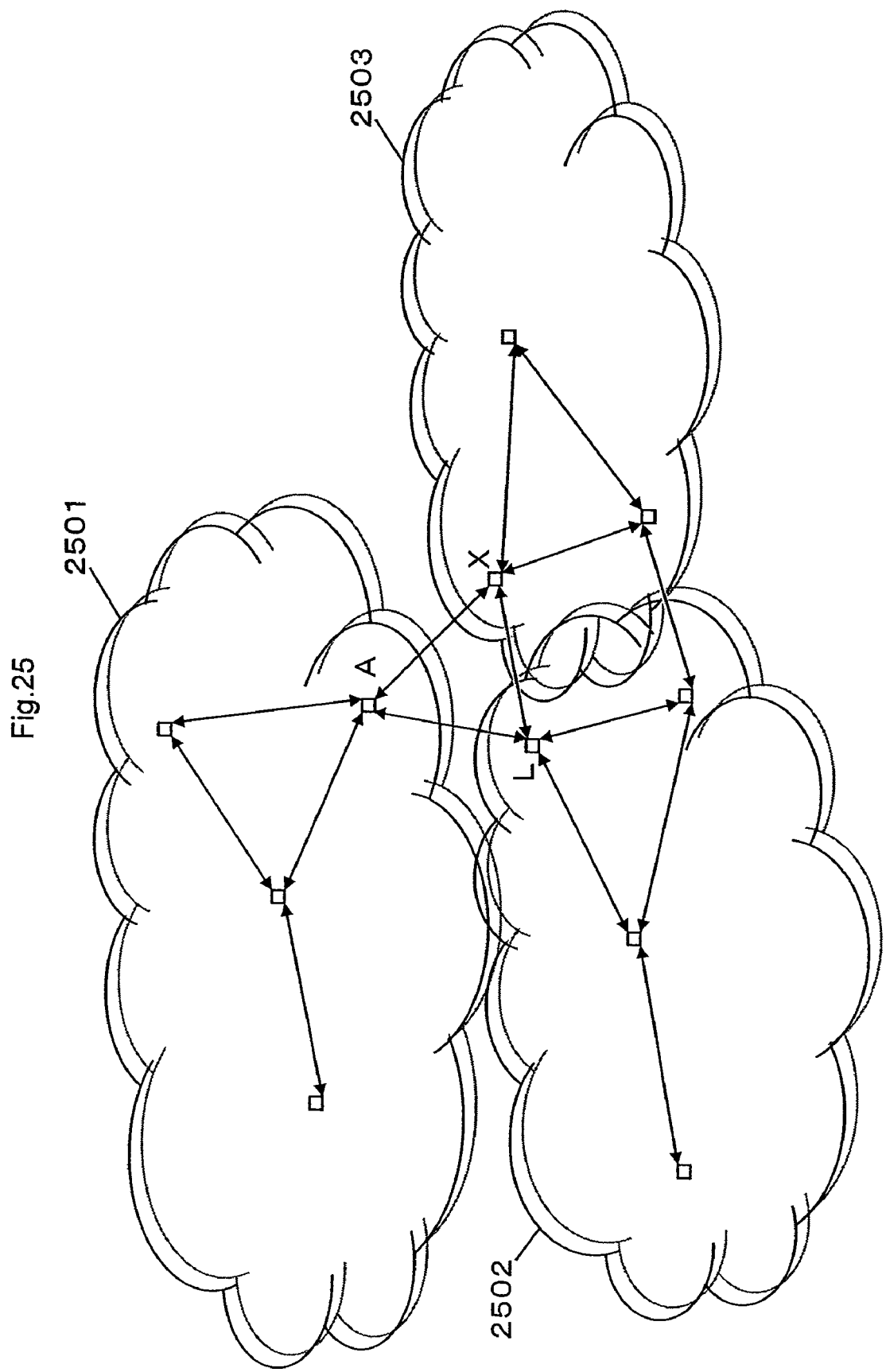
FIG. 25 is a diagram showing a constitution of a radio communication system in a fourth embodiment of the invention.

FIG. 25 is a radio communication system in the fourth embodiment. Moving networks 2501, 2502, and 2503 form beacon period groups different from one another.

In FIG. 25, radio communication apparatuses A, L, and X belong to different beacon period groups 1, 2, and 3, respectively. At this point, when those radio communication apparatuses moves to positions close to one another and enter the communication areas of the other radio communication apparatuses, interference with other beacon period groups occurs in reception of beacons and data within the group of radio communication apparatuses A, L, and X.

Figure 26A:
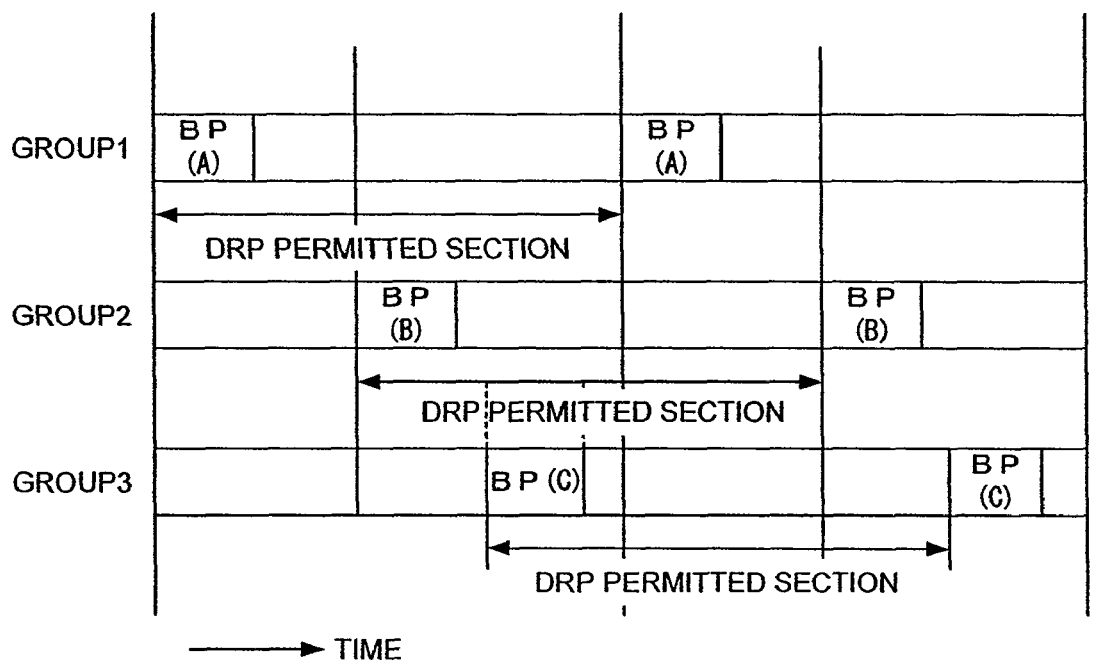
FIG. 26A is a time chart of a super frame in the fourth embodiment.
Figure 26B:
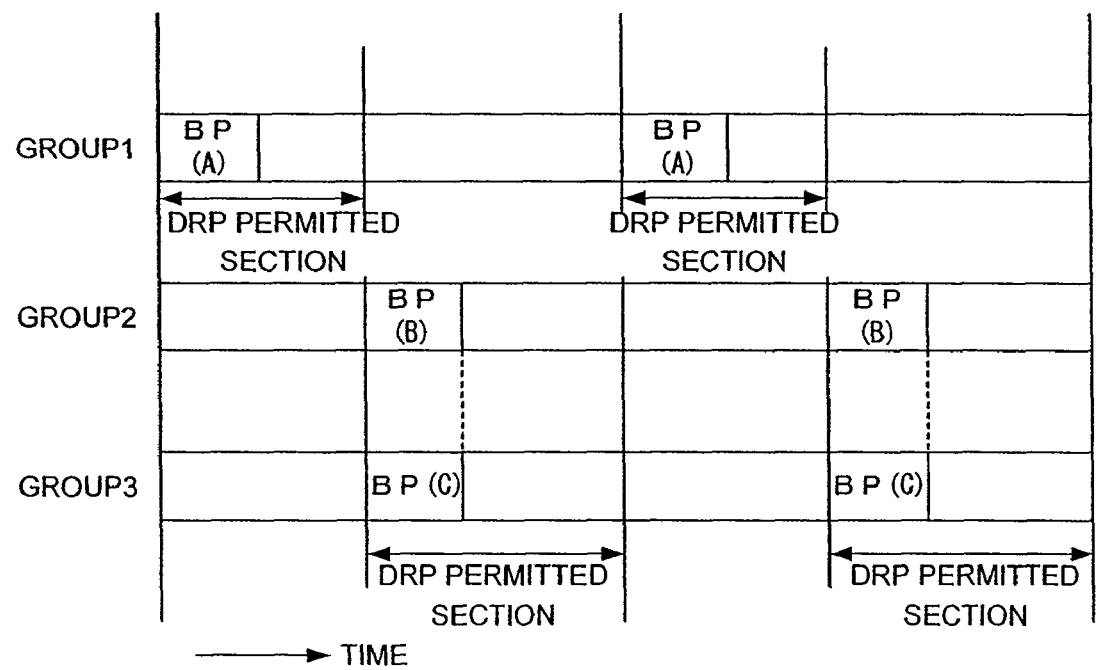
FIG. 26B is a time chart of a super frame in the fourth embodiment.

FIG. 26A is an example of beacon periods formed by the radio communication apparatuses A, L, and X in FIG. 25. When the respective groups transmit and receive data without any coordination, areas in which the three beacon period groups are capable of transmitting data overlap and cause interference between beacon period groups. Therefore, as shown in FIG. 26B, the time frame that one beacon period group has priority for use within each super frame is determined to be the time from the beacon period (A) of the beacon period group to the beginning of the next beacon period (B) in which the radio communication apparatus can receive data. Consequently, it is possible to prevent the interference among the beacon period groups. However, if there is not time for the minimum of data transmission/reception before the start of the next beacon period (C) due to the relative positions of beacon period group 2 and beacon period group 3, a cotraction operation is performed so that the beacon period group forming the beacon period (C) coming later is absorbed in the beacon period group forming the preceding beacon period (B). Consequently, even if a large number of beacon period groups are present in the same place, it is possible to secure minimum necessary data transmission time and as well ensure that the beacon period groups do not infringe the data transmission time of one another.

Figure 30:
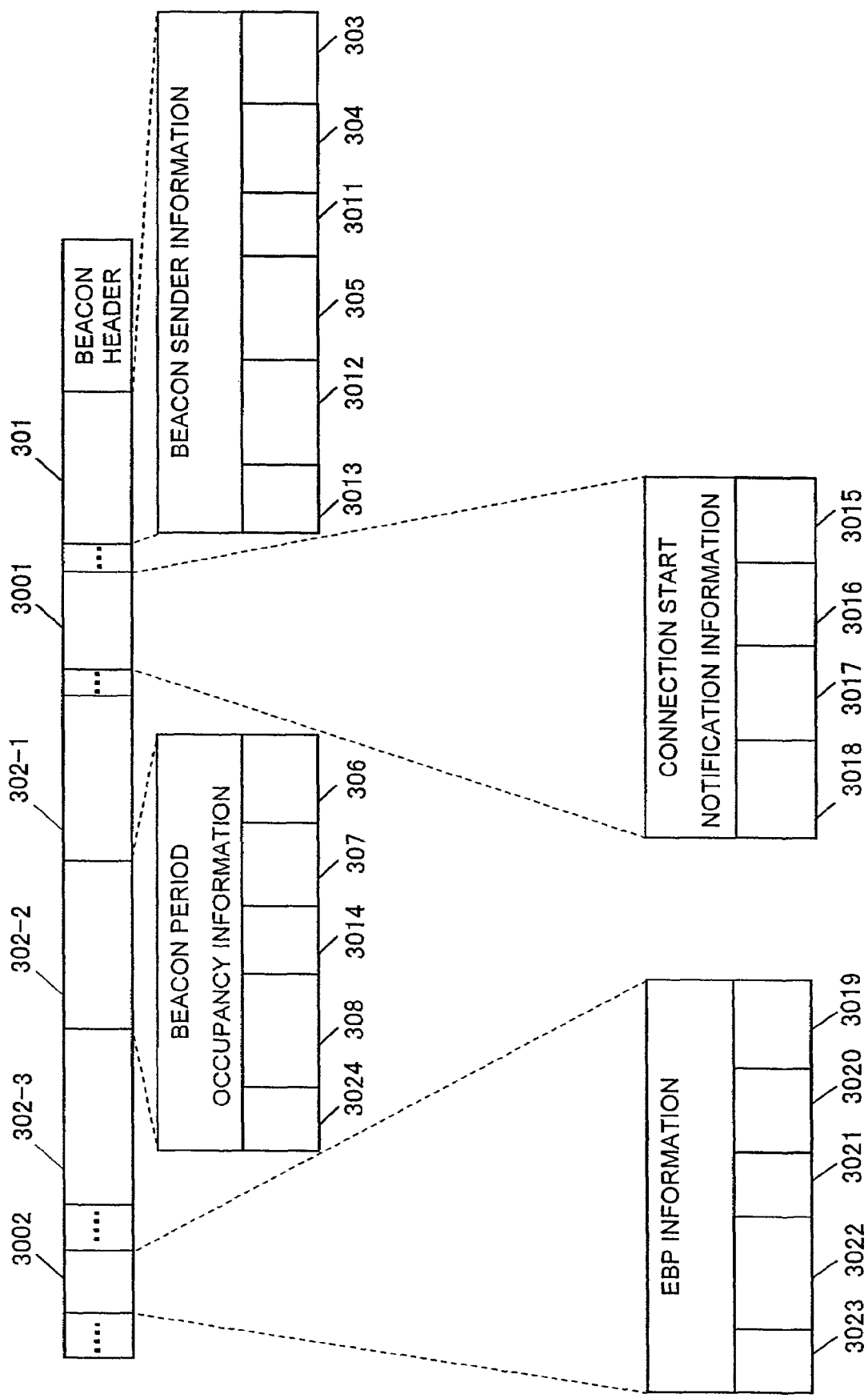
FIG. 30 is a diagram showing a constitution of a beacon frame according to the fourth embodiment of the invention.

FIG. 30 is a diagram showing constitutions of beacon frames that are transmitted by respective radio communication apparatuses.

In FIG. 30, the beacon sender information 301 includes, in addition to the beacon sender information in the first embodiment, a connection flag 3011, beacon period start offset (BPST offset) 3012, and beacon period selection (BP selection) register 3013. This connection flag 3011 indicates that the radio communication apparatus which transmits a beacon, will itself perform connection of beacon periods. The BPST offset 3013 indicates offset time at the start of a beacon period. The BP selection register 3013 also indicates whether a beacon period will be processed so that the offset time of that apparatus will be shifted to the offset time of another apparatus, or so that the offset time of another apparatus will be shifted to the offset time of that apparatus.

The beacon period occupancy information 302 includes, in addition to the beacon period occupancy information in the first embodiment, a connection flag 3014 and an EBP flag 3024. The radio communication apparatus enters the connection flag 3011 of the beacon sender information 301 which the radio communication apparatus receives, and an EBP flag 3023 of EBP information 3002 in the beacon period occupancy information 302, and sends the information to the other radio communication apparatuses.

Connection start notification information 3001 includes a merge counter 3015, a shift counter 3016, a moving group 3017, and a BPST offset 3018. The merge counter 3015 indicates the number of super frame cycles until this concatenation operation is started. The merge counter 3015 is a counter for synchronizing respective radio communication apparatuses of the two beacon period groups to be connected.

The shift counter 3016 counts the number of super frame cycles starting from the first movement of a radio communication apparatus during which other radio communication apparatuses perform movement. The moving group register 3017 indicates whether that radio communication apparatus itself belongs to the beacon period group that is moving its beacon period. When the radio communication apparatus belongs to this moving beacon period group, the flag is set. The BPST offset 3018 is identical with the BPST offset of the beacon sender information 301.

Extended beacon period information (EBP information) 3002 includes a device ID 3019, a counter value 3020, a connection flag 3021, a beacon slot position 3022, and an EBP flag 3023. When the radio communication apparatus transmitting this EBP information itself moves in the beacon period, its own device ID is entered in the device ID register 3019. When the radio communication apparatus receives connection start notification information in an emergency slot from other radio communication apparatuses, device IDs of the radio communication apparatuses at the transmission sources are entered in the device ID 3019. Similarly, the counter value, connection flag, and beacon slot position of the radio communication apparatus or counter values, connection flags, beacon slot positions received from the other radio communication apparatuses are described in the counter 3020, the connection flag 3021, and the beacon slot position 3022. The EBP flag 3023 indicates that the information in the device ID 3019, the counter 3020, the connection flag 3021, and the beacon slot position 3022 is extended beacon period information.

The operation by which different beacon period groups are combined into one, will be explained below.

First, a combination algorithm will be explained briefly. In this explanation, a beacon period group 2 (BG-2) will be connected to a beacon period group 1 (BG-1).

Step 1. A radio communication apparatus X requesting connection with BG-2 transmits connection start notification information in an emergency slot of BG-1 and the beacon slot of the BG-2. The emergency slot means a special slot that is secured for an emergency such as lack of an empty slot.

Step 2. When radio communication apparatuses in the BG-1 and the BG-2 which are in the neighborhood of the radio communication apparatus X receive the connection start notification information, they transmit the received connection start information with their beacons, which are transmitted later, in synchronization with a merge counter of the transmission source. Then, the radio communication apparatuses execute countdown of the merge counter for the entire group that is transmitting the connection start notification information.

Step 3. Among the radio communication apparatuses that are transmitting the connection start notification information of BG-2, a radio communication apparatus desiring connection sets a connection flag in its beacon sender information and transmits a beacon.

Step 4. The radio communication apparatuses, which are transmitting the connection start notification information of BG-1 and BG-2 search through beacon periods of each other's radio communication apparatuses and read the beacons. The radio communication apparatuses form EBP information (extended beacon period information), which comprises beacon time occupancy information of the radio communication apparatuses in the other groups, from the beacon and notify a next neighborhood nodes of neighborhood information (the radio communication apparatus in BG-1 forms EBP information of only the radio communication apparatuses that set the BG-2 connection flag).

Step 5. When the respective radio communication apparatuses in the BG-1 and the BG-2 look at the EBP information and detect that a next neighborhood radio communication apparatus occupies the same beacon slot as itself next neighborhood, the radio communication apparatuses rejoin the respective beacon period groups to which the radio communication apparatuses belong, by the time that the merge counter changes to 0.

Step 6. When the merge counter changes to 0, the respective radio communication apparatuses in the BG-1 and the BG-2 count up a shift counter until the state in which the connection flags of the beacon sender information, the beacon period occupancy information, and the EBP information are no longer set. This shift counter is a counter for counting the super frame cycles until a beacon slot is moved.

Step 7. The radio communication apparatus which sets the connection flag in the beacon sender information in the BG-2, counts up the shift counter. The radio communication apparatus which is transmitting a beacon at an Nth beacon slot, moves to the highest empty beacon slot in the BG-1 when the shift counter is 2N−1.

Step 8. When the connection flags of the beacon sender information, the beacon period occupancy information, and the EBP information cease to be set, the radio communication apparatuses end transmission of the connection start notification information.

Step 9. The radio communication apparatuses stop the beacon period shortening algorithm while the radio communication apparatuses are transmitting the connection start notification information.

The algorithm described above will be explained below with reference to the drawings.

Figure 29:
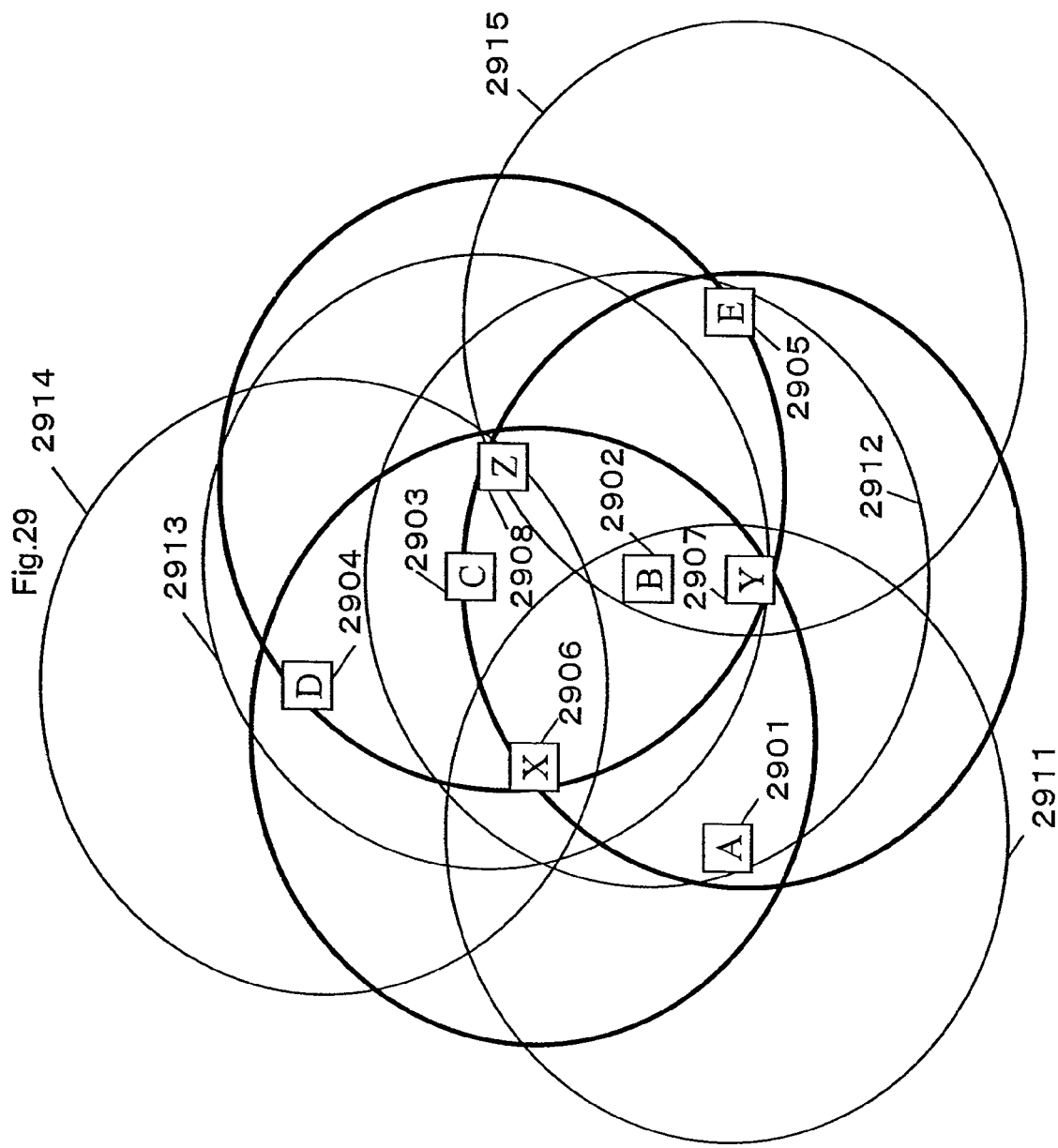
FIG. 29 is a diagram of arrangement of radio communication apparatuses according to the fourth embodiment of the invention.

FIG. 29 is a diagram showing a state in which two beacon groups are in contiguous positions.

In FIG. 29, radio communication apparatuses A, B, C, D, and E form a first beacon group and radio communication apparatuses X, Y, and Z form a second beacon period group.

In the first beacon period group, a radio communication apparatus B (2902) is capable of communicating with a radio communication apparatuses A (2901), C (2903), and E (2905) in a communication area 2912. However, since a radio communication apparatus D (2904) is in a next neighborhood positional relation with the radio communication apparatus B (2902), the radio communication apparatus B (2902) cannot communicate with the radio communication apparatus D (2904) directly. The radio communication apparatus D (2904) is located in a communication area 2913 of the radio communication apparatus C (2903). However, the radio communication apparatus D (2904) is in a next neighborhood positional relation with the radio communication apparatus B (2902).

In the second beacon group, radio communication apparatuses X (2906), Y (2907), and Z (2908) are located in communication areas of each other and are capable of communicating with one another.

The concatenation operation in which the second beacon period group connects with the first beacon period group when the two beacon period groups move to a positional relation shown in FIG. 29 will be explained. Note that the positional relation of the two beacon periods is as described below. The radio communication apparatus X of the second beacon group is located in communication areas of the radio communication apparatuses A, B, C, and D of the first beacon period group. The radio communication apparatus Y of the second beacon period group is located in communication areas of the radio communication apparatuses A, B, C, and E of the first beacon period group. The radio communication apparatus Z of the second beacon period group is located in communication areas of the radio communication apparatuses B, C, D, and E of the first beacon period group.

FIGS. 31 to 41 show the timing at which the radio communication apparatuses A to E and the radio communication apparatuses X to Z transmit beacons in beacon periods, and beacon information in respective slots detected by the respective radio communication apparatuses.

Figure 31:
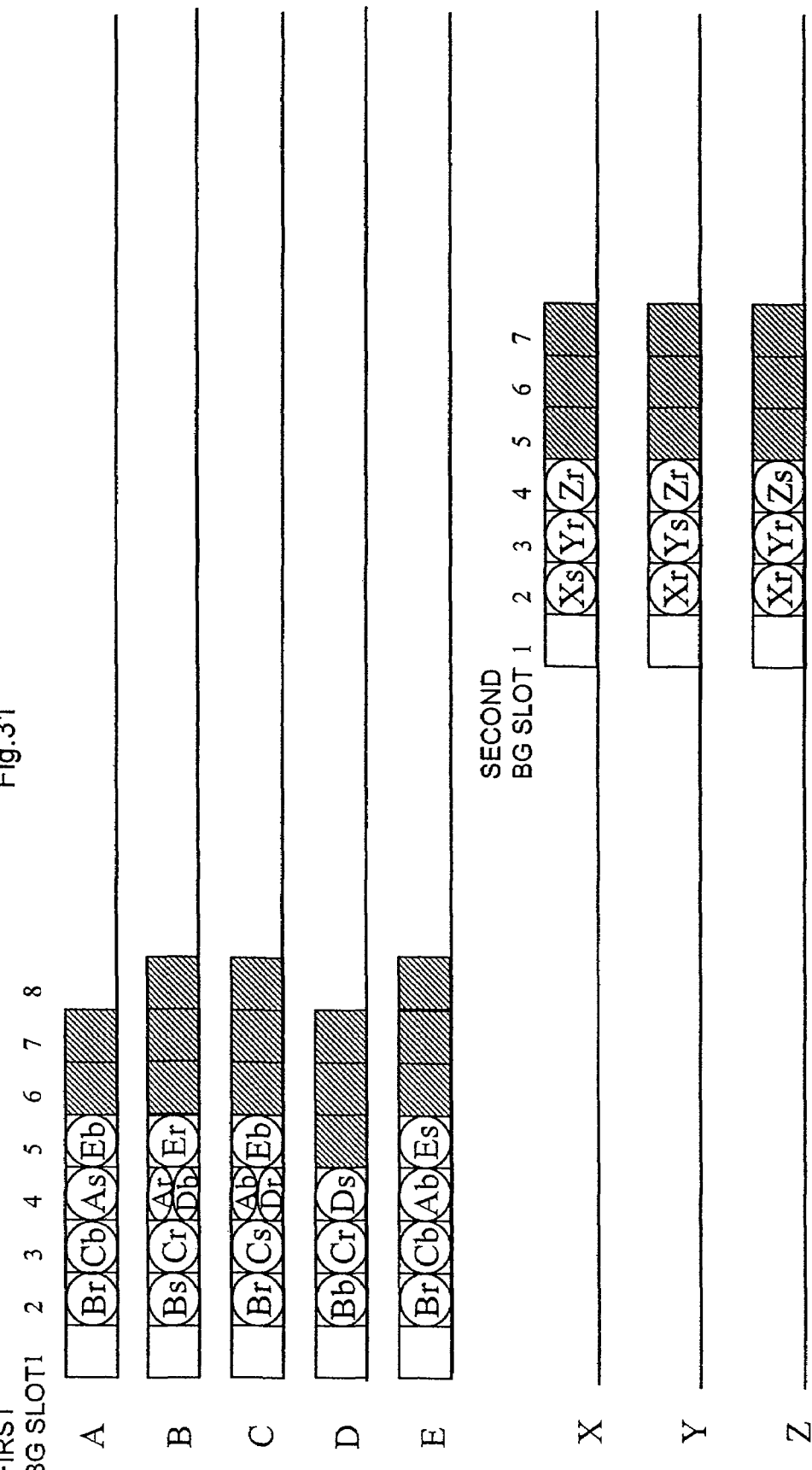
FIG. 31 is a diagram showing a state of use of slots in an operation for concatenation beacon periods of the radio communication apparatus according to the fourth embodiment of the invention.

First, FIG. 31 shows an initial state in which both the groups have moved to their present positions.

In FIG. 31, the radio communication apparatus A of the first beacon period group is transmitting a beacon at the fourth slot, the radio communication apparatus B is transmitting a beacon in a second slot, the radio communication apparatus C is transmitting a beacon in the third slot, the radio communication apparatus D is transmitting a beacon in the fourth slot, and the radio communication apparatus E is transmitting a beacon in the fifth slot. The radio communication apparatuses A and D are transmitting beacons in the fourth slot. In the first beacon period group, since the radio communication apparatuses A and D are two hops apart from each other, the radio communication apparatuses B and C learn the presence of the radio communication apparatuses A and D through beacon period occupancy information (BPOIE), and interference of communication does not occur.

The radio communication apparatus X of the second beacon period group is transmitting a beacon at the second slot, the radio communication apparatus Y is transmitting a beacon at the third slot, and the radio communication apparatus Z is transmitting a beacon at the fourth slot.

Note that the first slot is an emergency slot and in an empty state. The connection flags 3011 and 3014 are not set in the respective beacons at this point. The respective beacons do not include the connection start notification information 3001 and the EBP information 3002.

Next, a state in which the radio communication apparatus X transmits connection start information, which notifies start of a concatenation operation, will be explained with reference to FIG. 32.

Figure 32:
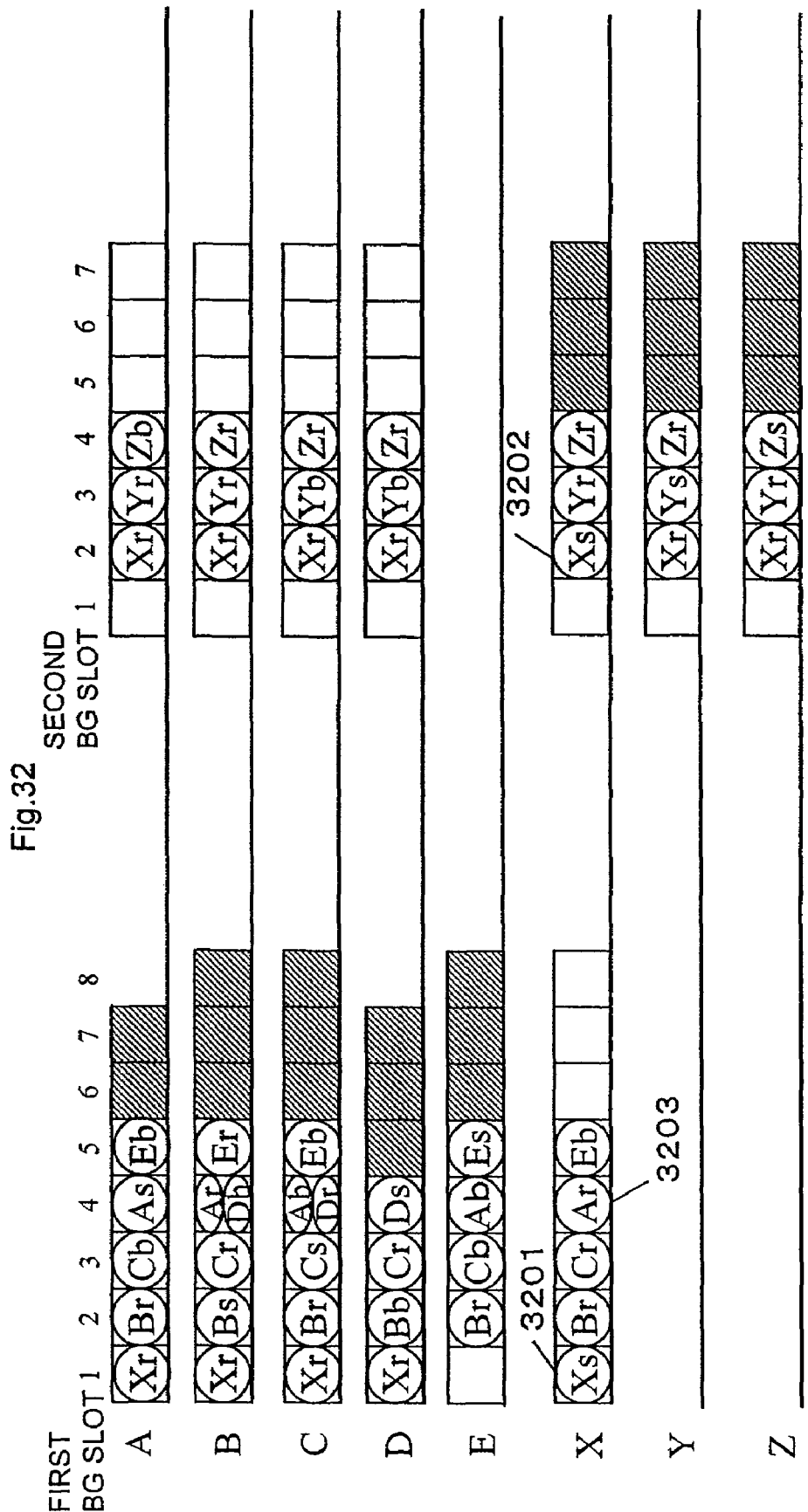
FIG. 32 is a diagram showing a state of use of slots in an operation for concatenation beacon periods of the radio communication apparatus according to the fourth embodiment of the invention.

In FIG. 32, the radio communication apparatus X transmits a beacon, in which the connection start notification information 3001 and the EBP information 3002 are described, to an emergency slot (the first slot) 3201 of the first beacon period group and the beacon slot 3202 of the radio communication apparatus X. A value '5' is set in a merge counter 3015 and a value '0' is set in a shift counter 3016 of this connection start notification information 3001. A flag indicating that the second beacon period group is the beacon period group to which radio communication apparatus X moves is set in a moving group register 3017. BPST offset of the beacon sender information 301 described later is copied in a BPST offset register 3018.

The device ID, counter value of a movable counter, and beacon slot position of the radio communication apparatus X are described in the device ID register 3019, the counter 3020, and the beacon slot position register 3022 of the EBP information 3002. The connection flag 3021 and the EBP flag 3023 are set. Moreover, the connection flag 3011 of the beacon sender information 301 is set. Offset time with regard to the beacon period start time of the first beacon period group, which is the movement destination, is described in the BPST offset 3012. A flag, which indicates that the beacon period start time at the movement destination is used as the base time, is set in the BP selection 3013.

The radio communication apparatuses A to D of the first beacon period group receive directly the connection start information and learn that an operation in which the second beacon period group connects with beacon periods of the radio communication apparatuses will be started. However, since the radio communication apparatus E cannot receive the connection start information directly, the radio communication apparatus E does not learn at that time the operation is started. Note that the radio communication apparatus X receives beacons from the radio communication apparatuses A and D, which are in the communication area of the radio communication apparatus X, in the fourth slot 3203 of the first beacon period group so that beacons of the radio communication apparatuses A and D interfere with each other. However, at this point, it is assumed that the radio communication apparatus X could receive communication from the radio communication apparatus A.

The radio communication apparatuses A to D of the first beacon period group can learn the beacon period start offset time of the second beacon period group from the radio communication apparatus X from the BPST offset register 3012 and the BP selection register 3013. Therefore, the radio communication apparatuses A to D start receiving a beacon of the second beacon period group. At this point, the radio communication apparatus D detects that its device ID is not included in the beacon period occupancy information 302 described in the beacon 3203 received from the radio communication apparatus X. Consequently, the radio communication apparatus D can infer that its beacon cannot be received by the radio communication apparatus X because of interference. Thus, the radio communication apparatus D decides to move its slot position to an entry slot in the next super frame.

The radio communication apparatuses Y and Z of the second beacon period group learn of the start of the concatenation operation from the radio communication apparatus X. When the radio communication apparatuses Y and Z determine that the radio communication apparatuses Y and Z themselves perform the connection operation, in order to make notice of this, the radio communication apparatuses Y and Z set the connection flag 3011 of the beacon sender information register 301 in slot positions of the radio communication apparatuses Y and Z, read the beacon period of the first beacon period group, create the EBP information 3002, and transmit a beacon. Therefore, the radio communication apparatuses A to C detect that a connection flag of the radio communication apparatus Y is set. However, at this point, the connection flag of the radio communication apparatus Y, which the radio communication apparatus D detects in the beacon period occupancy information, is not set because it can only read the state of the immediately preceding super frame. Similarly, the radio communication apparatuses B to D detect that a connection flag of the radio communication apparatus Z is set. However, the connection flag of the radio communication apparatus Z, which the radio communication apparatus A detects in the beacon period occupancy information, is not set because it can only read the state of the immediately preceding super frame.

Note that the radio communication apparatuses other than the radio communication apparatus X, which have received the connection start notification information 3001 and the EBP information 3002, copy the received connection start notification information 3001 and EBP information 3002 and transmit the connection start notification information 3001 and the EBP information 3002 at beacon slots of the radio communication apparatuses. Consequently, the radio communication apparatuses other than the radio communication apparatus X are capable of transmitting the information to a radio communication apparatus in a next neighborhood position.

Figure 33:
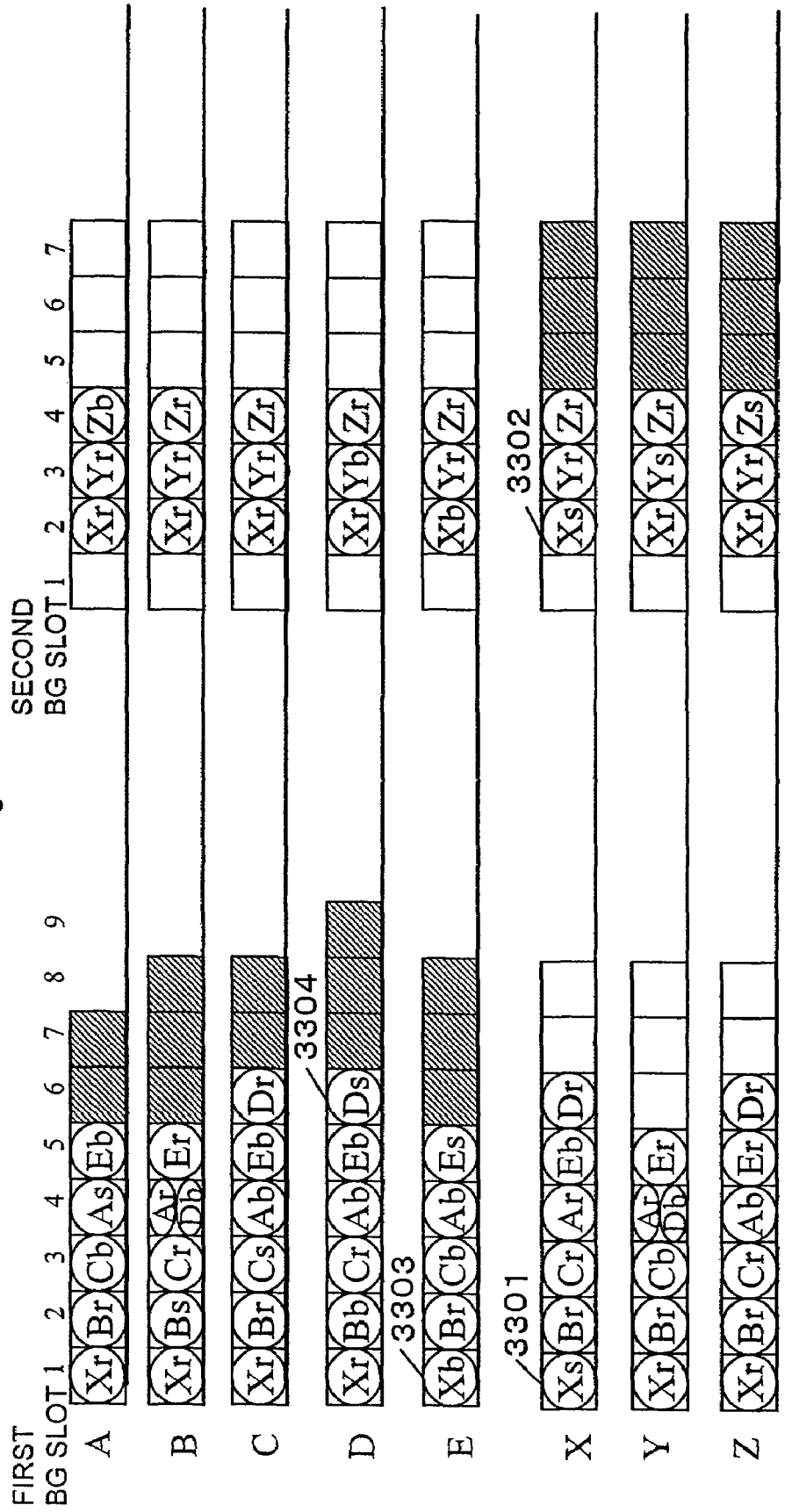
FIG. 33 is a diagram showing a state of use of slots in an operation for concatenation beacon periods of the radio communication apparatus according to the fourth embodiment of the invention.

The state of the next super frame cycle is shown in FIG. 33.

In FIG. 33, the radio communication apparatus X decrements the merge counter and sets '4' in the merge counter 3015. The radio communication apparatus X transmits a beacon, in which the connection start notification information 3001 and the EBP information 3002 are described, to an emergency slot (a first slot) 3301 of the first beacon period group and its own beacon slot 3302.

The radio communication apparatus E learns, on the basis of the beacon period occupancy information, that the beacon of the radio communication apparatus X is transmitted at the first slot 3303, via the radio communication apparatus B in the communication area of the radio communication apparatus E. The radio communication apparatus E learns beacon period start time of the second beacon period group from the BPST offset register 3018 of the connection start notification information and starts reception of a beacon of the second beacon period groups.

As determined in the preceding super frame, the radio communication apparatus D moves its beacon slot position to the entry slot 3304 and transmits a beacon. Consequently, for the radio communication apparatus X, the interference between the radio communication apparatus A and the radio communication apparatus D is eliminated.

Note that, after this super frame cycle, the respective radio communication apparatuses of the first beacon period group detect a state in which all the connection flags of the radio communication apparatuses X, Y, and Z are set until the movement of the slot positions is completed.

Figure 34:
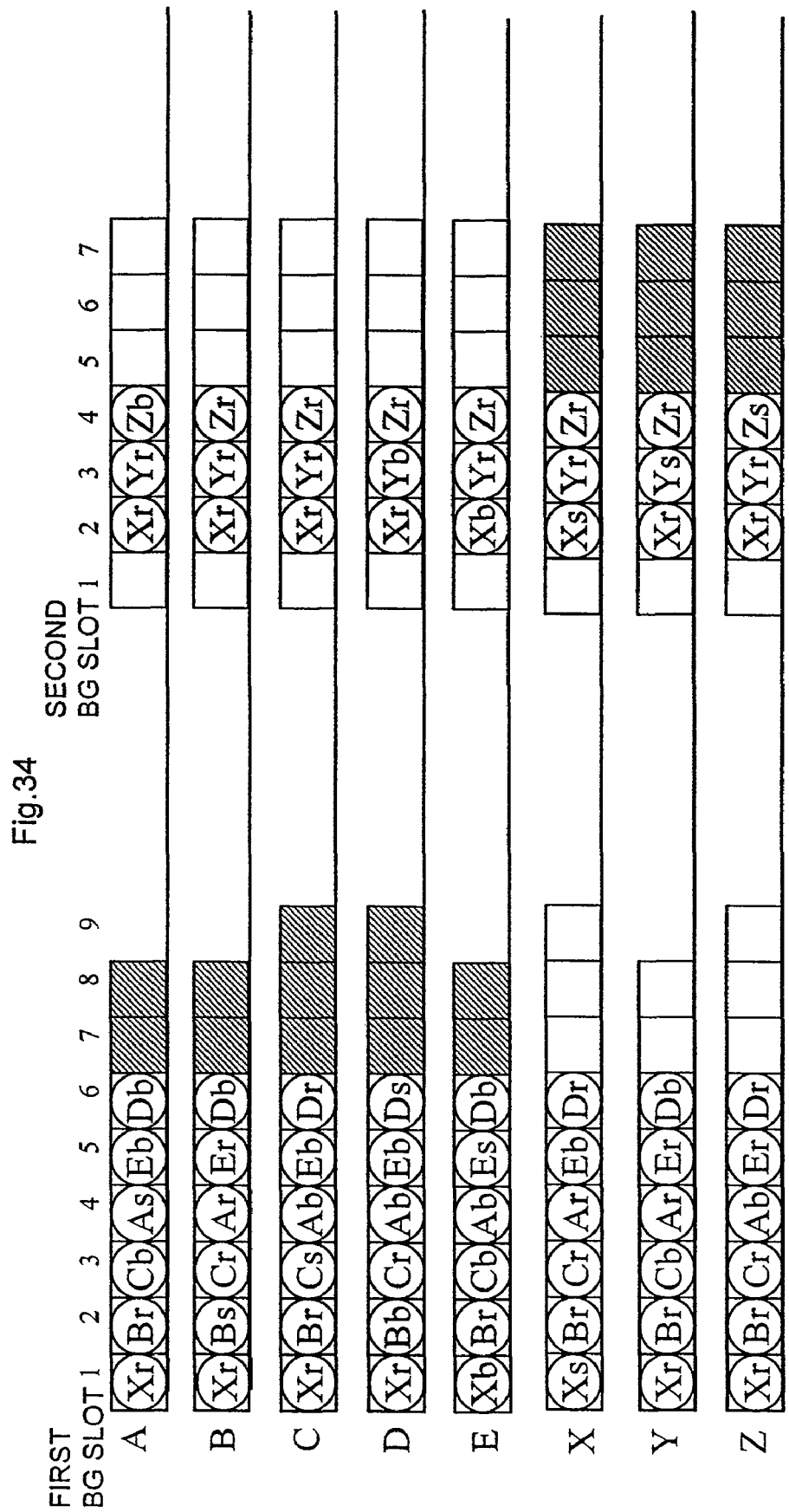
FIG. 34 is a diagram showing a state of use of slots in an operation for concatenation beacon periods of the radio communication apparatus according to the fourth embodiment of the invention.

The state of the next super frame cycle is shown in FIG. 34.

In FIG. 34, the radio communication apparatus X decrements the merge counter and sets '3' in the merge counter 3015. The radio communication apparatus X transmits a beacon, in which the connection start notification information 3001 and the EBP information 3002 are described, to the emergency slot (the first slot) 3301 of the first beacon period group and is own beacon slot 3302.

In this super frame period, notice of the change of the slot position of the radio communication apparatus D is made to the other radio communication apparatuses A, B, E, and Y in next neighborhood positions.

Figure 35:
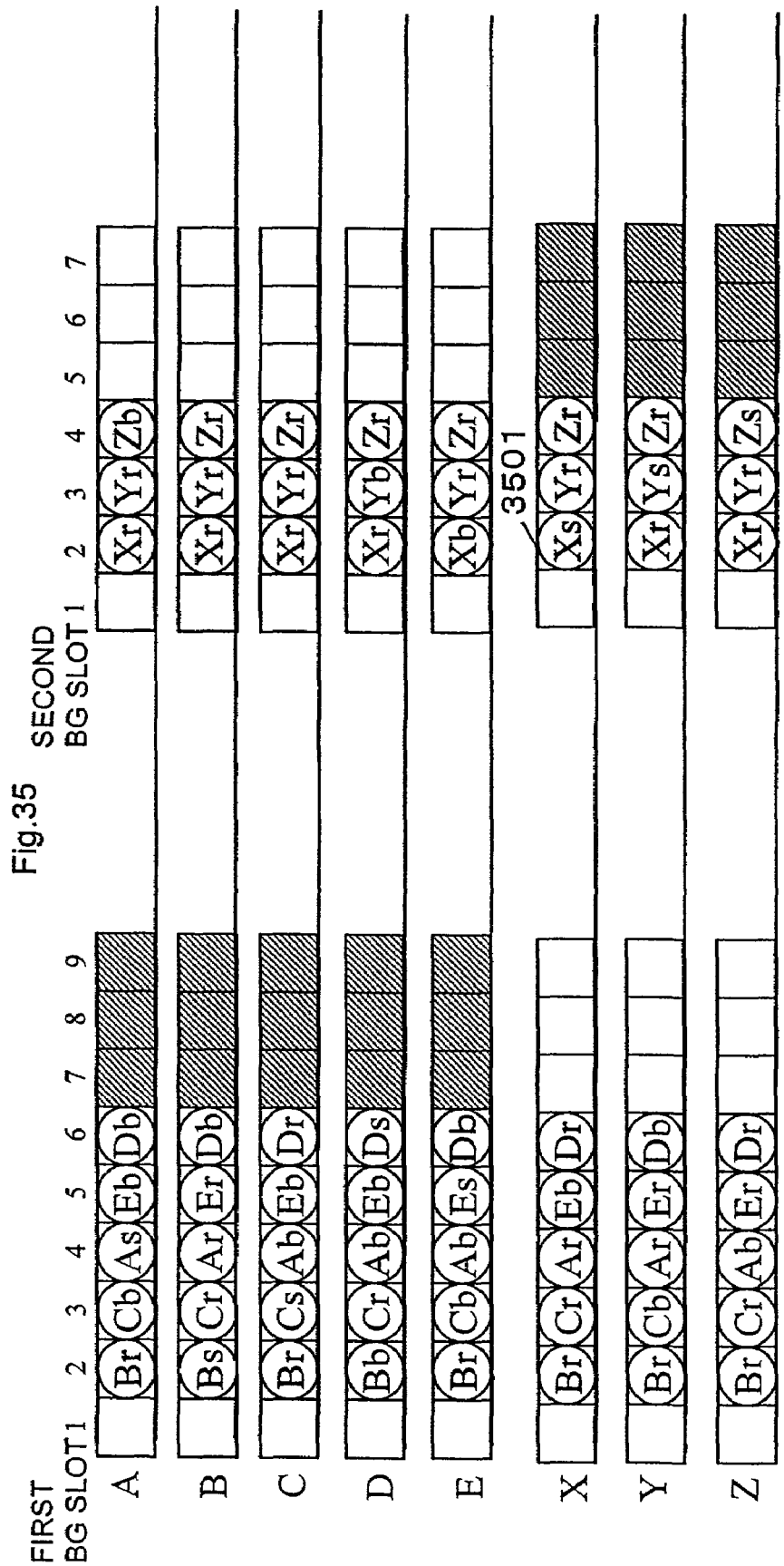
FIG. 35 is a diagram showing a state of use of slots in an operation for concatenation beacon periods of the radio communication apparatus according to the fourth embodiment of the invention.

The state for three cycles of super frames is shown in FIG. 35.

In FIG. 35, the radio communication apparatus X decrements the merge counter 3015 of the connection start notification information 3001 and transmits a beacon to its own beacon slot 3501. This operation is repeated when a counter value of the merge counter of the radio communication apparatus X is from 2 through 0. During this period, the other radio communication apparatuses perform processing such as movement of a slot position for avoiding interference so that the second beacon period group is not hindered from connecting with the first beacon period group.

Figure 36:
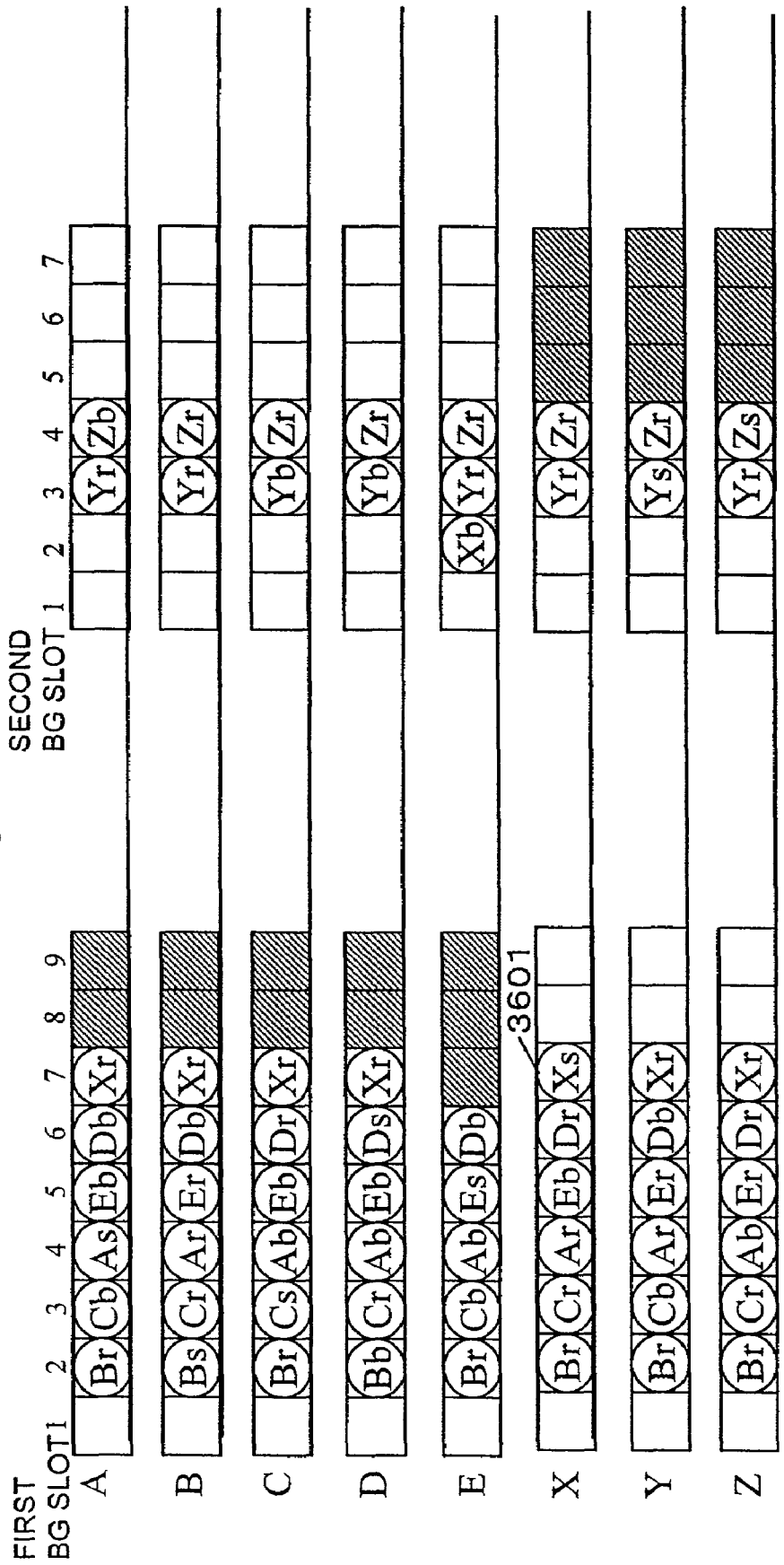
FIG. 36 is a diagram showing a state of use of slots in an operation for concatenation beacon periods of the radio communication apparatus according to the fourth embodiment of the invention.

The state of the next super frame cycle is shown in FIG. 36.

In FIG. 36, since the merge counter has changed to '0', the radio communication apparatuses A to E and the radio communication apparatuses X to Z start incrementing the shift counter. The radio communication apparatuses A to E and the radio communication apparatuses X to Z set counter values in the shift counter 3016 of the connection start notification information 3001. At this point, the radio communication apparatuses A to E and the radio communication apparatuses X to Z read that a counter value of the shift counter is '1' (odd number) and move the beacon slot position to the highest empty slot (the seventh slot) 3601 of the first beacon period group. Then, a beacon is transmitted at the seventh slot. Consequently, all the radio communication apparatuses excluding the radio communication apparatus E receive the beacon and learn that the radio communication apparatus X has changed its slot position.

Figure 37:
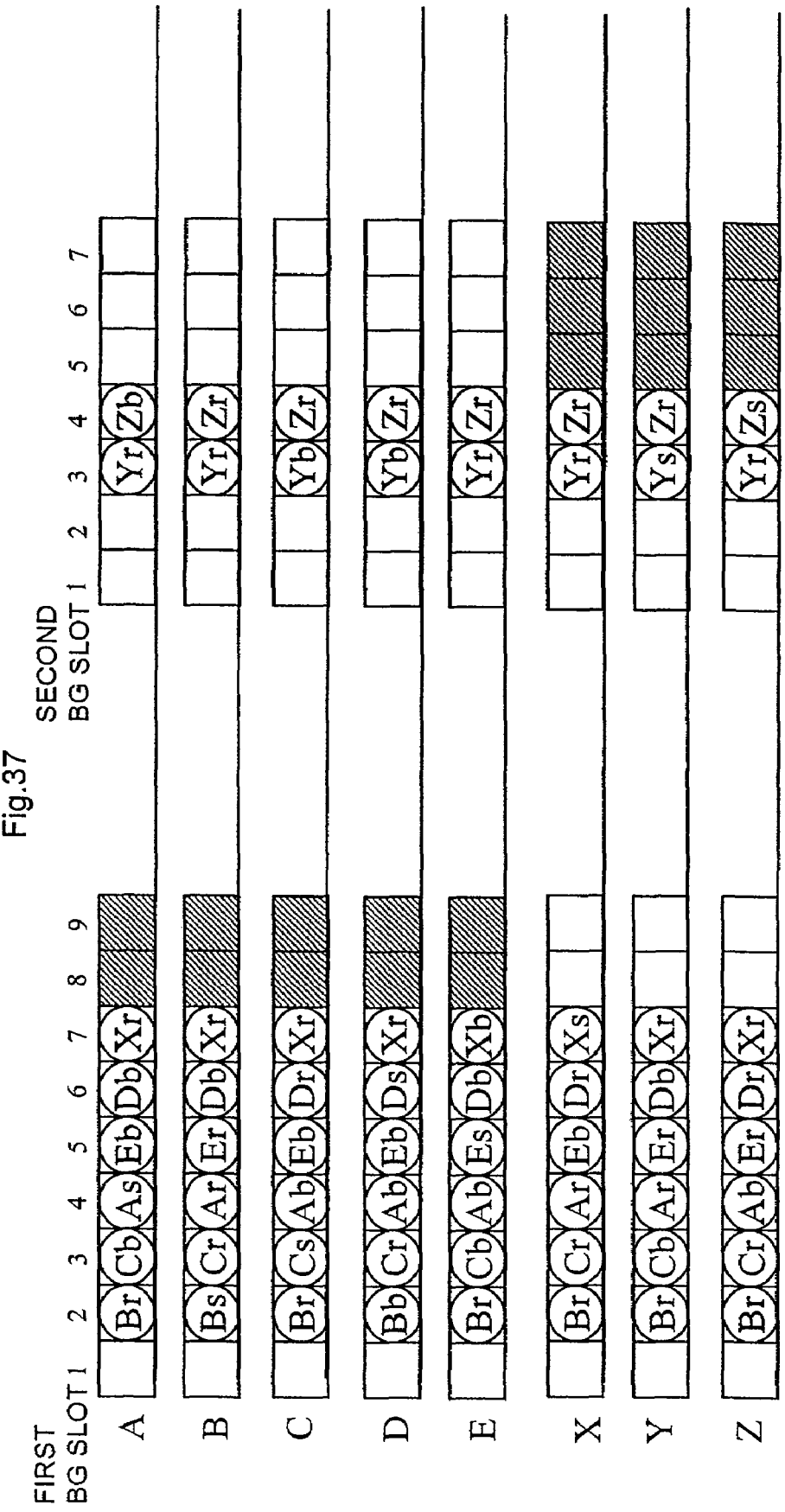
FIG. 37 is a diagram showing a state of use of slots in an operation for concatenation beacon periods of the radio communication apparatus according to the fourth embodiment of the invention.

A state of the next super frame cycle is shown in FIG. 37.

In FIG. 37, the radio communication apparatus Y increments the shift counter 3016 of the connection start notification information 3001. At this point, since the counter value of the shift counter is '2' (even number), the radio communication apparatus Y does not move the slot position. Note that information of the connection flag 3011 of the radio communication apparatus Y is given to the radio communication apparatus D through the beacon period occupancy information 302 of the radio communication apparatus C. In this way, by setting intervals between beacons of one super frame, a next neighborhood radio communication apparatus is also notified that the radio communication apparatus Y is currently performing the concatenation operation.

Figure 38:
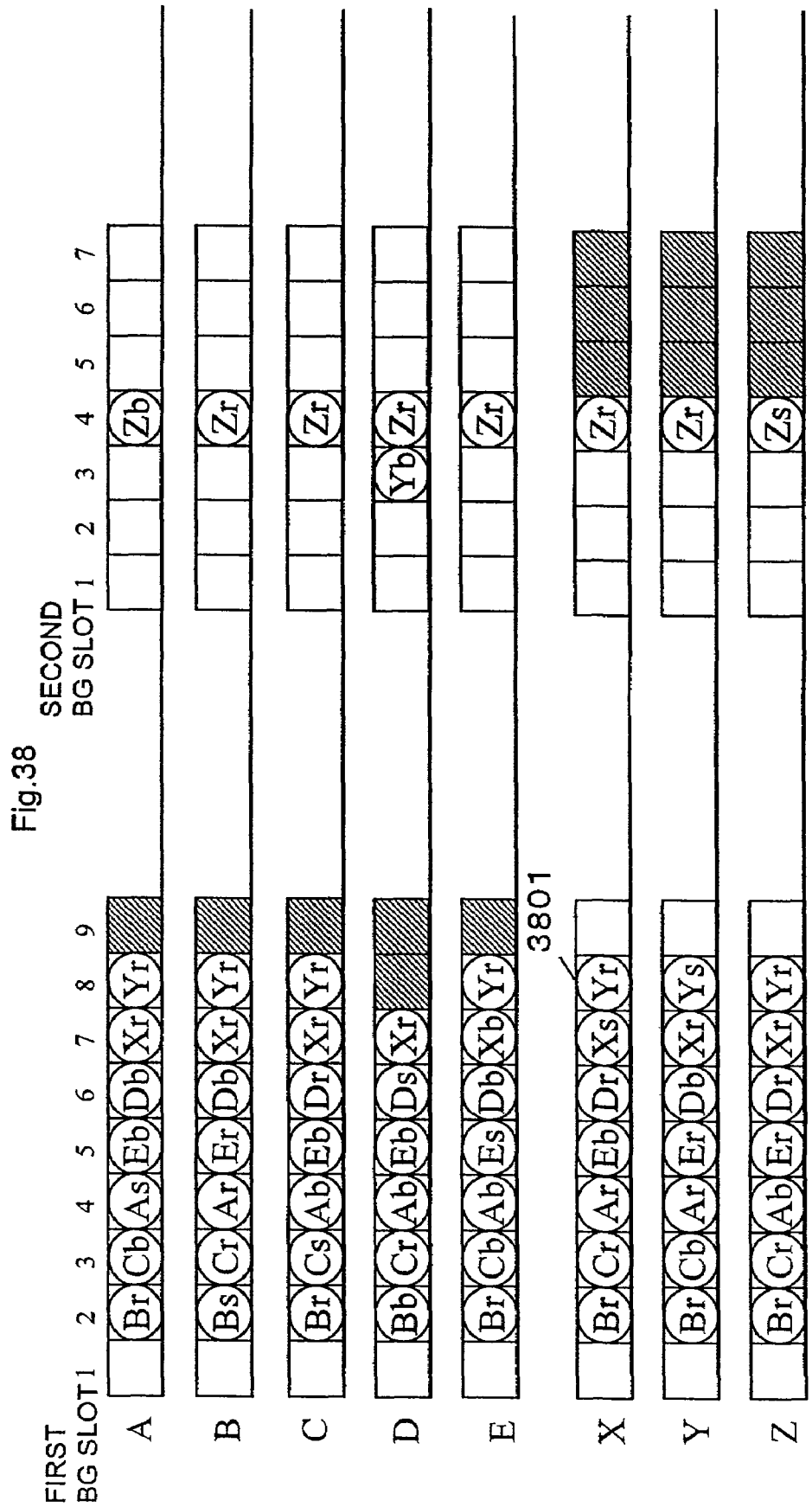
FIG. 38 is a diagram showing a state of use of slots in an operation for concatenation beacon periods of the radio communication apparatus according to the fourth embodiment of the invention.

The state of the next super frame cycle is shown in FIG. 38.

In FIG. 38, the radio communication apparatus Y increments the shift counter 3016 of the connection start notification information 3001. At this point, the radio communication apparatus Y reads that a counter value of the shift counter is '3' (odd number) and moves its beacon slot position to the highest empty slot (an eighth slot) 3801 of the first beacon period group. The radio communication apparatus Y transmits a beacon at the position of the eighth slot. Consequently, all the radio communication apparatuses excluding the radio communication apparatus D receive this beacon and learn that the radio communication apparatus Y has changed the slot position.

Since the radio communication apparatus Z of the second beacon period group has taken the highest slot position, the radio communication apparatus Z transmits, in place of the radio communication apparatus Y, a beacon, in which the counter value of the shift counter is set to be the shift counter 3016 value of the connection start notification information 3001, at the beacon slot position of the radio communication apparatus Z. All the radio communication apparatuses but the radio communication apparatus A receive this beacon and learn that the radio communication apparatus Z will start the concatenation operation.

Figure 39:
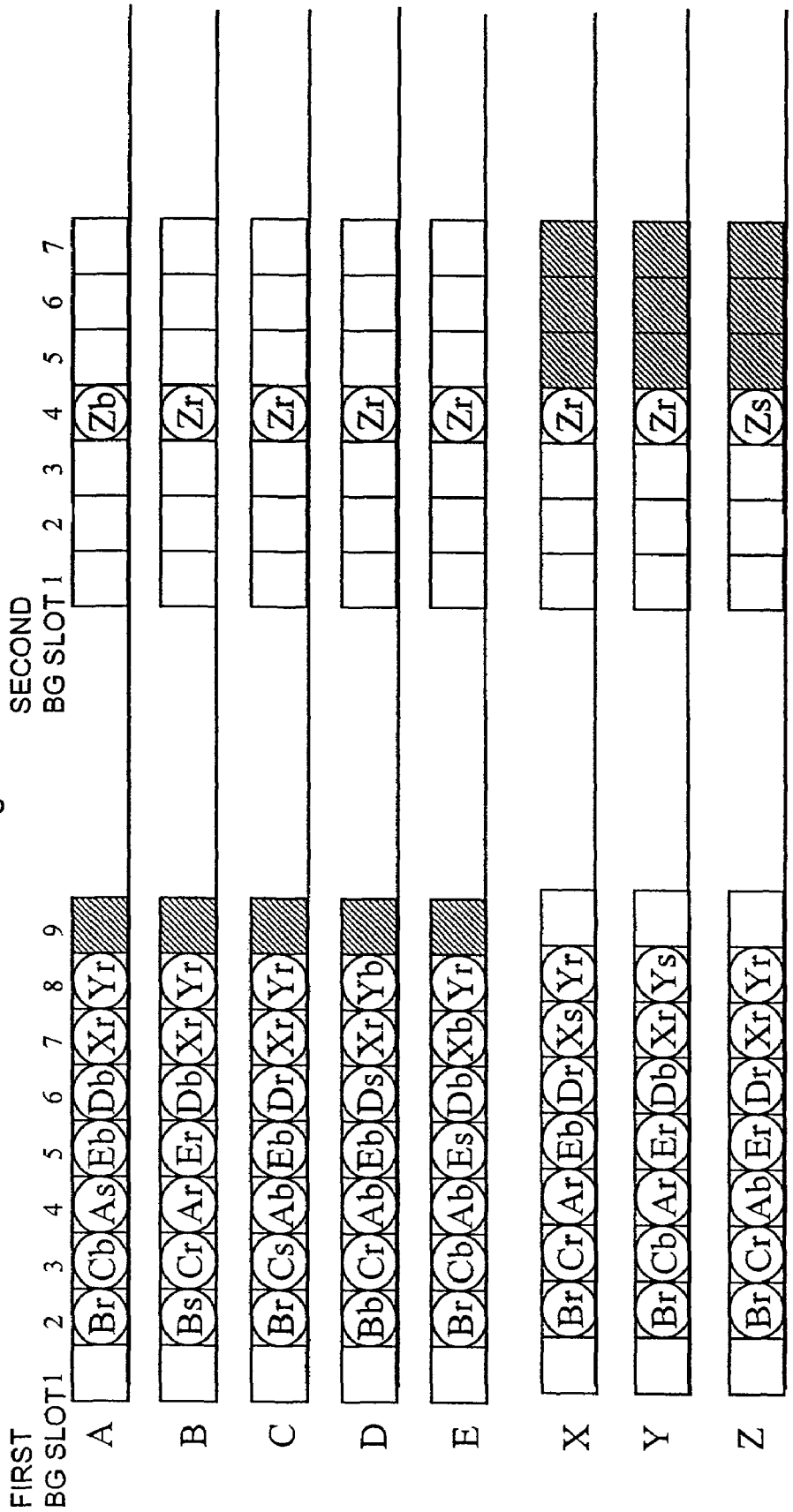
FIG. 39 is a diagram showing a state of use of slots in an operation for concatenation beacon periods of the radio communication apparatus according to the fourth embodiment of the invention.

The state of the next super frame cycle is shown in FIG. 39.

In FIG. 39, the radio communication apparatus Z increments the shift counter 3016 of the connection start notification information 3001. At this point, since a counter value of the shift counter is '4' (even number), the radio communication apparatus Z does not move the slot position. Note that information of the connection flag 3011 of the radio communication apparatus Z is notified to the radio communication apparatus A via the beacon period occupancy information 302 of the radio communication apparatus B. In this way, a next neighborhood radio communication apparatus is also notified that the radio communication apparatus Z is performing the concatenation operation.

Figure 40:
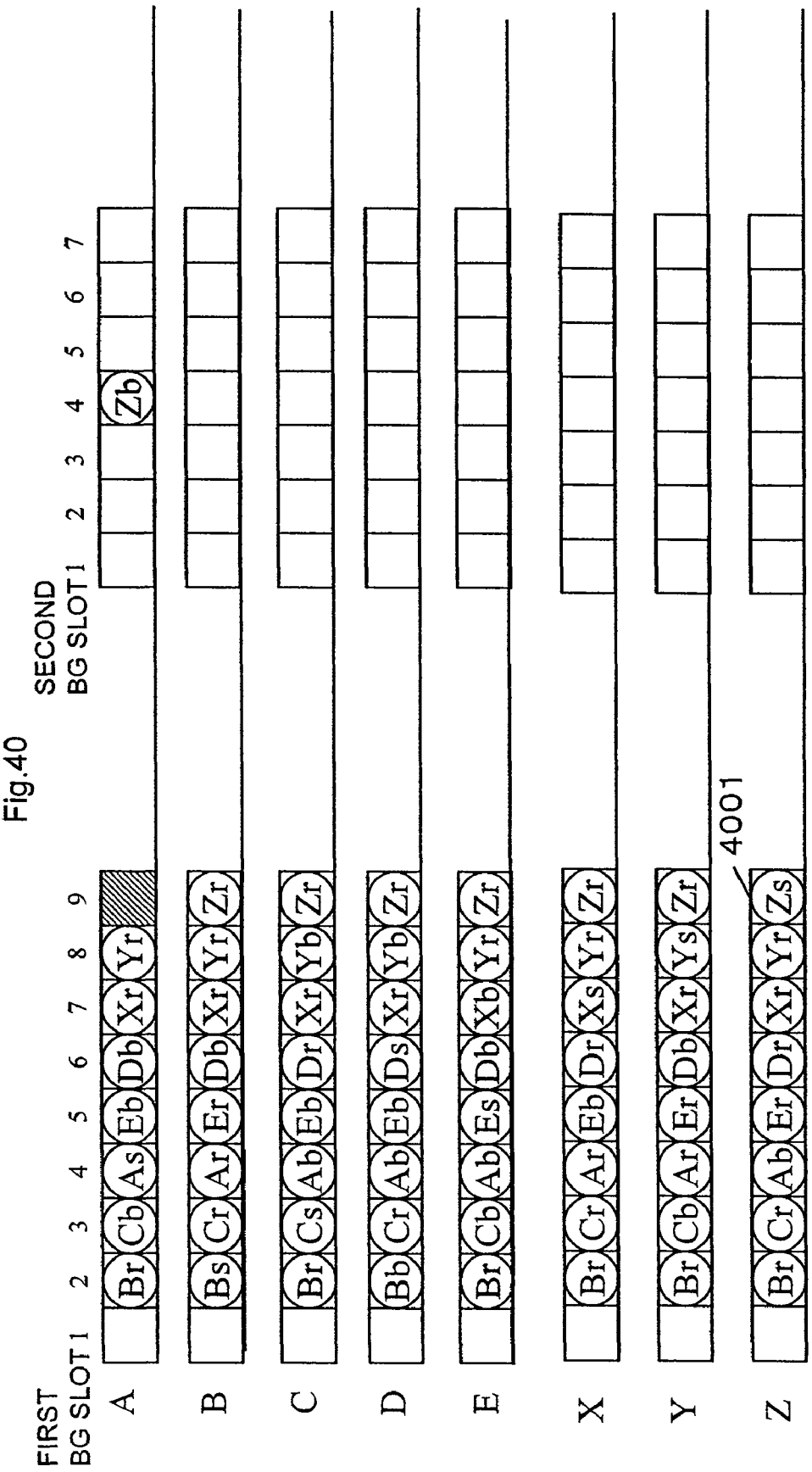
FIG. 40 is a diagram showing a state of use of slots in an operation for concatenation beacon periods of the radio communication apparatus according to the fourth embodiment of the invention.

The state of the next super frame cycle is shown in FIG. 40.

In FIG. 40, the radio communication apparatus Z increments the shift counter 3016 of the connection start notification information 3001. At this point, the radio communication apparatus Z reads that a counter value of the shift counter is '5' (odd number) and moves the beacon slot position to the highest empty slot (the ninth slot) 4001 of the first beacon period group. The radio communication apparatus Z transmits a beacon at the ninth slot. Consequently, all the radio communication apparatuses but the radio communication apparatus A receive the beacon and learn that the radio communication apparatus Z has changed its slot position.

Figure 41:
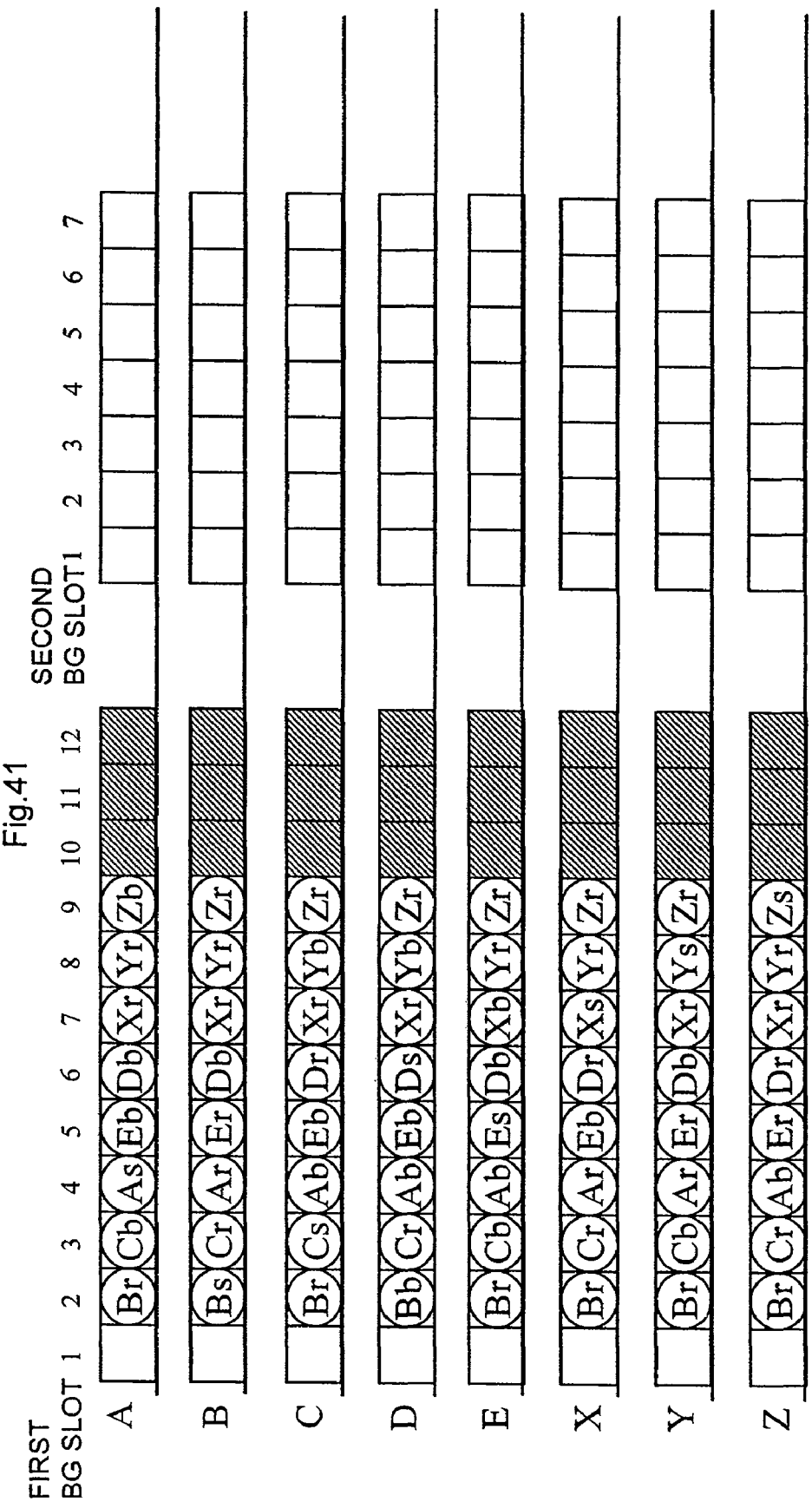
FIG. 41 is a diagram showing a state of use of slots in an operation for concatenation beacon periods of the radio communication apparatus according to the fourth embodiment of the invention.

The state of the next super frame cycle is shown in FIG. 41.

In FIG. 41, since the movement of the slot position has been completed, the radio communication apparatus Z does not add to the connection start notification information 3001 any more. Consequently, the other radio communication apparatuses learn that the concatenation operation of the beacon periods of the second beacon period group has ended.

In this way, a radio communication apparatus which connects beacon periods sets a connection flag of beacon sender information and transmit a beacon in a beacon slot of the radio communication apparatus. Consequently, the radio communication apparatus can notify other radio communication apparatuses of start of a concatenation operation for the beacon periods. Moreover, since movement of a beacon slot position is performed every other super frame, the radio communication apparatus can also notify a next neighborhood radio communication apparatus that the radio communication apparatus is concatenation beacon periods. Consequently, it is possible to prevent the slot position of a radio communication apparatus from conflicting with a slot position of another radio communication apparatus in a next neighborhood position.

Note that the radio communication apparatus X transmits the connection start notification information 3001 in the super frames when the merge counter is from '5' to '3'. This is for the purpose of notifying the respective radio communication apparatuses in the first beacon period group and the second beacon period group of connection start information surely. The transmission conditions of connection start information are not limited to this.

As described above, even when plural beacon period groups interfere with one another because of movement, it is possible to perform communication in periods separated from one another by performing a concatenation operation to connect the beacon periods of the interfering beacon period groups. This makes it possible to prevent the mutual interference of the beacon period groups.

INDUSTRIAL APPLICABILITY

The invention is useful for a radio communication method and a radio communication apparatus which are used when ad hoc communication or the like is performed and when respective radio communication apparatuses in a radio network transmit beacons, is suitable for changing those beacons periods dynamically.

The invention claimed is:

1. A radio communication method by which a first radio communication apparatus transmits a beacon in a beacon slot within a beacon period, comprising:
   detecting, whether there is an empty beacon slot in the beacon period located before the first radio communication apparatus's beacon slot within the beacon period,
   in case that the empty beacon slot is detected in detecting step, the method further comprising:
      generating and transmitting, a first beacon sender information, the first beacon sender information including an identifier which identifies the first radio communication apparatus and indicates that the first radio communication apparatus is requesting to move to the empty beacon slot, and
   waiting a predetermined number of super frames before moving to the empty beacon slot,
   wherein the empty beacon slot is confirmed to be available when, in each of the predetermined number of super frames:

i) a specific beacon transmitted from a specific radio communication apparatus programmed to move its beacon slot position is not received later than the radio communication apparatus's beacon slot position within the beacon period and earlier than the end of the beacon period, and ii) the specific radio transmission apparatus programmed to move its beacon slot position is not detected in other beacon period occupancy information included in the other beacons transmitted from the other radio communication apparatuses to have the specific beacon later in the beacon period than the radio communication apparatus; and changing, the beacon slot of the first radio communication apparatus to the empty beacon slot after the predetermined number of super frames, when the empty beacon slot is confirmed to be available.

2. The radio communication method according to claim 1, wherein the second beacon sender information includes an identifier which identifies the second radio communication apparatus, and a second movement situation information which indicates whether the movement request for the position of the beacon slot by the second radio communication apparatus exists or not, the second beacon period occupancy information includes the position of the beacon of a third radio communication apparatus which transmits a third beacon, the identifier which identifies the third radio communication apparatus, and a third movement situation information which indicates whether the movement request for the position of the beacon slot by the third radio communication apparatus exists or not, and the third beacon is the beacon received by the second radio communication apparatus.

3. The radio communication method according to claim 2, wherein the first movement situation information, the second movement situation information or the third movement situation information is a counter value or a flag of the movement counter which counts the predetermined number of super frames.

4. The radio communication method according to claim 2, wherein the empty beacon slot changed by the first radio communication apparatus is the empty beacon slot which locates at the closest to the beginning of the beacon period.

5. The radio communication method according to claim 2, wherein the first movement situation information, the second movement situation information or the third movement situation information includes a destination slot position information which indicates a movement destination of the position of the beacon slot of respective radio communication apparatuses, the first radio communication apparatus receives the fourth beacon in the period from the beacon slot of the first radio communication apparatus to the end of the beacon period, and in case that the empty beacon slot other than the empty beacon slot specified by the destination slot position information included in the fourth beacon is detected, the empty beacon slot other than the empty beacon slot specified becomes a destination beacon slot of the first beacon.

6. The radio communication method according to claim 2, wherein in case that the first radio communication apparatus selects the beacon slot which locates at the closest to the beginning of the beacon period, if the position of the beacon slot of the first radio communication apparatus is not the slot located at the end of the beacon slot, the first radio communication apparatus serially selects a next empty slot which locates next to the empty slot located at the closest to the beginning until selecting the slot located at the end of the beacon slots.

7. The radio communication method according to claim 1, wherein the first movement situation information, the second movement situation information or the third movement situation information is a counter value or a flag of the movement counter which counts the predetermined number of super frames.

8. The radio communication method according to claim 1, wherein the empty beacon slot changed by the first radio communication apparatus is the empty beacon slot which locates at the closest to the beginning of the beacon period.

9. The radio communication method according to claim 1, wherein the first movement situation information, the second movement situation information or the third movement situation information includes a destination slot position information which indicates a movement destination of the position of the beacon slot of respective radio communication apparatuses, the first radio communication apparatus receives the fourth beacon in the period from the beacon slot of the first radio communication apparatus to the end of the beacon period, and in case that the empty beacon slot other than the empty beacon slot specified by the destination slot position information included in the fourth beacon is detected, the empty beacon slot other than the empty beacon slot specified becomes a destination beacon slot of the first beacon.

10. The radio communication method according to claim 1, wherein in case that the first radio communication apparatus selects the beacon slot which locates at the closest to the beginning of the beacon period, if the position of the beacon slot of the first radio communication apparatus is not the slot located at the end of the beacon slot, the first radio communication apparatus serially selects a next empty slot which locates next to the empty slot located at the closest to the beginning until selecting the slot located at the end of the beacon slots.

11. A radio communication apparatus, the radio communication apparatus transmits a beacon in a beacon slot within a beacon period, comprising:

a radio processor for receiving a second beacon including a second beacon sender information and a second beacon period occupancy information from a second radio communication apparatus;

a beacon slot position controller for detecting, whether there is an empty beacon slot in the beacon period located before the radio communication apparatus's beacon slot within the beacon period;

a first sender information including an identifier which identifies the radio communication apparatus and a first movement situation information which indicates that the radio communication apparatus is requesting to move to the empty beacon slot;

a frame forming section for forming a first beacon, the first beacon including a first beacon period occupancy information generated by using the second beacon sender information, and the first beacon sender information; and a beacon transmission command section for detecting the position of the beacon slot of the radio communication apparatus and command the radio processor to transmit the first beacon formed by the frame forming section, wherein the beacon slot position controller detects the empty beacon slot based on the first beacon period occupancy information, and waits a predetermined number of super frames before moving to the empty beacon slot, wherein the empty beacon slot is confirmed to be available when, in each of the predetermined number of super frames:
i) a specific beacon transmitted from a specific radio communication apparatus programmed to move its beacon slot position is not received later than the radio communication apparatus's beacon slot position within the beacon period and earlier than the end of the beacon period, and
ii) the specific radio transmission apparatus programmed to move its beacon slot position is not detected in other beacon period occupancy information included in the other beacons transmitted from the other radio communication apparatuses to have the specific beacon later in the beacon period than the radio communication apparatus; and the beacon transmission command section outputs the first beacon to the empty beacon slot after the predetermined number of super frames, when the empty beacon slot is confirmed to be available.

12. The radio communication apparatus according to claim 11,
wherein the second beacon sender information includes an identifier which identifies the second radio communication apparatus, and a second movement situation information which indicates whether the movement request for the position of the beacon slot by the second radio communication apparatus exists or not,
the second beacon period occupancy information includes the position of the beacon of a third radio communication apparatus which transmits a third beacon, the identifier which identifies the third radio communication apparatus, and a third movement situation information which indicates whether the movement request for the position of the beacon slot by the third radio communication apparatus exists or not, and
the third beacon is the beacon received by the second radio communication apparatus.

13. The radio communication apparatus according to claim 12,
wherein the first movement situation information, the second movement situation information or the third movement situation information is a counter value or a flag of the movement counter which counts the predetermined number of super frames.

14. The radio communication apparatus according to claim 12,
wherein the empty beacon slot detected by the beacon slot position controller is the beacon slot which locates at the closest to the beginning of the beacon period.

15. The radio communication apparatus according to claim 12,
wherein the first movement situation information, the second movement situation information or the third movement situation information includes a destination slot position information which indicates a movement destination of the position of the beacon slot of respective radio communication apparatuses,
the beacon slot controller receives the fourth beacon in the period from the beacon slot of the radio communication apparatus to the end of the beacon period,
in case that the empty beacon slot other than the empty beacon slot specified by the destination slot position information included in the fourth beacon is detected, the first movement situation information is changed as the empty beacon slot other than the empty beacon slot specified becomes a destination beacon slot.

16. The radio communication apparatus according to claim 12,
wherein in case that the beacon slot position controller selects the beacon slot which locates at the closest to the beginning of the beacon period, if the position of the beacon slot of the radio communication apparatus is not the slot located at the end of the beacon slot, the beacon slot position controller serially selects a next empty slot which locates next to the empty slot located at the closest to the beginning until selecting the slot located at the end of the beacon slots.

17. The radio communication apparatus according to claim 11,
wherein the first movement situation information, the second movement situation information or the third movement situation information is a counter value or a flag of the movement counter which counts the predetermined number of super frames.

18. The radio communication apparatus according to claim 11,
wherein the empty beacon slot detected by the beacon slot position controller is the beacon slot which locates at the closest to the beginning of the beacon period.

19. The radio communication apparatus according to claim 11,
wherein the first movement situation information, the second movement situation information or the third movement situation information includes a destination slot position information which indicates a movement destination of the position of the beacon slot of respective radio communication apparatuses,
the beacon slot controller receives the fourth beacon in the period from the beacon slot of the radio communication apparatus to the end of the beacon period,
in case that the empty beacon slot other than the empty beacon slot specified by the destination slot position information included in the fourth beacon is detected, the first movement situation information is changed as the empty beacon slot other than the empty beacon slot specified becomes a destination beacon slot.

20. The radio communication apparatus according to claim 11,
wherein in case that the beacon slot position controller selects the beacon slot which locates at the closest to the beginning of the beacon period, if the position of the beacon slot of the radio communication apparatus is not the slot located at the end of the beacon slot, the beacon slot position controller serially selects a next empty slot which locates next to the empty slot located at the closest to the beginning until selecting the slot located at the end of the beacon slots.

\* \* \* \* \*

UNITED STATES PATENT AND TRADEMARK OFFICE
CERTIFICATE OF CORRECTION

PATENT NO. : 8,059,637 B2  
APPLICATION NO. : 12/472869  
DATED : November 15, 2011  
INVENTOR(S) : Hiroshi Doi et al.

Page 1 of 1

It is certified that error appears in the above-identified patent and that said Letters Patent is hereby corrected as shown below:

On the Title Page, Insert Item [86] --PCT No.: PCT/JP2005/014022 Date: August 1, 2005--

Signed and Sealed this
Twenty-eighth Day of February, 2012

David J. Kappos
*Director of the United States Patent and Trademark Office*